(12) United States Patent
Seshadri et al.

(10) Patent No.: US 7,065,148 B2
(45) Date of Patent: Jun. 20, 2006

(54) SUPER-ORTHOGONAL SPACE-TIME TRELLIS CODES, AND APPLICATIONS THEREOF

(75) Inventors: Nambirajan Seshadri, Irvine, CA (US); Hamid Jafarkhani, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 863 days.

(21) Appl. No.: 09/985,886

(22) Filed: Nov. 6, 2001

(65) Prior Publication Data

US 2002/0090035 A1 Jul. 11, 2002

Related U.S. Application Data

(60) Provisional application No. 60/312,781, filed on Aug. 17, 2001, provisional application No. 60/246,426, filed on Nov. 6, 2000.

(51) Int. Cl.
*H04L 23/02* (2006.01)

(52) U.S. Cl. ............... 375/265; 375/299; 375/295; 375/267; 375/347; 714/792; 714/795; 370/320

(58) Field of Classification Search ............... 375/265, 375/295, 299, 267, 347; 370/320; 714/792, 714/795

See application file for complete search history.

(56) References Cited

U.S. PATENT DOCUMENTS

| | | | | |
|---|---|---|---|---|
| 5,193,094 A | * | 3/1993 | Viterbi | ............... 714/795 |
| 5,870,414 A | * | 2/1999 | Chaib et al. | ............... 714/792 |
| 6,804,307 B1 | * | 10/2004 | Popovic | ............... 375/299 |
| 6,865,237 B1 | * | 3/2005 | Boariu et al. | ............... 375/295 |
| 2001/0017903 A1 | * | 8/2001 | Naguib et al. | ............... 375/347 |
| 2001/0033622 A1 | * | 10/2001 | Jongren et al. | ............... 375/267 |
| 2004/0146014 A1 | * | 7/2004 | Hammons et al. | ......... 370/320 |

OTHER PUBLICATIONS van Wyk et al., "On the Construction of Layered Space-Time Coded Modulation (STCM) Codes Employing MTCM Code Design Techniques," *Proceedings of the Vehicular Technology Conference*, vol. 5, Conf. 50, IEEE, New York, Sep. 19-22, 1999, pp. 2969-2973.

S. Alamouti, "A Simple Transmit Diversity Technique for Wireless Communications," *IEEE Journal on Selected Areas in Communications*, vol. 16, No. 8, Oct. 1998, pp. 1451-1458.

(Continued)

*Primary Examiner*—Stephen Chin
*Assistant Examiner*—Eva Zheng
(74) *Attorney, Agent, or Firm*—Sterne, Kessler, Goldstein & Fox PLLC

(57) ABSTRACT

A super set of space-time block codes is combined with set partitioning to form super-orthogonal space-time trellis codes having full diversity, enhanced coding gains, and improved rates. In communications systems, these codes are implemented by an encoder of a diverse transmitter to send an information signal to a receiver having one or more receiver elements. A decoder in the receiver decodes the encoded signal to reproduce the information signal. A method of the invention is used to generate set partitioning structures and trellis structures that enable code designers to systematically design the codes of the invention.

47 Claims, 19 Drawing Sheets

OTHER PUBLICATIONS

Alamouti et al., "Trellis-Coded Modulation and Transmit Diversity: Design Criteria and Performance Evaluation," *Proceedings of ICUPC*, IEEE, 1998, pp. 703-707.

Divsalar et al., "Multiple Trellis Coded Modulation (MTCM)," *IEEE Trans. Communications*, vol. 36, No. 4, Apr. 1988, pp. 410-419.

Fettweis et al., "High-Rate Viterbi Processor: A Systolic Array Solution," *IEEE Journal on Selected Areas in Communications*, vol. 8, No. 8, IEEE, Oct. 1990, pp. 1520-1533.

Fettweis et al., "Parallel Viterbi Algorithm Implementation: Breaking the ACS-Bottleneck," *IEEE Transactions on Communications*, vol. 37, No. 8, IEEE, Aug. 1989, pp. 785-789.

Forney, G., "The Viterbi Algorithm," *Proceedings of the IEEE*, vol. 61, No. 3, Mar. 1973, IEEE, New York, New York, pp. 268-278.

H. Jafarkhani, "A Quasi-Orthogonal Space-Time Block Code," *IEEE Trans. Communications*, vol. 49, No. 1, Jan. 2001, pp. 1-4.

Siwamogsatham et al., "Robust Space-Time Coding for Correlated Rayleigh Fading Channels," *Proceedings—Thirty-Eight Annual Allerton Conference on Communication, Control, and Computing—vol. II*, University of Illinois, Oct. 2000, pp. 1057-1066.

G. Ungerboeck, "Channel Coding for Multilevel/Phase Signals," *IEEE Trans. Inform. Theory*, vol. IT-28, No. 1, IEEE, New York, New York, Jan. 1982, pp. 55-67.

Tarokh et al., "New Detection Schemes for Transmit Diversity with no Channel Estimation," *IEEE 1998 International Conference on Universal Personal Communications*, IEEE, Piscataway, New Jersey, 1998, pp. 917-920.

Tarokh et al., "Space-time Block Codes from Orthogonal Designs," *IEEE Trans. Inform. Theory*, vol. 45, No. 5, IEEE, Jul. 1999, pp. 1456-1467.

Tarokh et al., "Space-Time Block Coding for Wireless Communications: Performance Results," *IEEE Journal on Selected Areas in Communications*, vol. 17, No. 3, IEEE, Mar. 1999, pp. 451-460.

Tarokh et al., "Space-Time Codes for High Data Rate Wireless Communication: Performance Criterion and Code Construction," *IEEE Trans. Inform. Theory*, vol. 44, No. 2, IEEE, Mar. 1998, pp. 744-765.

* cited by examiner

STATE 1   $\{C(x_1, x_2, 0), A_{00}, A_{01}, A_{10}, A_{11}\}$

STATE 2   $\{C(x_1, x_2, \pi/2), A_{00}, A_{01}, A_{10}, A_{11}\}$

STATE 3   $\{C(x_1, x_2, \pi), A_{00}, A_{01}, A_{10}, A_{11}\}$

STATE 4   $\{C(x_1, x_2, 3\pi/2), A_{00}, A_{01}, A_{10}, A_{11}\}$

STATE 5   $\{C(x_1, x_2, 0), A_{10}, A_{11}, A_{00}, A_{01}\}$

STATE 6   $\{C(x_1, x_2, \pi/2), A_{10}, A_{11}, A_{00}, A_{01}\}$

STATE 7   $\{C(x_1, x_2, \pi), A_{10}, A_{11}, A_{00}, A_{01}\}$

STATE 8   $\{C(x_1, x_2, 3\pi/2), A_{10}, A_{11}, A_{00}, A_{01}\}$

SUPER-ORTHOGONAL SPACE-TIME TRELLIS CODES, AND APPLICATIONS THEREOF

CROSS-REFERENCE TO RELATED APPLICATIONS

This application claims the benefit of U.S. Provisional Application No. 60/312,781, filed Aug. 17, 2001, and U.S. Provisional Application No. 60/246,426, filed Nov. 6, 2000, which are incorporated herein by reference in their entirety.

FIELD OF THE INVENTION

The present invention relates to telecommunications. More particularly, it relates to wireless telecommunications systems.

BACKGROUND OF THE INVENTION

It is well known that using a diversity scheme can improve the signal-to-noise ratio of a received information signal in a telecommunications system. A diversity scheme involves, for example, using information derived from several signals transmitted over independent fading paths to produce a single received information signal. In telecommunications systems having multiple transmit antennas (transmit diversity), a coding scheme can be used to encode the transmitted information and thereby improve reliability. Using a coding scheme with such telecommunications systems reduces errors in the received information signal.

The use of codes for improving the reliability of a telecommunications systems having multiple transmit antennas has been discussed in articles. For example, a code for providing full diversity for telecommunications system using two transmit antennas is discussed in an article by Alamouti. See S. M. Alamouti, "A simple transmitter diversity scheme for wireless communications," in *IEEE Journal on Selected Areas of Communications*, Vol. 16, pp. 1451–1458, November 1998, which is incorporated herein by reference in its entirety. The code of Alamouti is generalized to any number of antennas in an article by Tarokh et al. See V. Tarokh et al., "Space-time block codes from orthogonal designs," in *IEEE Trans. Inform. Theory*, Vol. 45, pp. 1456–1467, July 1999, which is incorporated herein by reference in its entirety. As suggested by the title, the code of Tarokh et al. is referred to as a space-time block code.

In their article, Tarokh et al. have generalized the theory of orthogonal designs to show when a full diversity scheme is possible and how to achieve it. See id. Although the space-time block code of Tarokh et al. provides full diversity, its main goal is not to provide enhanced coding gains. See id., and V. Tarokh et al., "Space-time block codes for wireless communications: performance results," in *IEEE Journal on Selected Areas of Communications*, Vol. 17, pp. 451–460, March 1999, which is incorporated herein by reference in its entirety. To achieve enhanced coding gains, one needs to concatenate another code to the space-time block code of Tarokh et al.

Space-time trellis codes combine a trellis code with an inner space-time block code to provide enhanced coding gain. Space-time trellis codes are discussed in an article by Alamouti et al. See S. Alamouti et al., "Trellis-coded modulation and transmit diversity: design criteria and performance evaluation," in *IEEE International Conference on Universal Personal Communications (ICUPC-98)*, Vol. 2, pp. 917–920, 1998, which is incorporated herein by reference in its entirety. The space-time trellis coding scheme of S. Alamouti et al. is used for Rayleigh fading channels with large space-time correlations in an article by Siwamogsatham et al. See S. Siwarnogsatham et al., "Robust space-time coding for correlated Rayleigh fading channels," *Allerton Conference*, October 2000, which is incorporated herein by reference in its entirety.

As will be understood by a person skilled in the relevant telecommunications art, the coding scheme of Alamouti et al. and Siwamogsatham et al. does not produce the maximum possible coding gain, nor does it provide a method for designing new codes for systems other than those discussed. For example, it is not clear how to design codes for telecommunications systems having different number of states or different rates than the ones discussed by Alamouti et al. and Siwamogsatham et al. Thus, there is a need for new codes having improved coding gains and a method for designing such codes.

BRIEF SUMMARY OF THE INVENTION

A super set of space-time block codes is combined with set partitioning to form super-orthogonal space-time trellis codes having full diversity, enhanced coding gains, and improved rates. In communications systems, these codes are implemented by an encoder of a diverse transmitter to send an information signal to a receiver having one or more receiver elements (e.g., one or more antennas or optical receivers). A decoder in the receiver decodes the encoded signal to reproduce the information signal. The codes of the invention can be implemented by any receiver and any transmitter having at least two transmission elements (e.g., antennas or optical receivers).

In embodiments, the invention is used to encode and decode information signals sent between two communication devices. For example, in embodiments, the invention is implemented by cell phone communications systems, TV and video communications systems, and digital area network communications systems. The invention can be used, for example, for communications systems transmitting in the radio and/or optical frequency ranges.

A method of the invention is used to generate set partitioning structures and trellis structures that enable code designers to systematically design the codes of the invention.

Further features and advantages of the present invention, as well as the structure and operation of various embodiments of the present invention, are described in detail below with reference to the accompanying drawings.

BRIEF DESCRIPTION OF THE DRAWINGS/FIGURES

The present invention is described with reference to the accompanying figures. In the figures, like reference numbers indicate identical or functionally similar elements. Additionally, the leftmost digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

Figure 17A:
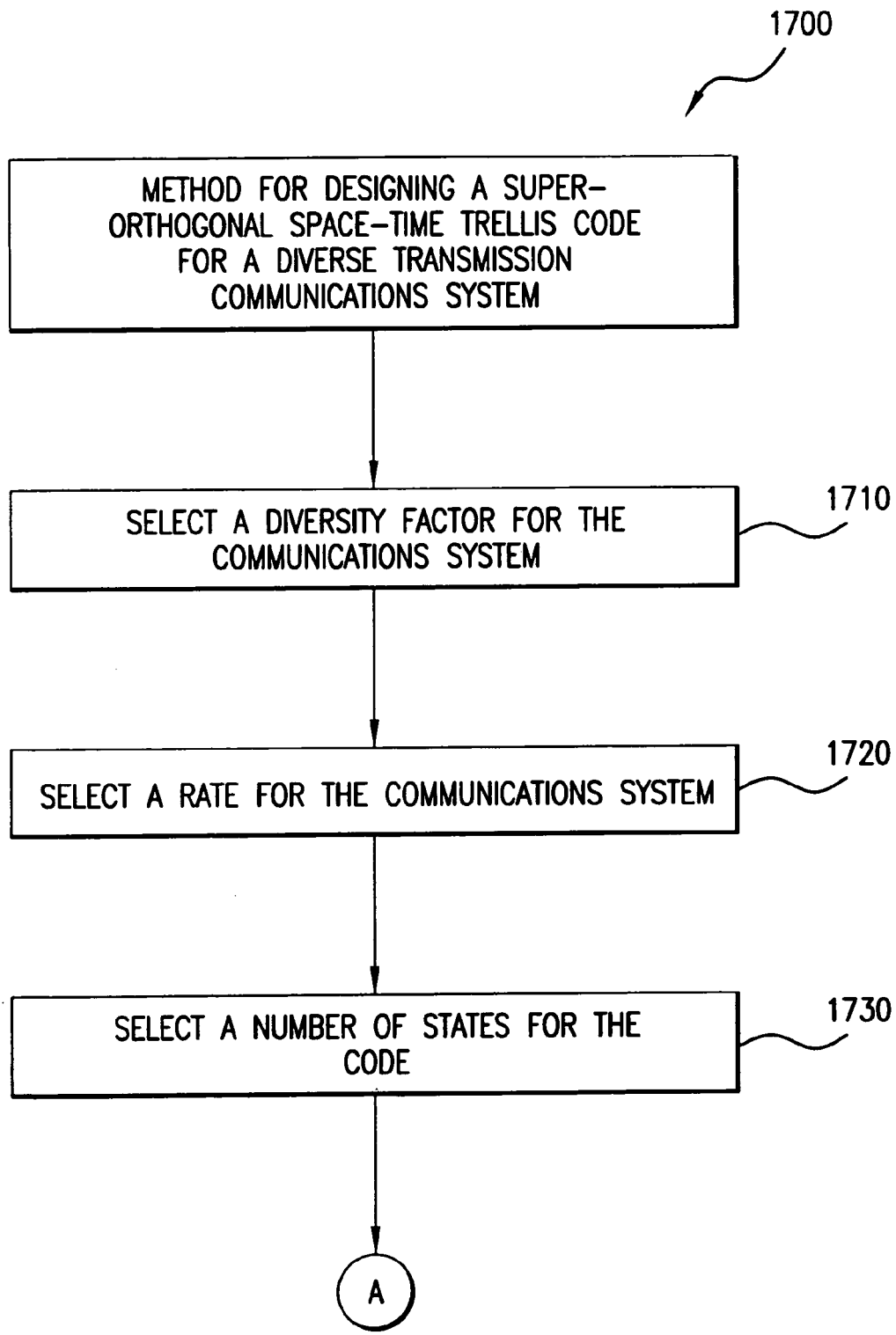
Figure 17B:
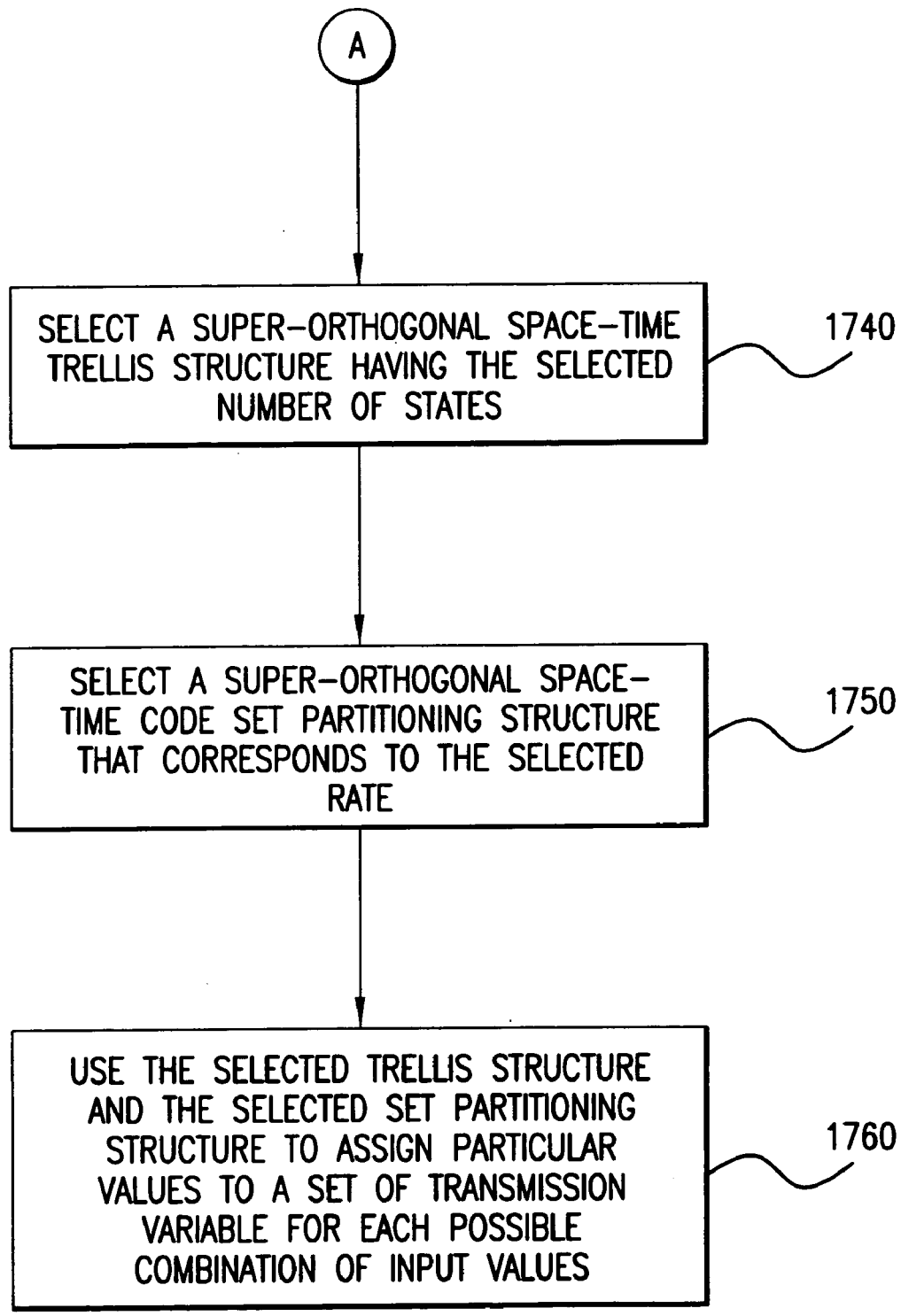

FIGS. 17A–B illustrate a flowchart of the method of the invention for designing super-orthogonal space-time trellis codes.

DETAILED DESCRIPTION OF THE INVENTION

As described herein, the present invention provides new structures and methods for designing space-time trellis codes having full diversity and enhanced coding gain. These enhanced codes are referred to as super-orthogonal space-time trellis codes. As will be understood by a person skilled in the relative communications art, the enhanced codes of the invention are use in telecommunication systems that include transmitters having multiple transmission elements (e.g., at least two antennas or optical transmitters) and receivers having one or more receiver elements (e.g., at least one antenna or optical receiver).

System Embodiments of the Invention

Figure 1:
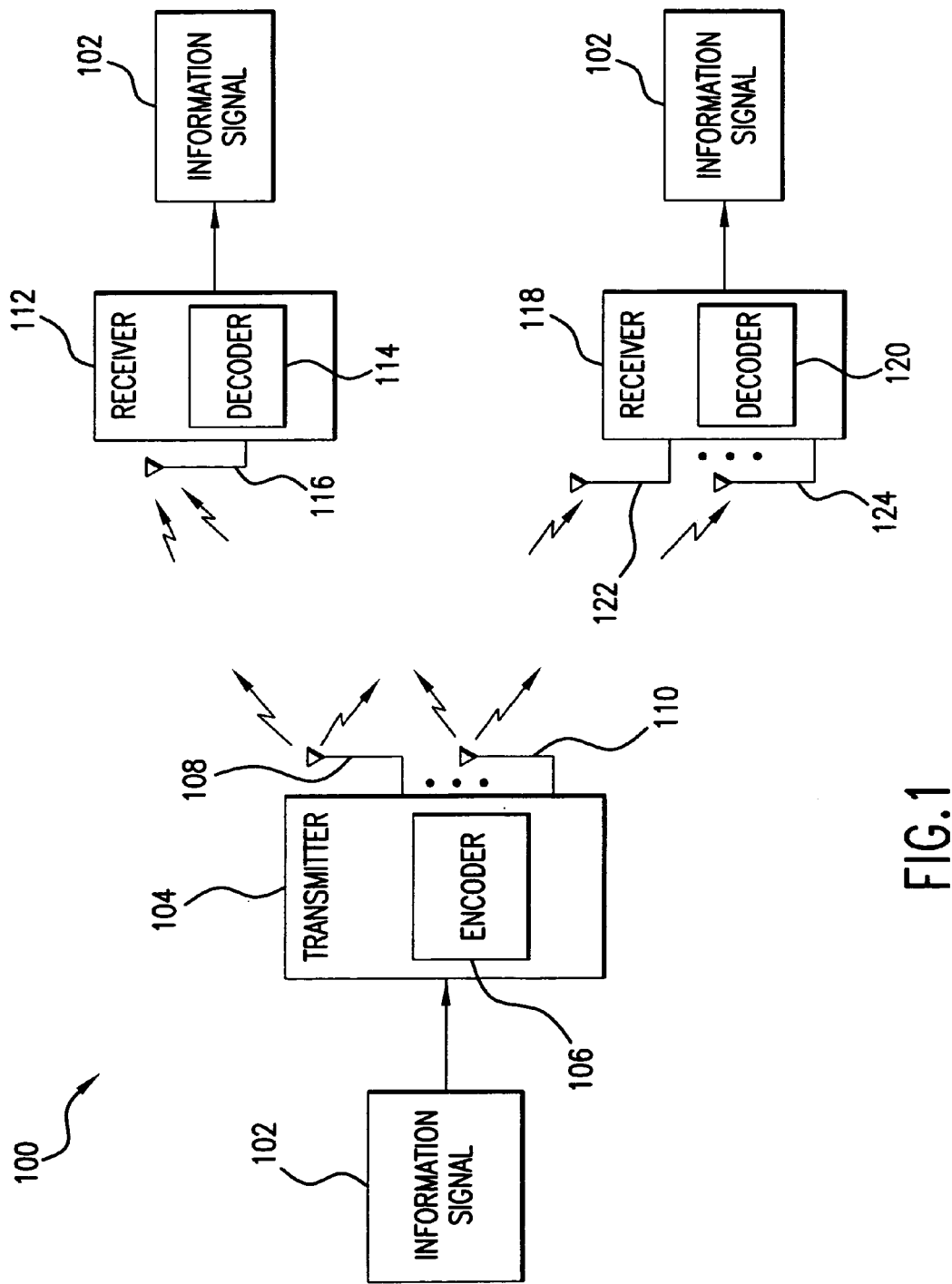
FIG. 1 illustrates a telecommunications system according to an embodiment of the invention.

FIG. 1 illustrates an example telecommunications system 100 that embodiments the invention. Telecommunication system 100 includes a transmitter 104 and two receivers 112 and 118.

Transmitter 100 has at least two transmission elements or antennas. In an embodiment, transmitter 104 has exactly two antennas 108 and 110. Transmitter 104 receives as an input an information signal 102. Information signal 102 is encoded by transmitter 104 using a encoder 106 that implements a multi-state trellis code. The operation of encoder 106 is described in detail below. Transmitter 104 transmits a first encoded signal from antenna 108 and a second encoded signal from antenna 110 at time $T_1$. Transmitter 104 then transmits a third encoded signal from antenna 108 and a fourth encoded signal from antenna 110 at time T2.

Receiver 112 receives all four encoded signals transmitted by transmitter 104 using an antenna 116. These signal are decoded using a decoder 114. The output or receiver 112 is a reproduced information signal 102. The operation of receiver 112 is further described below with reference to FIG. 3.

Receiver 118 has at least two receiver elements or antennas. In an embodiment, receiver 118 has exactly two antennas 122 and 124. The first and third encoded signals are received using antenna 122. The second and fourth encoded signals are received using antenna 124. These four received signals are decoded by a decoder 120. The output of receiver 118 is also a reproduced information signal 102. As will be understood by a person skilled in the relevant communications art, the operation of receiver 118 is similar to the operation of receiver 112.

Figure 2:
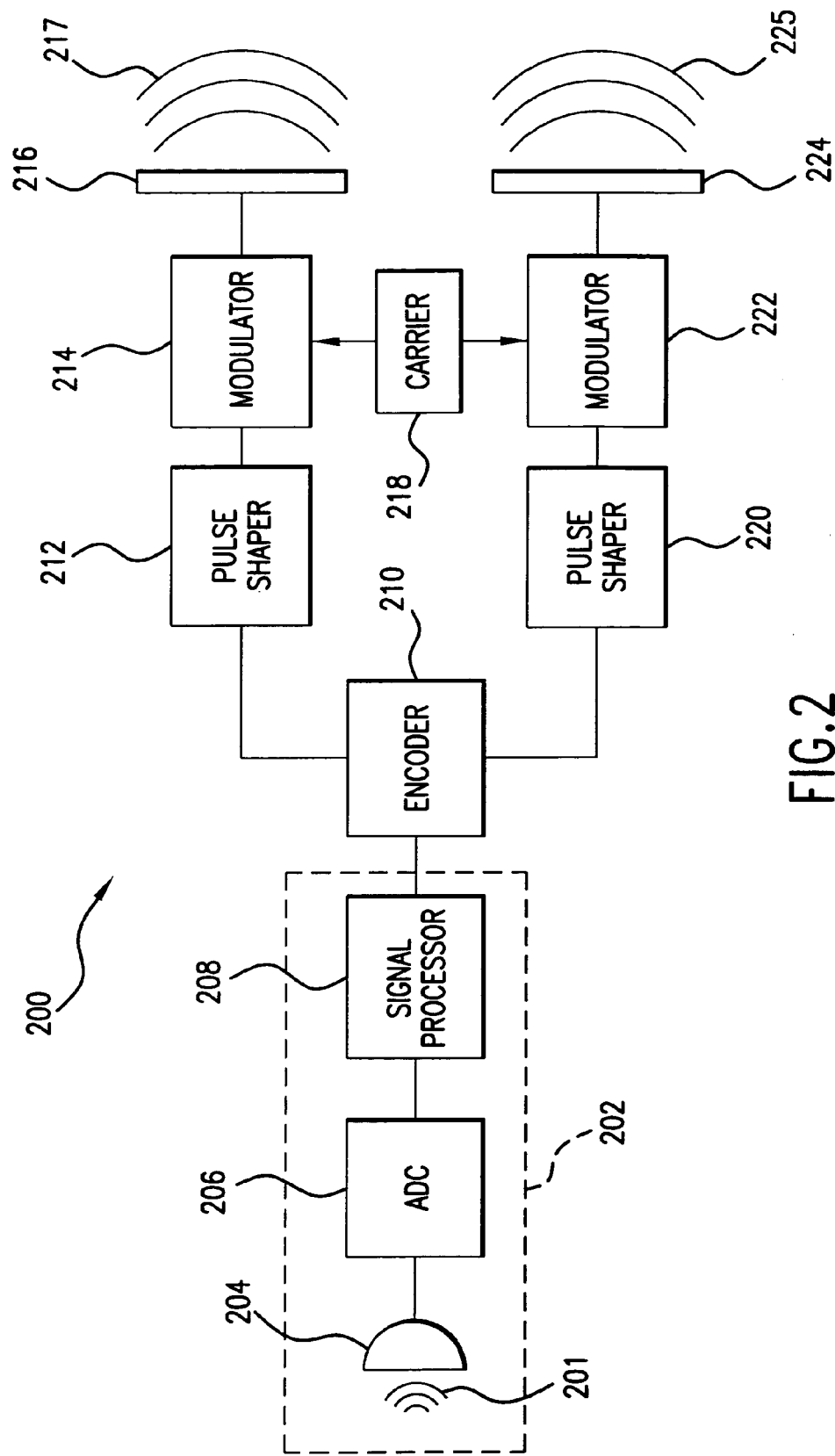
FIG. 2 illustrates a transmitter according to an embodiment of the invention.

FIG. 2 illustrates a example transmitter 200 according to the invention.

Transmitter 200 operates in a manner similar to transmitter 104. In an embodiment, transmitter 200 has a signal input module 202, an encoder 210, two pulse shapers 212 and 220, two modulation modules 214 and 222, a carrier signal module 218, and two antennas 216 and 224.

In an embodiment, signal input module 202 comprises a microphone 204 for converting a voice signal to an analog electrical signal. The output signal of microphone 204 is converted to a digital electrical signal using analog-to-digital converter (ADC) 206. The output of ADC 206 is then supplied to an optional signal processor 208. In an embodiment, signal processor 208 is used to compress the digital signal output by ADC 206.

As will be understood by a person skilled in the relevant art, input signal module 202 is not limited to the features shown in FIG. 2. In other embodiments of the invention, input signal module 202 comprises, for example, the digital output of a computer or other similar device. In embodiments of the invention, input signal module 202 can comprise any combination of devices that result in the generation of a stream of digital bits or data.

The output of input signal module 202 is provided to an encoder 210. Encoder 210 encodes data using a super-orthogonal space-time trellis code, as taught herein. The operation of encoder 210 is described in detail below with reference to FIGS. 5–16.

As shown in FIG. 2, in an embodiment, encoder 210 produces two outputs. A first output is operated on by pulse shaper module 212 and then up-converted by modulator module 214. This output is transmitter by antenna 216. A second output is operated on by pulse shaper module 220 and then up-converted by modulator module 222. This output is transmitter by antenna 224. Both modulator 214 and modulator 222 are supplied a carrier signal from a carrier module 218. As can be seen in FIG. 2, antenna 216 transmits a signal 217 and antenna 224 transmits a signal 225 at time $T_1$.

The operation of the various devices of transmitter 200 will be understood by a person skilled in the relevant art given the description of the invention contained herein.

Figure 3:
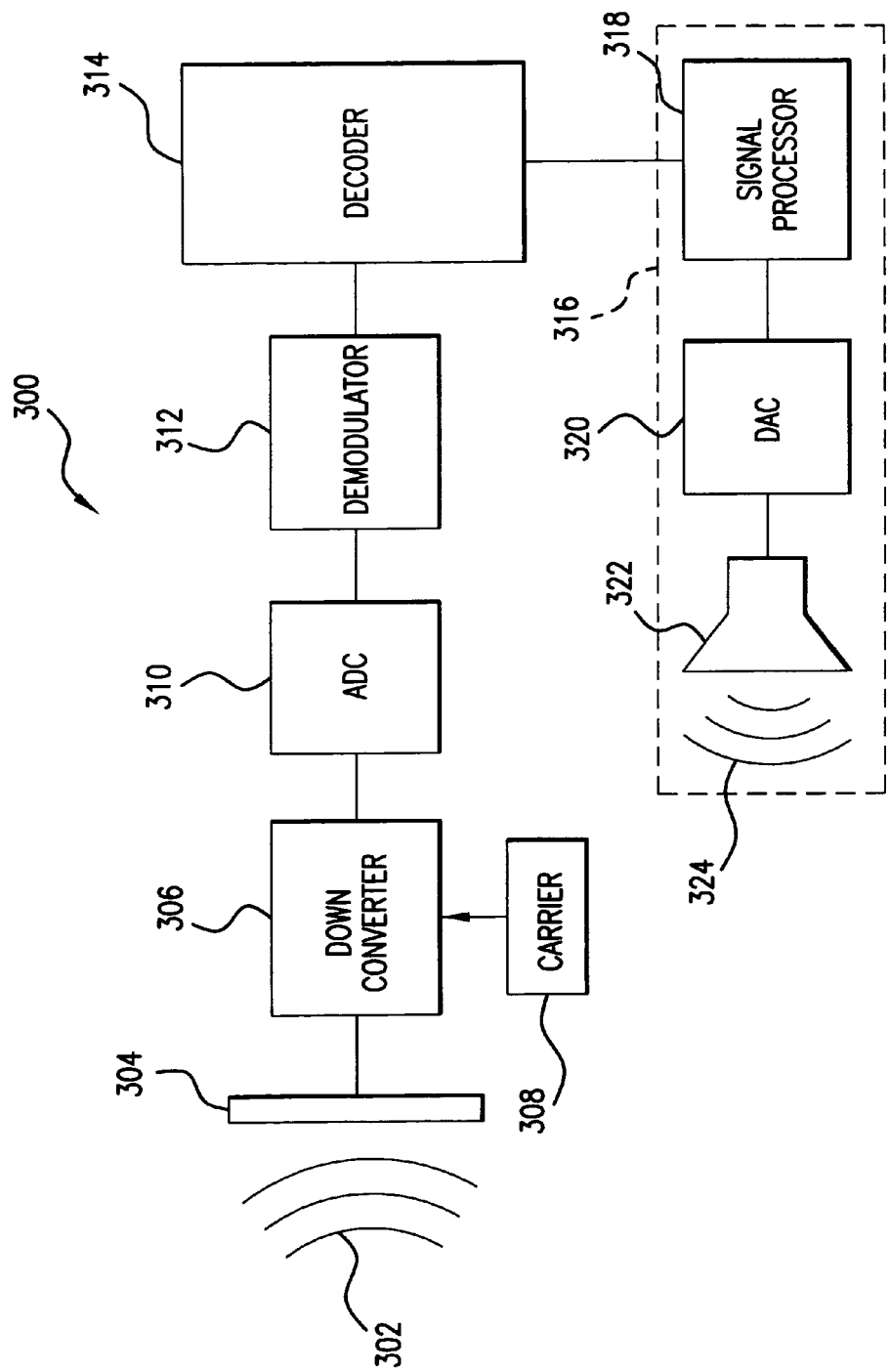
FIG. 3 illustrates a receiver according to an embodiment of the invention.

FIG. 3 illustrates an example receiver 300 according to an embodiment of the invention. Receiver 300 uses a single antenna 304 to receive an encoded signal 302. In addition to antenna 304, receiver 300 includes a down-converter module 306, an ADC module 310, a demodulator module 312, a decoder 314, and a signal processor module 316.

Down-converter module 306 down-converts the encoded signal 302 received by antenna 304. A carrier signal is supplied to down-converter module 306 by a carrier module 308. The analog output signal of down-converter module 306 is converted to a digital signal by ADC 310.

Demodulator 312 demodulates the received signal 302 after it is down-converted. The demodulated signal is then supplied to decoder 314 for decoding according to the invention. Decoder 314 is designed to decode the super-orthogonal space-time trellis codes described herein.

The output of decoder 314 is provided to signal processor module 316. As shown in FIG. 3, in an embodiment, module 316 includes an optional signal processor 318, a digital-to-analog converter (DAC) 320 and a speaker 322. The output of speaker 322 is an audio signal 324. Signal processor 318 can be any desired processor such as, for example, an equalizer, a dynamic range expander, et cetera.

As will be understood by a person skilled in the relevant art, signal processor module 316 is not limited to the features shown in FIG. 3. In other embodiments of the invention, signal processor module 316 comprises, for example, a computer or other similar device. In embodiments of the invention, signal processor module 316 can comprise any combination of devices that operate on a stream of digital bits or data.

Figure 4:
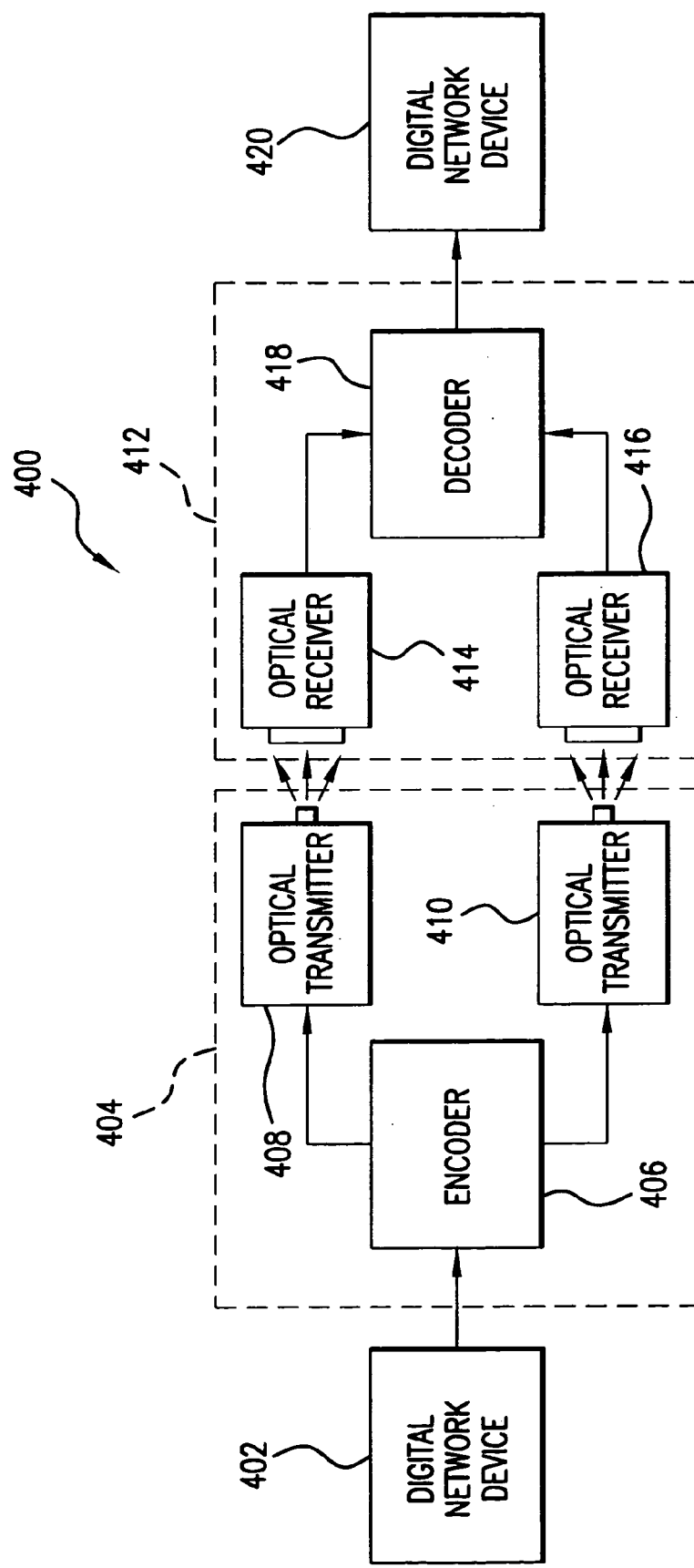
FIG. 4 illustrates a digital networking system according to an embodiment of the invention.

As will be understood by persons skilled in the relevant arts given the description herein, the present invention is not limited to systems operating at radio frequencies. For example, as illustrated in FIG. 4, the invention can be used in systems communicating at optical frequencies. FIG. 4 shows the invention being used by two digital network devices 402 and 420 to communicate as part of a wireless local area network 400.

In an embodiment, wireless local area network 400 comprises at least two digital network device 402 and 420. In an embodiment, device 402 is a computer and device 420 is a network port device. In another embodiment, both devices 402 and 420 are computers or other similar digital devices. Device 402 is coupled to a transmitter 404 having an encoder 406 and two optical transmitter elements 408 and 410. Device 420 is coupled to a receiver 412 having a decoder 418 and two optical receiver elements 414 and 416. Encoder 406 encodes data received from digital network device 402 using a super-orthogonal space-time trellis code. Decoder 418 decodes the signals transmitted by transmitter 404 and provides a decoded signal to digital network device 420. In an embodiment, optical transmitter elements 408 and 410 transmit information at an infrared frequency, and optical receiver elements 414 and 4160 receive information at an infrared frequency. The operation of each of the components of wireless local area network 400 will be known to a person skilled in the relevant art given the description of the invention herein.

Figure 5A:
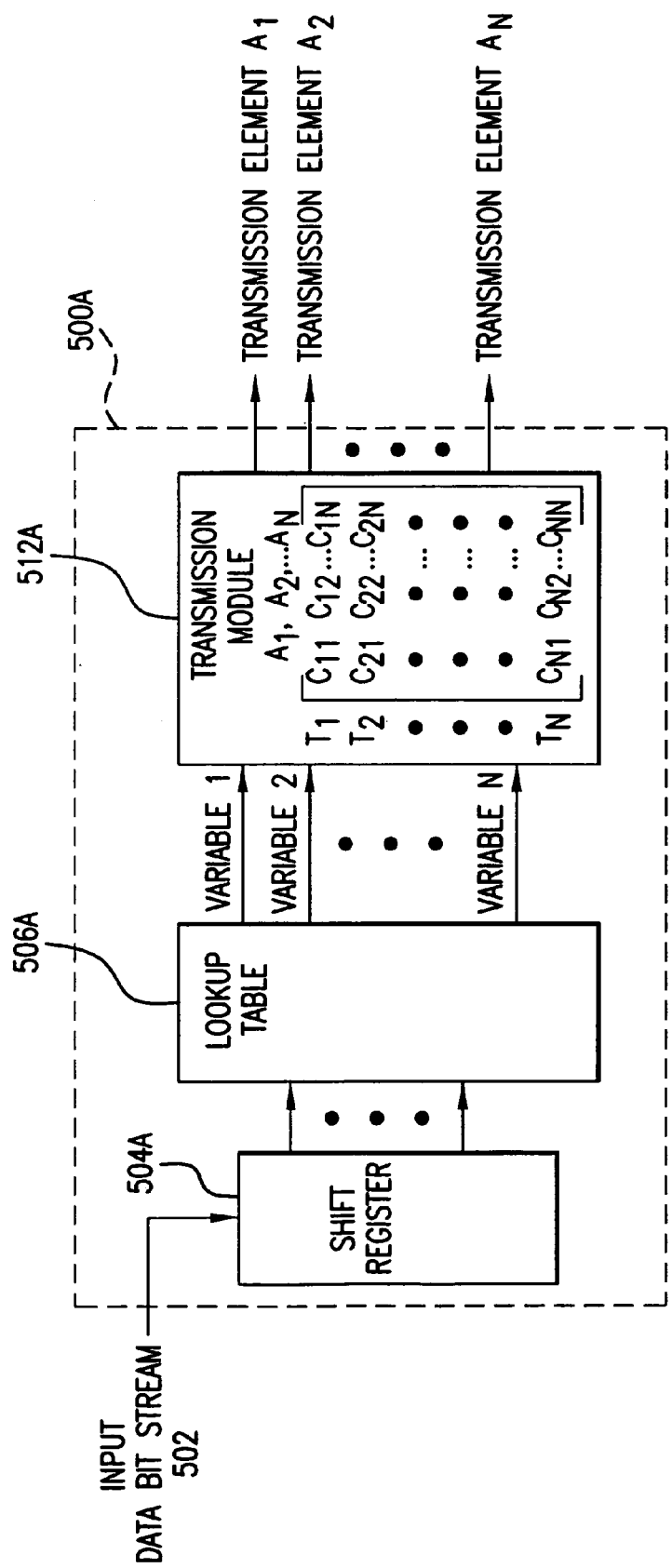
FIG. 5A illustrates an example encoder according to an embodiment of the invention.

FIG 5A. illustrates an example encoder 500A according to the invention. Encoder 500A is intended for use with a transmitter having "N" transmission elements. In an embodiment, encoder 500A comprises a buffer or shift register 504A, a lookup table 506A, and a transmission module 512A. As described herein, encoder 500A encodes input data bits using the enhanced codes of the invention.

During operation of encoder 500A, a group of input data bits is shifted into shift register 504A. These data bits are then provided to lookup table 506A as an input. Lookup table 506A uses the input data bits to determine at least N variables. These variables are referred to as transmission variables. These transmission variables are supplied to transmission module 512A. Transmission module 512A implements an N×N transmission matrix. In an embodiment, transmission module 512 operates on the transmission variables to form signals $\{C_{11}, C_{12}, \ldots C_{1N}, C_{21}, C_{22}, \ldots C_{2N}, \ldots C_{N1}, C_{N2}, \ldots C_{NN}\}$. Transmission module 512A outputs signal $C_{11}$ to transmission element $A_1$, signal $C_{12}$ to transmission element $A_2$ and signal $C_{1N}$ to transmission element $A_N$ at a time $T_1$. Transmission module 512A outputs signal $C_{21}$ to transmission element $A_1$, signal $C_{22}$ to transmission element $A_2$, and signal $C_{2N}$ to transmission element $A_N$ at a time $T_2$. Transmission module 512A outputs signal $C_{N1}$ to transmission element $A_1$, signal $C_{N2}$ to transmission element $A_2$, and signal $C_{NN}$ to transmission element $A_N$ at a time $T_N$.

Figure 5B:
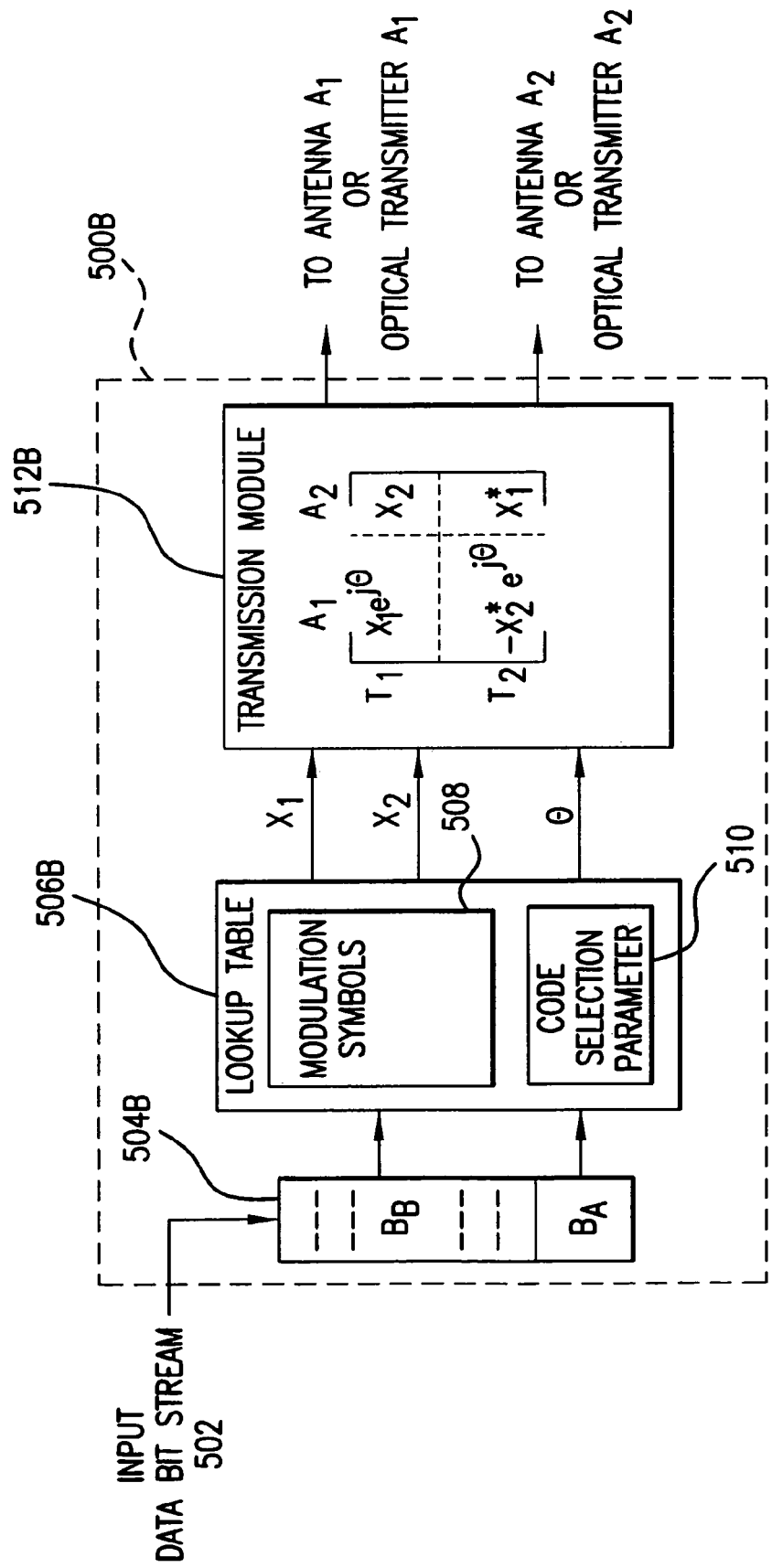
FIG. 5B illustrates a second example encoder according to an embodiment of the invention.

FIG 5B. illustrates a second example encoder 500B according to the invention. In an embodiment, encoder 500B comprises a buffer or shift register 504B, a lookup table 506B, and a transmission module 512B. As described below, encoder 500B encodes input data bits using a super-orthogonal space-time trellis code. As can be seen in FIG. 5B, encoder 500B is similar in operation to encoder 500A.

During operation of encoder 500B, two or more data bits from input data bit stream 502 are temporarily stored in shift register 504 at a time $T_0$. These bits are divided into two groups. The first group is referred to as state bit(s) $B_A$. The second group is referred to as modulation bit(s) $B_B$. The location of these bits in shift register 504 is unimportant. Thus, any group of bit(s) in shift register 504 can be used as the state bit(s) $B_A$. Similarly, any group of bit(s) in shift register 504 can be used as the modulation bit(s) $B_A$.

In an embodiment, lookup table 506 contains both modulation symbols (X1, X2) and code selection parameters (Θ). Both the state bit(s) and the modulation bit(s) stored in shift register 504 are provided to lookup table 506 as inputs. As describe in more detail below, in an embodiment, the modulation bit(s) are used to select modulation symbols X1 and X2, and the state bit(s) are used to select the code selection parameter Θ. These symbols (X1, X2, Θ) are referred to herein as transmission variables.

As shown in FIG. 5B, the transmission variables output from lookup table 506B are provided to transmission module 512B. Transmission module 512B operates on the transmission variables to form four signals $X_1 e^{j\Theta}$, $X_2$, $-X_2^* e^{j\Theta}$, and $X_1^*$. Transmission module 512B outputs signal $X_1 e^{j\Theta}$ to a first transmission element $A_1$ and signal $X_2$ to a second transmission element $A_2$ at a time $T_1$. Transmission module 512B then outputs signal $-X_2^* e^{j\Theta}$ to the first transmission element $A_1$ and signal $X_1^*$ to the second transmission element $A_2$ at a time $T_2$.

As will be understood by a person skilled in the relevant art given the description herein, any of the super-orthogonal space-time trellis codes described herein can be implemented using encoder 500A or encoder 500B.

Super-Orthogonal Space-Time Trellis Code Structures

In this section, the structures used to design the enhanced codes of the invention are described. These structures are illustrated in FIGS. 7–14.

Figure 6:
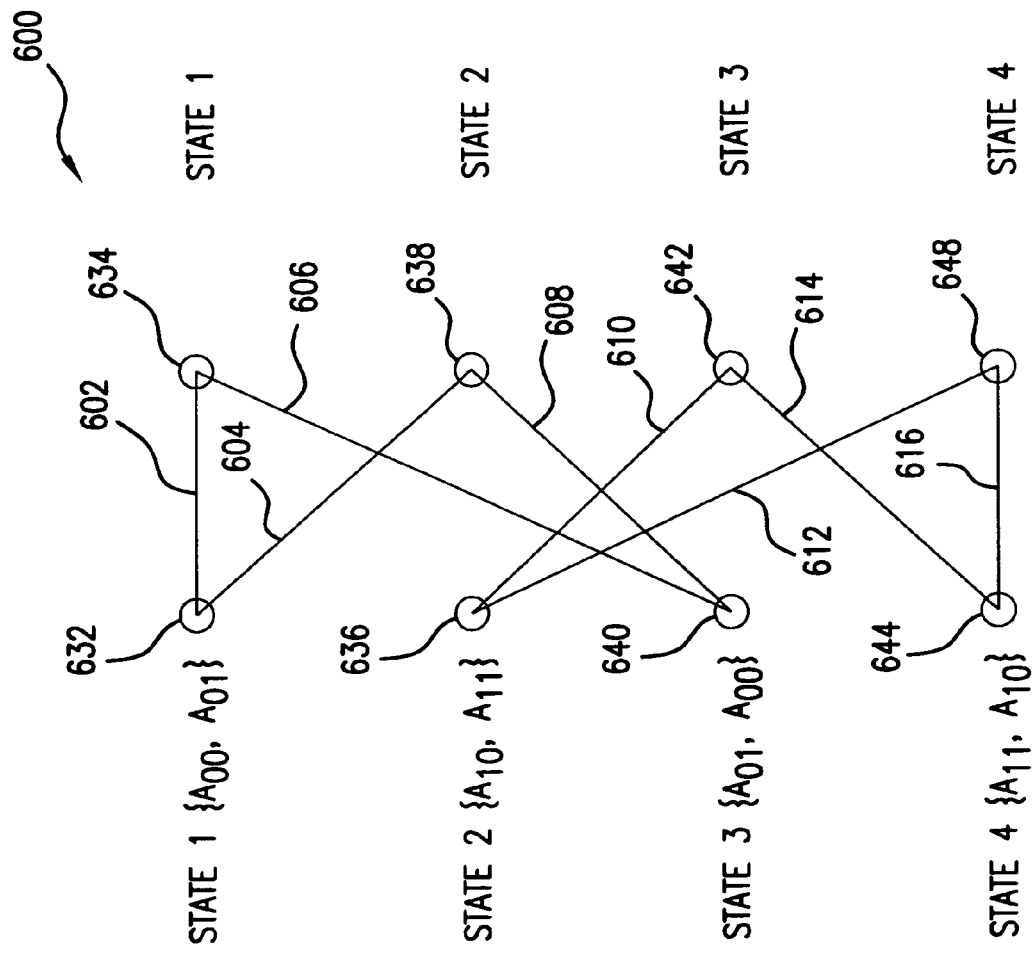
FIG. 6 illustrates a four-state trellis according to an embodiment of the invention.

Before describing the structures used to design the codes of the invention, it is important to clarify the notation used herein. FIG. 6 illustrates an example four-state trellis 600 used to design codes. The four states of trellis 600 are state 1, state 2, state 3, and state 4. As described in more detail below, state 1 is associates with set partitions $\{A_{00}, A_{01}\}$, state 2 is associates with set partitions $\{A_{10}, A_{11}\}$, state 3 is associates with set partitions $\{A_{01}, A_{00}\}$, and state 4 is associates with set partitions $\{A_{11}, A_{10}\}$.

Each state of trellis 600 is represented by two nodes. State 1 is represented by nodes 632 and 634. State 2 is represented by nodes 636 and 638. State 3 is represented by nodes 640 and 642. State 4 is represented by nodes 644 and 648. Transitions between the four states of trellis 600 can occur only along the lines that connect these nodes. For example, from state 1, it is possible to transition to state 1 along line 602 or to state 2 along line 604. It is not possible, however, to transition from state 1 to state 3 or state 4 because there is no line connecting node 632 to node 642 or node 648.

As will be understood by a person skilled in the relevant communications art given the discussion herein, one or more bits are typically used to determine transitions between the states of a trellis. For example, starting at state 1 of trellis 600, if a bit equal to 0 is received, the current state will change to state 1 along line 602, and if a bit equal to 1 is received, the current state will change to state 2 along line 604. Starting at state 2 of trellis 600, if a bit equal to 0 is received, the current state will change to state 3 along line 610, and if a bit equal to 1 is received, the current state will change to state 4 along line 612. Starting at state 3 of trellis 600, if a state bit equal to 0 is received, the current state will change to state 2 along line 608, and if a state bit equal to 1 is received, the current state will change to state 1 along line 606. Finally, starting at state 4 of trellis 600, if a bit equal to 0 is received, the current state will change to state 4 along line 616, and if a state bit equal to 1 is received, the current state will change to state 3 along line 614. These are the only state changes available for trellis 600.

Figure 7:
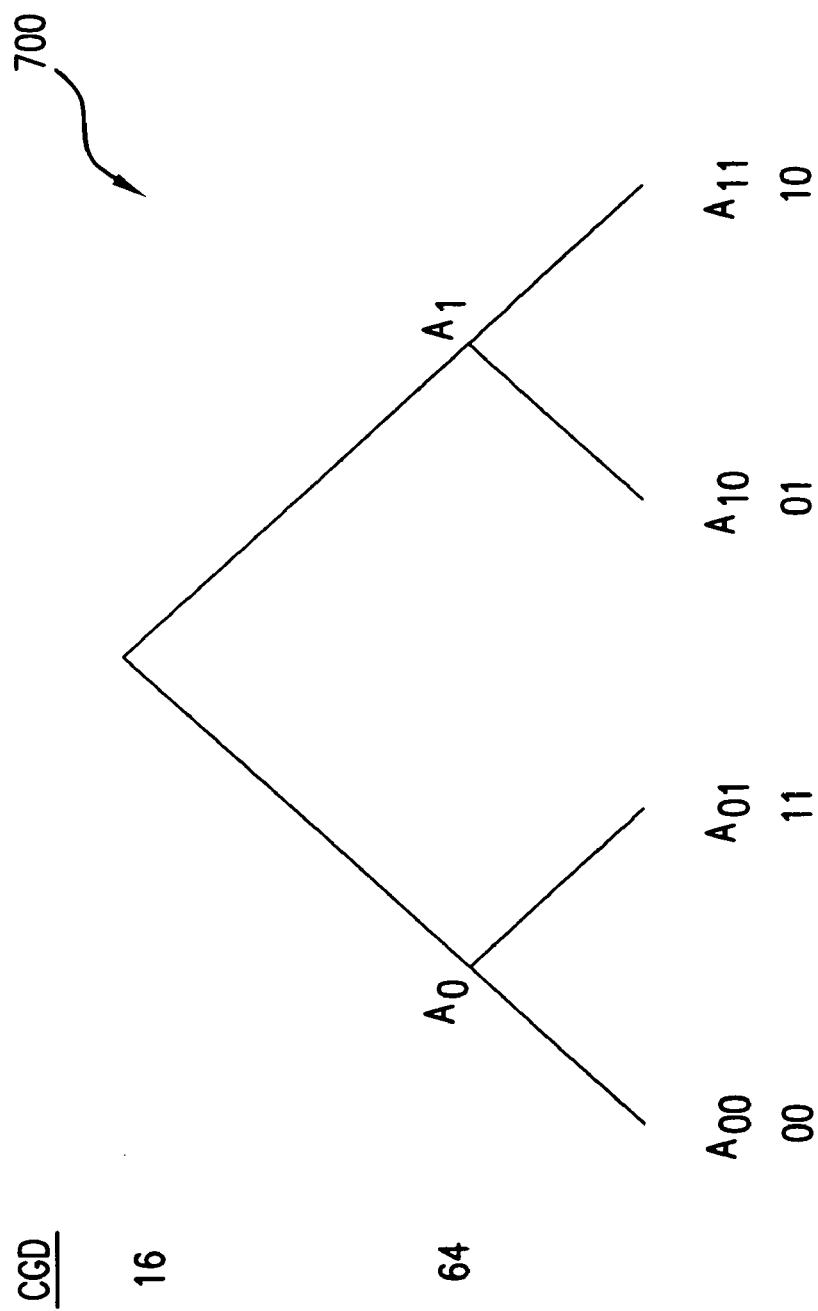
FIG. 7 illustrates a set partitioning for a BPSK telecommunications system according to an embodiment of the invention.

A second important structure used in code designs is a set partitioning structure. A set partitioning structure identifies all possible sets of modulation symbols associated with a given trellis state or state transition. For example, FIG. 7 illustrates a set partitioning structure 700 according to an embodiment the invention.

A first structure used to design the enhanced codes of the invention is set partitioning structure 700. Set partitioning structure 700 is intended for use in designing codes for BPSK communication systems. As shown in FIG. 7, there are six possible partitions of the four groups of symbols assigned to structure 700. Partition $A_0$ includes the symbols $\{00, 11\}$. These symbols are identified by tracing down the branches that originate from the node labeled $A_0$. As described below, group $\{00\}$ is one possible assignment for the transmission variables X1 and X2 (i.e, X1=0 and X2=0). Partition $A_1$ includes the symbols $\{01, 10\}$. These symbols are also identified by tracing down the branches that originate from the node labeled $A_1$. As described above, group $\{01\}$ is one possible assignment for the transmission variables X1 and X2 (i.e, X1=0 and X2=1). The other possible partitions of structure 700 are identified in a similar manner. Partition $A_{00}$ includes the symbols $\{00\}$. Partition $A_{01}$ includes the symbols $\{11\}$. Partition $A_{10}$ includes the symbols $\{01\}$. Partition $A_{11}$ includes the symbols $\{10\}$. How to use structure 700 to design enhanced codes according to the invention is more fully described below.

The assignment of states to a trellis structure is an important aspect of any code design that uses a trellis structure. Similarly, the partitioning of symbols is an important aspect of any code design that uses partitioning. Thus, as explained in more detail below, the states assigned to the partitions identified by the structures in FIGS. 7–9 and to the trellis structures in FIGS. 10–14 are important aspects of the invention. As described herein, when used in combination, these structures enable a person skilled in the relevant communications art to design super-orthogonal space-time trellis codes according to the invention.

The structures shown in FIGS. 8–14 will now be described.

Figure 8:
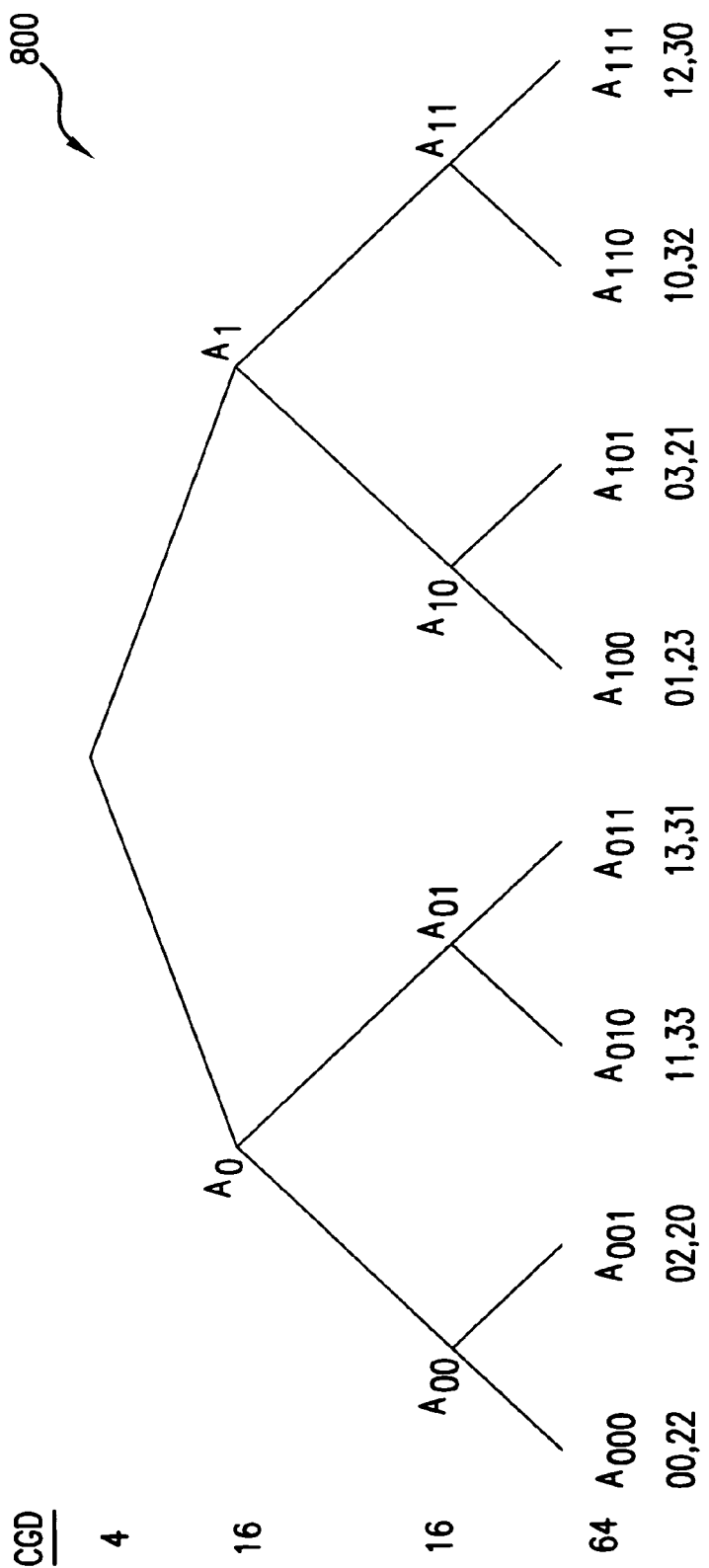
FIG. 8 illustrates a set partitioning for a QPSK telecommunications system according to an embodiment of the invention.

FIG. 8 illustrates a set partitioning structure 800 that is intended for use in designing codes for QPSK communication systems according to the invention.

As shown in FIG. 8, there are at least fourteen possible partitions of the groups of symbols assigned to structure 800. For example, partition $A_0$ includes the symbols $\{00, 22, 02, 20, 11, 33, 13, 31\}$. These symbols are identified by tracing down the branches that originate from the node labeled $A_0$. Partition $A_1$ includes the symbols $\{01, 23, 03, 21, 10, 32, 12, 30\}$. These symbols are also identified by tracing down the branches that originate from the node labeled $A_1$. Other possible partitions of structure 800 are identified, for example, by the labels $A_{00}$, $A_{01}$, $A_{10}$, and $A_{11}$. How to use structure 800 to design codes according to the invention is described more fully below.

Figure 9:
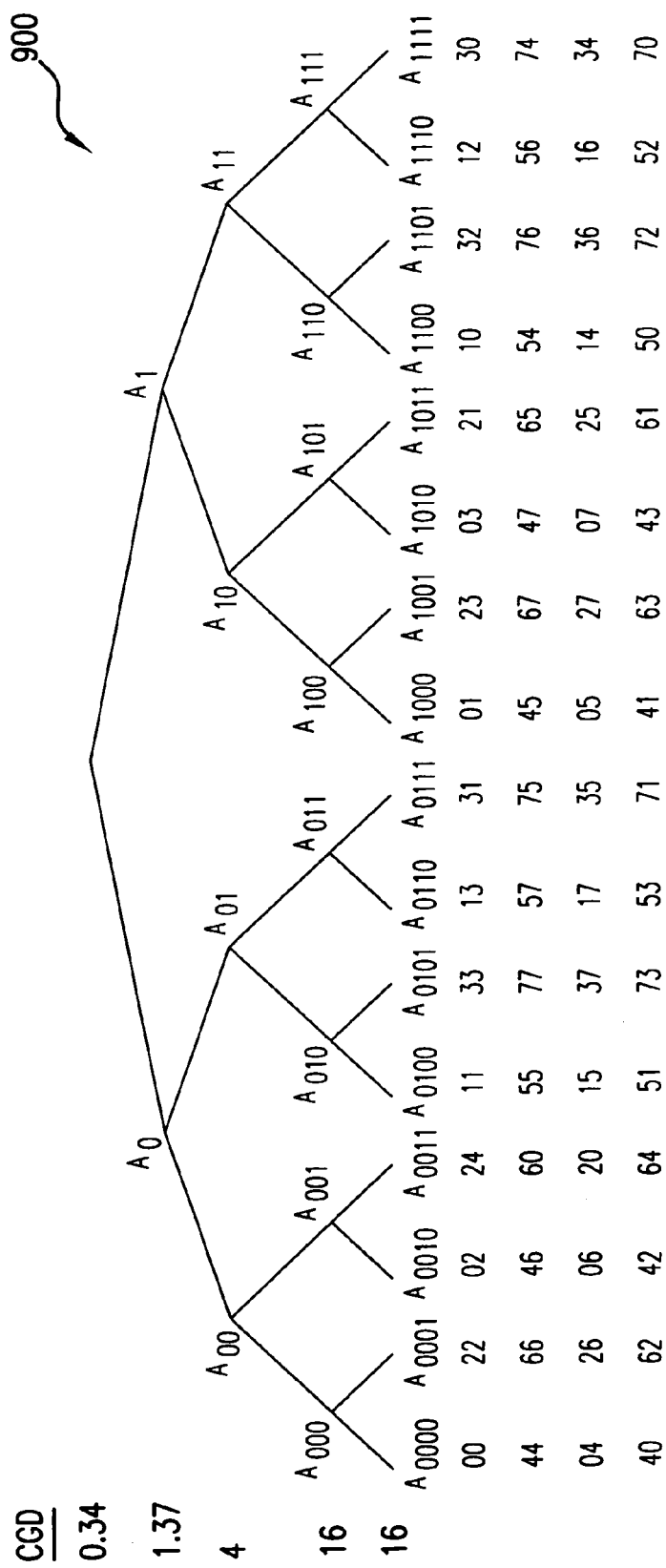
FIG. 9 illustrates a set partitioning for an 8-PSK telecommunications system according to an embodiment of the invention.

FIG. 9 illustrates a set partitioning structure 900 that is intended for use in designing codes for 8-PSK communication systems according to the invention. As shown in FIG. 9, there are at least thirty possible partitions of the groups of symbols assigned to structure 900. Partition $A_{00}$ includes the symbols $\{00, 44, 04, 40, 22, 66, 26, 62, 02, 46, 06, 42, 24, 60, 20, 64\}$. These symbols are identified by tracing down the branches that originate from the node labeled $A_{00}$. Other similar partitions include partitions $A_{01}$, $A_{10}$, and $A_{11}$. Partition $A_{01}$ includes the symbols $\{11, 55, 15, 51, 33, 77, 37, 73, 13, 57, 17, 53, 31, 75, 35, 71\}$. Partition $A_{10}$ includes the symbols $\{01, 45, 05, 41, 23, 67, 27, 63, 03, 47, 07, 43, 21, 65, 25, 61\}$. Partition $A_{11}$ includes the symbols $\{10, 54, 14, 50, 32, 76, 36, 72, 12, 56, 16, 52, 30, 74, 34, 70\}$. Other possible partitions are identified by the labels in FIG. 9.

Figure 10:
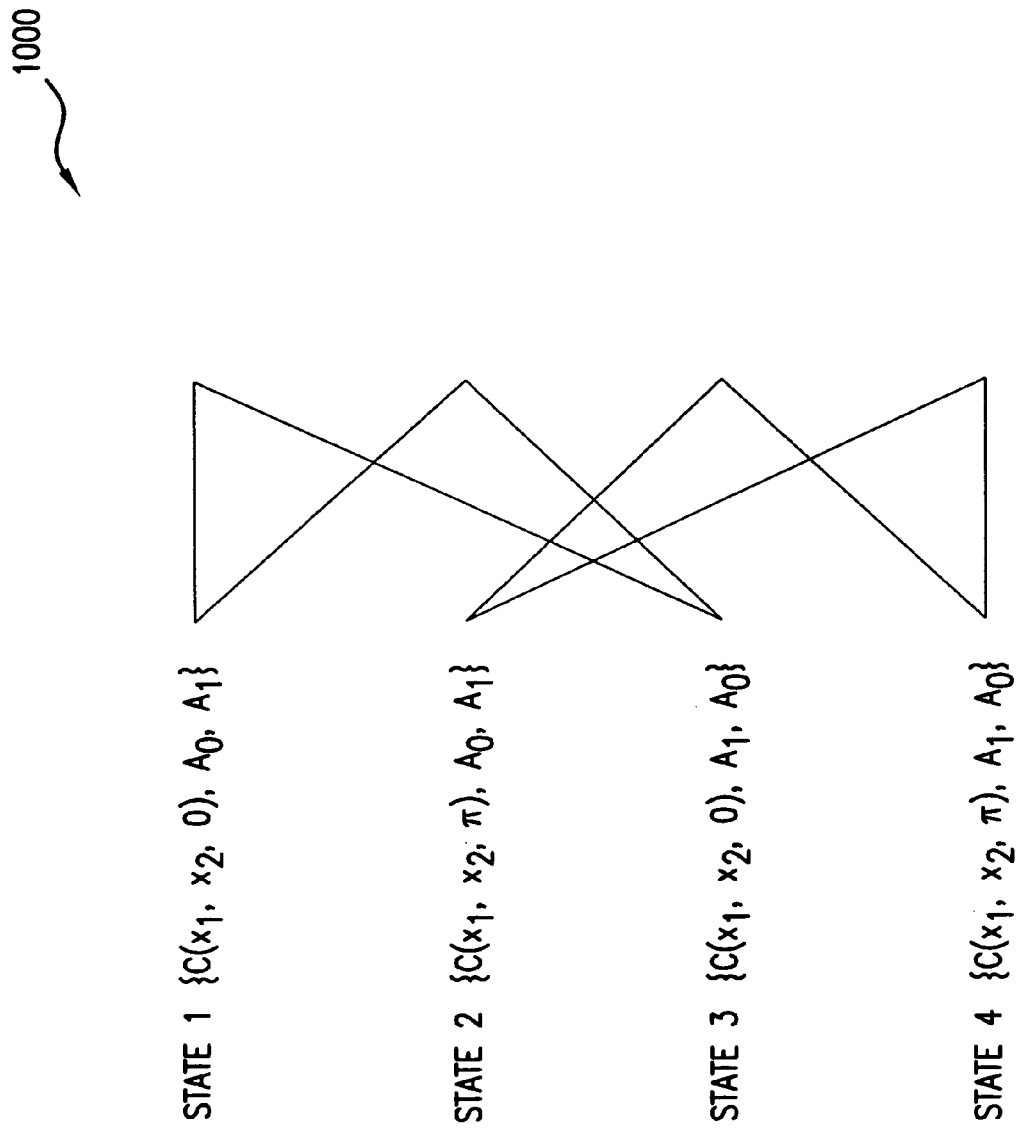
FIG. 10 illustrates a four-state trellis for designing a BPSK or a QPSK telecommunications system according to an embodiment of the invention.

FIG. 10 illustrates a four-state trellis structure 1000 used for designing codes for both BPSK and QPSK communication systems according to the invention. The four states of trellis structure 1000 are marked by the labels $\{C(X_1, X_2, 0), A_0, A_1\}$, $\{C(X_1, X_2, \pi), A_0, A_1\}$, $\{C(X_1, X_2, 0), A_1, A_0\}$, and $\{C(X_1, X_2, \pi), A_1, A_0\}$. As will become more clear below, the label $\{C(X_1, X_2, 0), A_0, A_1\}$ indicates that state 1 of trellis 1000 is associated with space-time block code $C(X_1, X_2, 0)$ and set partitions $A_0$ and $A_1$. The label $\{C(X_1, X_2, \pi), A_0, A_1\}$ indicates that state 2 of trellis 1000 is associated with space-time block code $C(X_1, X_2, \pi)$ and set partitions $A_0$ and $A_1$. The label $\{C(X_1, X_2, 0), A_1, A_0\}$ indicates that state 3 of trellis 1000 is associated with space-time block code $C(X_1, X_2, 0)$ and set partitions $A_1$ and $A_0$. The label $\{C(X_1, X_2, \pi), A_1, A_0\}$ indicates that state 4 of trellis 1000 is associated with space-time block code $C(X_1, X_2, \pi)$ and set partitions $A_1$ and $A_0$.

As described herein, trellis structure 1000 is typically used with set partitioning structures 700 and 800. Trellis structure 1000 is interpreted in a manner similar to that described above for trellis structure 600, as are the other trellis structures shown in FIGS. 11–14.

Figure 11:
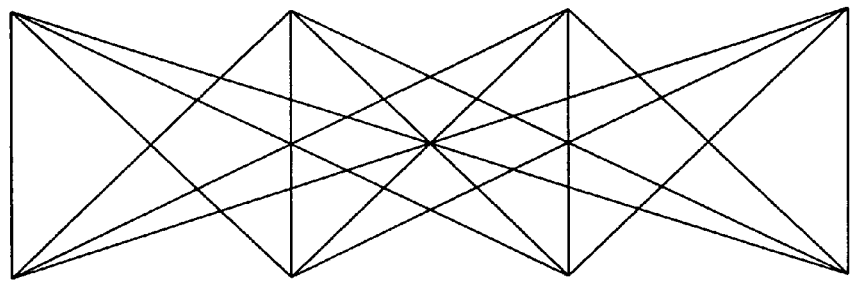
FIG. 11 illustrates a four-state trellis for designing an 8-PSK telecommunications system according to an embodiment of the invention.

FIG. 11 illustrates a four-state trellis structure 1100 used for designing codes for 8-PSK communication systems according to the invention. The four states of trellis structure 1100 are labeled $\{C(X_1, X_2, 0), A_{00}, A_{01}, A_{10}, A_{11}\}$, $\{C(X_1,$ $X_2, \pi/2), A_{00}, A_{01}, A_{10}, A_{11}\}$, $\{C(X_1, X_2, \pi), A_{00}, A_{01}, A_{10}, A_{11}\}$, and $\{C(X_1, X_2, 3\pi/2), A_{00}, A_{01}, A_{10}, A_{11}\}$. As described above, the label $\{C(X_1, X_2, 0), A_{00}, A_{01}, A_{10}, A_{11}\}$ indicates that state 1 of trellis 1100 is associated with space-time block code $C(X_1, X_2, 0)$ and set partitions $A_{00}$, $A_{01}, A_{10}$, and $A_{11}$. The label $\{C(X_1, X_2, \pi/2), A_{00}, A_{01}, A_{10}, A_{11}\}$ indicates that state 2 of trellis 1100 is associated with space-time block code $C(X_1, X_2, \pi/2)$ and set partitions $A_{00}$, $A_{01}, A_{10}$, and $A_{11}$. The label $\{C(X_1, X_2, \pi), A_{00}, A_{01}, A_{10}, A_{11}\}$ indicates that state 3 of trellis 1100 is associated with space-time block code $C(X_1, X_2, \pi)$ and set partitions $A_{00}$, $A_{01}, A_{10}$, and $A_{11}$. The label $\{C(X_1, X_2, 3\pi/2), A_{00}, A_{01}, A_{10}, A_{11}\}$ indicates that state 4 of trellis 1100 is associated with space-time block code $C(X_1, X_2, 3\pi/2)$ and set partitions $A_{00}, A_{01}, A_{10}$, and $A_{11}$. Trellis structure 1100 is typically used with set partitioning structure 900.

Figure 12:
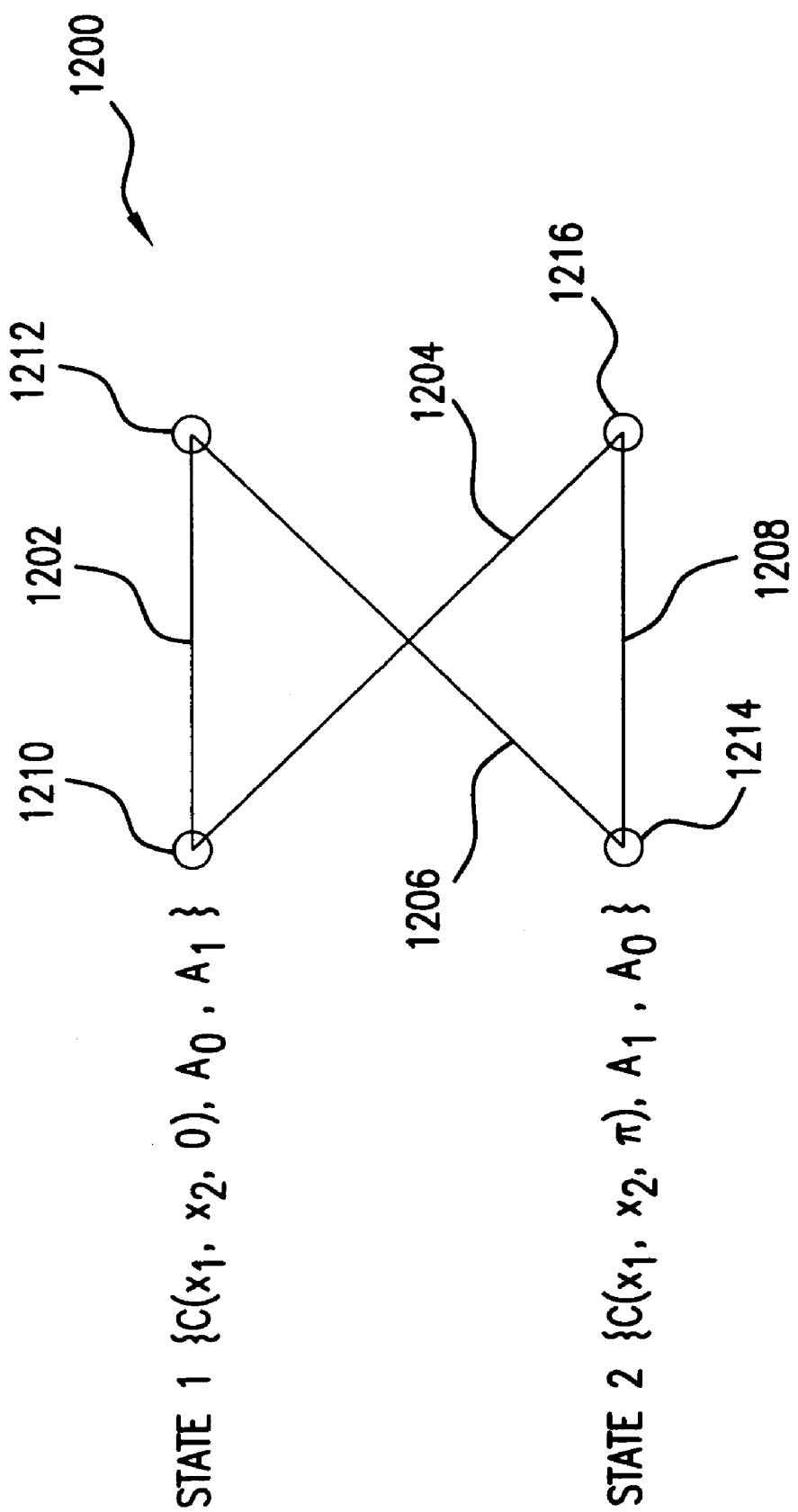
FIG. 12 illustrates a two-state trellis for designing a BPSK or a QPSK telecommunications system according to an embodiment of the invention.

FIG. 12 illustrates a two-state trellis structure 1200 used for designing codes for BPSK and QPSK communication systems according to the invention. The two states of trellis structure 1200 are labeled $\{C(X_1, X_2, 0), A_0, A_1\}$ and $\{C(X_1, X_2, \pi), A_1, A_0\}$. The label $\{C(X_1, X_2, 0), A_0, A_1\}$ indicates that state 1 of trellis 1200 is associated with space-time block code $C(X_1, X_2, 0)$ and set partitions $A_0$ and $A_1$. The label $\{C(X_1, X_2, \pi), A_1, 0_1\}$ indicates that state 2 of trellis 1200 is associated with space-time block code $C(X_1, X_2, \pi)$ and set partitions $A_1$ and $A_0$.

As noted above, trellis structure 1200 is interpreted in a manner similar to that described above for trellis structure 600. Trellis structure 1200 is typically used with set partitioning structures 700 and 800.

Figure 13:
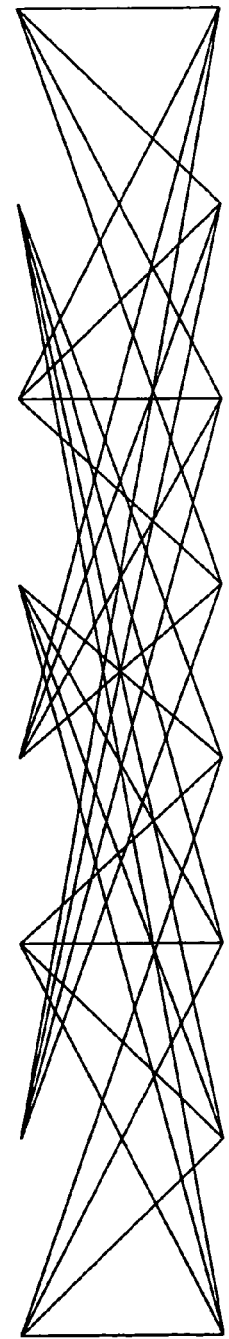
FIG. 13 illustrates an eight-state trellis for designing an 8-PSK telecommunications system according to an embodiment of the invention.

FIG. 13 illustrates an eight-state trellis structure 1300 used for designing codes for 8-PSK communication systems according to the invention. The eight states of trellis structure 1300 are labeled $\{C(X_1, X_2, 0), A_{00}, A_{01}, A_{10}, A_{11}\}$, $\{C(X_1, X_2, \pi/2), A_{00}, A_{01}, A_{10}, A_{11}\}$, $\{C(X_1, X_2, \pi), A_{00}, A_{01}, A_{10}, A_{11}\}$, $\{C(X_1, X_2, 3\pi/2), A_{00}, A_{01}, A_{10}, A_{11}\}$, $\{C(X_1, X_2, 0), A_{10}, A_{11}, A_{00}, A_{01}\}$, $\{C(X_1, X_2, \pi/2), A_{10}, A_{11}, A_{00}, A_{01}\}$, $\{C(X_1, X_2, \pi), A_{10}, A_{11}, A_{00}, A_{01}\}$, and $\{C(X_1, X_2, 3\pi/2), A_{10}, A_{11}, A_{00}, A_{01}\}$. How to interpret the meaning of these labels will be understood by a person skilled in the relevant art given the description herein. Trellis structure 1300 is typically used with set partitioning structure 900.

Figure 14:
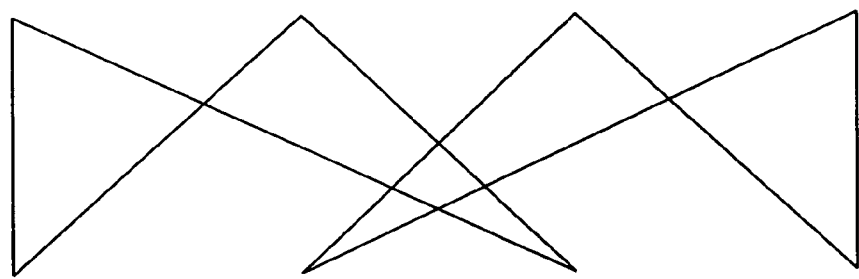
FIG. 14 illustrates a four-state trellis for designing an 8-PSK telecommunications system according to an embodiment of the invention.

FIG. 14 illustrates a four-state trellis structure 1400 used for designing codes for 8-PSK communication systems according to the invention. The four states of trellis structure 1400 are labeled $\{C(X_1, X_2, 0), A_{00}, A_{01}\}$, $\{C(X_1, X_2, \pi), A_{00}, A_{01}\}$, $\{C(X_1, X_2, 0), A_{10}, A_{00}\}$, and $\{C(X_1, X_2, \pi), A_{10}, A_{00}\}$. How to interpret the meaning of these labels will be understood by a person skilled in the relevant art given the description herein. Trellis structure 1400 is also typically used with set partitioning structure 900. Trellis structure 1400 can be used, however, with any set partitioning structure according to the invention, as can the other trellis structures described herein.

Method for Designing Super-Orthogonal Space-Time Trellis Codes

In this section, a method 1700 for designing enhanced codes according to the invention is described. Method 1700 is intended to be used for designing codes for diverse transmission communication systems. Method 1700 is described with reference to the structures illustrated in FIGS. 7–14, and with reference to the system embodiment features of the invention illustrated in FIGS. 1–5.

Method 1700 starts at step 1710. In step 1710, a designer selects a diversity factor for the communications system to be implemented. This diversity factor represents the number of transmission elements to be included in the transmitters of the system. In embodiments of the invention, a diversity factor of two is selected. For example, transmitter 200 shown in FIG. 2 has two transmission elements or antennas 216 and 224. Similarly, transmitter 404 shown in FIG. 4 has two transmission elements or optical transmitters 408 and 410. As illustrated by transmitter 104 in FIG. 1, however, a diversity factor greater than two may also be selected.

Often times, a designer will be asked to design a code for a preexisting communications system that uses transmitters having a set number of transmission elements. In these situations, the designer may omit step 1710 and start method 1700 at step 1720.

In step 1720, the designer selects a rate for the communications system or code to be implemented. In embodiments of the invention, a rate of 1, 2, or 3 bits/second/hertz is selected. The selected rate represents the number of bits transmitted in a given period of time.

Once the rate has been selected, other aspects of the communications system and code are fixed. For example, a rate of 1 bit/second/hertz means that the system will have a constellation size of 2 (a BPSK system). A rate of 2 bits/second/hertz means the system will have a constellation size of 4 (a QPSK system). A rate of 3 bits/second/hertz means that the system will have a constellation size of 8 (an 8-PSK system). In general, the constellation size (L) will equal $2^b$, where b represents the selected rate. Also, as described herein, once the rate is selected, the number of input bits provided to lookup table 506 is 2b. Thus, selecting a rate is an important design consideration.

In step 1730, the designer selects a number of states for the code. In embodiments of the invention, the number of states selected is 2, 4, or 8. Selecting a higher number of states for a given rate selection improves the performance of the code. For example, selecting a higher number of states will improve coding gain distance (CGD). How to determine CGD is described below. The CGD for set partitioning structures 700, 800, and 900 are shown in FIGS. 7, 8 and 9, respectively.

In step 1740, the designer selects a trellis structure according to the invention that has the number of states selected in step 1730. As described above, FIGS. 10–14 illustrates trellis structures that can be selected in this step of method 1700. The structure shown in FIGS. 10–14 are referred to herein as super-orthogonal space-time trellis structures. Trellis structure 1200 is a two-state trellis structure. It can be used, for example, to design both rate 1 bit/second/hertz and rate 2 bits/second/hertz communications systems according to the invention. Trellis structure 1000 is a four-state trellis structure. It can be used, for example, to design both rate 1 bit/second/hertz and rate 2 bits/second/hertz communications systems according to the invention. Trellis structure 1100 is another four-state trellis structure. It can be used, for example, to design rate 3 bits/second/hertz communications systems according to the invention. Trellis structure 1400 is also four-state trellis structure. It can be used, for example, to design rate 2.5 bits/second/hertz communications systems according to the invention. Trellis structure 1300 is an eight-state trellis structure. It can be used, for example, to design rate 3 bits/second/hertz communications systems according to the invention. Trellis structures other than the ones described herein can be designed in accordance with the invention, using the theory described below, and selected in step 1740.

In step 1750, a set partitioning structure according to the invention is selected that corresponds to the rate selected in step 1720. As described above, FIGS. 7–9 illustrates set partitioning structures according to the invention that may be selected in this step of method 1700. The structure shown in FIGS. 7–9 are referred to herein as super-orthogonal space-time code set partitioning structures. Set partitioning structure 700 is used, for example, for designing rate 1 bit/second/hertz codes. Set partitioning structure 800 is used, for example, for designing rate 2 bits/second/hertz codes. Set partitioning structure 900 is used, for example, for designing rate 3 bits/second/hertz codes. As above, set partitioning structures other than the ones described herein can be designed in accordance with the invention, using the theory described below, and selected in step 1750.

In step 1760, the trellis structure selected in step 1740 and the set partitioning structure selected in step 1750 are used to assign particular values to a set of transmission variable for each possible combination of input values. In order to illustrate this step, consider the following description relating to the design and implementation of a two-state, BPSK, super-orthogonal space-time trellis code according to the invention.

As will be understood by a person skilled in the relevant communications art given the description herein, method 1700 and encoder 500B can be used to implement a two-state, rate 1 bit/second/hertz code for use by transmitters having two transmission elements. These design constraints require that the designer pick a diversity factor of 2 in step 1710, a rate of 1 bit/second/hertz in step 1720, and 2 states for the code in step 1730. For this example, trellis structure 1200 is selected to design the code (step 1740) in combination with set partitioning structure 700 (step 1750). Trellis structure 1200 is a two-state trellis structure that can be used to design both rate 1 bit/second/hertz and rate 2 bits/second/hertz communications systems according to the invention. As described above, set partitioning structure 700 is used for designing rate 1 bit/second/hertz codes.

Selecting a rate of 1 bit/second/hertz means that 2 input bits are provided to lookup table 506B of encoder 500B at time $T_0$. The number of bits provided to lookup table 506B at time $T_0$ is dependent on the rate selected in step 1720. As described herein, one of these two input bits is designated as state bit $B_A$. The second input bit is designated as modulation bit $B_B$. In an embodiment, input bit $B_A$ is used to select transmission variable $\Theta$, while input bit $B_B$ is used to select the transmission variables X1 and X2. It makes no difference whether the first or the second bit entered into shift register 504B from input data bit stream 502 is designated as state bit $B_A$. Thus, for this example, the first of the two bits entered into shift register 504B is used as a state bit $B_A$.

As illustrated in FIG. 5B, the output of lookup table 506B is three transmission variables X1, X2, and $\Theta$. Trellis structure 1200 will now be used in combination with set partitioning structure 700 to assign particular values to transmission variable X1, X2, and $\Theta$ for each possible combination of input values.

The values assigned to transmission variable $\Theta$ are determined using trellis structure 1200. The value assigned to $\Theta$ for a particular set of inputs is a function of the current state of encoder 500B at time $T_0$ and the value of state bit $B_A$ provided to lookup table 506B at time $T_0$. For example, if at time $T_0$, encoder 500B is in state 1 (i.e., at node 1210) and state bit $B_A$ equals 0, the value output by lookup table 506B for $\Theta$ is 0. This will ensure that the encoder remains in state 1 as required by trellis structure 1200.

The value for $\Theta$ that is output by encoder 500B, for any set of inputs, can be determined using trellis structure 1200 if the state of encoder 500 and the value of state bit $B_A$ are known. Looking at trellis structure 1200, one can see that a state bit $B_A$ equal to 0 causes a transition from node 1210 (state 1) to node 1212 (state 1) along line 1202. This is indicated by the label used for state 1 at node 1210. The label $\{C(X_1, X_2, 0), A_0, A_1\}$ indicates that a transition along line 1202 is associated with partition subset $A_0$. This is because $A_0$ is the subset listed first after the function $C(X_1, X_2, 0)$ (i.e., code associated with state 1) and because line 1202 is the first line (from top to bottom of trellis structure 1200) exiting node 1210. By looking at set partition structure 700 (or the subscript of $A_0$) one can see that a 0-bit (i.e., state bit $B_A$ being equal to 0) is required to move down the branches of set partition structure 700 and arrive at subset $A_0$. From the combination of information provided by trellis structure 1200 and set partitioning structure 700, one is able to determine that, if at time $T_0$, encoder 500B is in state 1 (i.e., at node 1210) and state bit $B_A$ equals 0, the value output by lookup table 506B for $\Theta$ is 0 (i.e., the value for $\Theta$ specified by the label for the state, after making the transition indicated by the trellis structure 1200).

In the manner described above, one can use trellis structure 1200 and set partitioning structure 700 to determine the values of $\Theta$ that are output by lookup table 506B for a particular set of inputs. In accordance with trellis structure 1200, if encoder 500B is in state 1 and state bit $(B_A)$ equals 0 at time $T_0$, $\Theta$ is equal to 0. If encoder 500B is in state 1 and state bit $(B_A)$ equals 1 at time $T_0$, $\Theta$ is equal to $\pi$. If encoder 500B is in state 2 and state bit $(B_A)$ equals 0 at time $T_0$, $\Theta$ is equal to $\pi$. If encoder 500B is in state 2 and state bit $(B_A)$ equals 1 at time $T_0$, $\Theta$ is equal to 0.

For this example, the values for the transmission variables X1 and X2 are determined using trellis structure 1200 and set partitioning structure 700. As described above, each transition on trellis structure 1200 is associated with a particular subset of symbols identified at the bottom of set partitioning structure 700. For example, the label for state 1 at node 1210, i.e., $\{C(X_1, X_2, 0), A_0, A_1\}$, indicates that a transition along line 1204 is associated with the partition subset $A_1$. This is because $A_1$ is listed second after the function $C(X_1, X_2, 0)$ and because line 1204 is the second line (from top to bottom of trellis structure 1200) exiting node 1210. Using trellis structure 1200, one can determine that subset $A_0$ is associated with the transitions between nodes 1210 and 1212 along line 1202 and between nodes 1214 and 1216 along line 1208. Subset $A_1$ is associated with the transitions between nodes 1210 and 1216 along line 1204 and between nodes 1214 and 1212 along line 1206. As seen in FIG. 7, two groups of symbols 00 and 11 are associated with the subset $A_0$ and two groups of symbols 01 and 10 are associated with the subset $A_1$. One of the two groups of symbols in each subset is selected using modulation bit $B_B$. In an embodiment, the group of bits selected are chosen from left to right so that when modulation bit $B_B$ equals 0, group 00 or group 01 is selected, and when modulation bit $B_B$ equals 1, group 11 or group 10 is selected. The first bit of each selected group is assigned to the transmission variable X1, and the second bit of each selected group is assigned to the transmission variable X2.

Table 1 below can be constructed using trellis structure 1200 and set partitioning structure 700. Table 1 represents the encoding for the transmission variables of a two-state, 1 bit/second/hertz super-orthogonal space-time trellis code according to the invention. The structure of Table 1 can be implemented as lookup table 506B in encoder 500B.

TABLE 1

| | Input Variables | | Output Variables | | |
|---|---|---|---|---|---|
| State | $B_A$ | $B_B$ | X1 | X2 | Θ |
| 1 | 0 | 0 | 0 | 0 | 0 |
| 1 | 0 | 1 | 1 | 1 | 0 |
| 1 | 1 | 0 | 0 | 1 | π |
| 1 | 1 | 1 | 1 | 0 | π |
| 2 | 0 | 0 | 0 | 0 | π |
| 2 | 0 | 1 | 1 | 1 | π |
| 2 | 1 | 0 | 0 | 1 | 0 |
| 2 | 1 | 1 | 1 | 0 | 0 |

In accordance with method 1700, Table 2 can be constructed using trellis structure 1200 and set partitioning structure 800. Table 2 represents the encoding for the transmission variables of a two-state, 2 bits/second/hertz super-orthogonal space-time trellis code according to the invention. The structure of Table 2 can also be implemented as lookup table 506B in encoder 500B.

TABLE 2

| | Input Variables | | Output Variables | | |
|---|---|---|---|---|---|
| State | $B_A$ | $B_B$ | X1 | X2 | Θ |
| 1 | 0 | 000 | 0 | 0 | 0 |
| 1 | 0 | 001 | 2 | 2 | 0 |
| 1 | 0 | 010 | 0 | 2 | 0 |
| 1 | 0 | 011 | 2 | 0 | 0 |
| 1 | 0 | 100 | 1 | 1 | 0 |
| 1 | 0 | 101 | 3 | 3 | 0 |
| 1 | 0 | 110 | 1 | 3 | 0 |
| 1 | 0 | 111 | 3 | 1 | 0 |
| 1 | 1 | 000 | 0 | 1 | π |
| 1 | 1 | 001 | 2 | 3 | π |
| 1 | 1 | 010 | 0 | 3 | π |
| 1 | 1 | 011 | 2 | 1 | π |
| 1 | 1 | 100 | 1 | 0 | π |
| 1 | 1 | 101 | 3 | 2 | π |
| 1 | 1 | 110 | 1 | 2 | π |
| 1 | 1 | 111 | 3 | 0 | π |
| 2 | 1 | 000 | 0 | 1 | π |
| 2 | 1 | 001 | 2 | 3 | π |
| 2 | 1 | 010 | 0 | 3 | π |
| 2 | 1 | 011 | 2 | 1 | π |
| 2 | 1 | 100 | 1 | 0 | 0 |
| 2 | 1 | 101 | 3 | 2 | 0 |
| 2 | 1 | 110 | 1 | 2 | 0 |
| 2 | 1 | 111 | 3 | 0 | 0 |
| 2 | 0 | 000 | 0 | 0 | π |
| 2 | 0 | 001 | 2 | 2 | π |
| 2 | 0 | 010 | 0 | 2 | π |
| 2 | 0 | 011 | 2 | 0 | π |
| 2 | 0 | 100 | 1 | 1 | π |
| 2 | 0 | 101 | 3 | 3 | π |
| 2 | 0 | 110 | 1 | 3 | π |
| 2 | 0 | 111 | 3 | 1 | π |

In accordance with method 1700, Table 3 can be constructed using trellis structure 1300 and set partitioning structure 900. Table 3 represents the partial for the transmission variables of a four-state, 3 bits/second/hertz super-orthogonal space-time trellis code according to the invention. In particular, Table 3 shows the encoding for the inputs that cause a transition from state 1 to state 1 and from state 1 to state 2. Table 3 illustrates the use of trellis structure 1300 and set partitioning structure 900 for designing a code according to the invention.

TABLE 3

| | Input Variables | | Output Variables | | |
|---|---|---|---|---|---|
| State | $B_A$ | $B_B$ | X1 | X2 | Θ |
| 1 | 10 | 0000 | 0 | 1 | 0 |
| 1 | 10 | 0001 | 4 | 5 | 0 |
| 1 | 10 | 0010 | 0 | 5 | 0 |
| 1 | 10 | 0011 | 4 | 1 | 0 |
| 1 | 10 | 0100 | 2 | 3 | 0 |
| 1 | 10 | 0101 | 6 | 7 | 0 |
| 1 | 10 | 0110 | 2 | 7 | 0 |
| 1 | 10 | 0111 | 6 | 3 | 0 |
| 1 | 10 | 1000 | 0 | 3 | 0 |
| 1 | 10 | 1001 | 4 | 7 | 0 |
| 1 | 10 | 1010 | 0 | 7 | 0 |
| 1 | 10 | 1011 | 4 | 3 | 0 |
| 1 | 10 | 1100 | 2 | 1 | 0 |
| 1 | 10 | 1101 | 6 | 5 | 0 |
| 1 | 10 | 1110 | 2 | 5 | 0 |
| 1 | 10 | 1111 | 6 | 1 | 0 |
| 1 | 11 | 0000 | 1 | 0 | π/2 |
| 1 | 11 | 0001 | 5 | 4 | π/2 |
| 1 | 11 | 0010 | 1 | 4 | π/2 |
| 1 | 11 | 0011 | 5 | 0 | π/2 |
| 1 | 11 | 0100 | 3 | 2 | π/2 |
| 1 | 11 | 0101 | 7 | 6 | π/2 |
| 1 | 11 | 0110 | 3 | 6 | π/2 |
| 1 | 11 | 0111 | 7 | 2 | π/2 |
| 1 | 11 | 1000 | 1 | 2 | π/2 |
| 1 | 11 | 1001 | 5 | 6 | π/2 |
| 1 | 11 | 1010 | 1 | 6 | π/2 |
| 1 | 11 | 1011 | 5 | 2 | π/2 |
| 1 | 11 | 1100 | 3 | 0 | π/2 |
| 1 | 11 | 1101 | 7 | 4 | π/2 |
| 1 | 11 | 1110 | 3 | 4 | π/2 |
| 1 | 11 | 1111 | 7 | 0 | π/2 |

As will be understood by a person skilled in the relevant communications art given the description herein, method 1700 and the structures described herein can be used to systematically design a variety of super-orthogonal space-time trellis codes having full diversity and enhanced coding gain.

Detailed Theory of the Invention

In this section, the detailed theory of super-orthogonal space-time trellis codes is described.

Overview

An example of a full-rate, full-diversity complex space-time block code is a scheme proposed by Alamouti. (See S. M. Alamouti, "A simple transmitter diversity scheme for wireless communications," in *IEEE Journal on Selected Areas of Communications*, Vol. 16, pages 1451–1458 (November 1998), which is incorporated herein by reference in its entirety.) Alamouti's scheme is defined by the following transmission matrix:

$$C(x_1, x_2) = \begin{pmatrix} x_1 & x_2 \\ -x_2^* & x_1^* \end{pmatrix}. \quad (1)$$

The proposed scheme can be used for N=2 transmit antennas and any number of receive antennas. It transmits 2b bits every two symbol intervals, where the 2D constellation size is $L=2^b$. 2b bits arrive at an encoder and the encoder chooses 2 modulation symbols $s_1$ and $s_2$. Using $C(s_1, s_2)$, the encoder transmits $s_1$ from antenna one and $s_2$ from antenna two at time one. Then, the encoder transmits $-s_2^*$ from antenna one and $-s_1^*$ from antenna two at time two. The next 2b bits to arrive at the encoder determine what is transmitted at times three and four in a similar way. While this scheme provides diversity gain, it does not provide additional coding gain.

By concatenating an outer trellis code designed for an additive white Gaussian noise (AWGN) channel with a space-time block code, however, additional performance gain is obtained. To see this, consider each of the $2^{2b}$ orthogonal matrices generated by the space-time block code of EQ. (1) (i.e., Equation 1) as a 4D signal point (strictly speaking it is not 4D). The outer trellis code's task is to select on of the 4D signal points to be transmitted based on the current state and the 2b input bits. It has been shown that for a slow fading channel, the trellis code should be based on the set partitioning concepts of Ungerboeck codes for the AWGN channel. (See S. Alamouti et al., "Trellis-coded modulation and transmit diversity: design criteria and performance evaluation," *IEEE International Conference on Universal Personal Communications (ICUPC*-98), Vol. 2, pages 917–920 (1998), which is incorporated herein by reference in its entirety.) A shortcoming of this proposed scheme is that there is a rate loss associated with achieving any coding gain if the constituent 2D signal constellation size does not increase. Alternatively for the same rate, the basic 2D signal constellation size has to increase resulting in increased peak-to-average ratio. This is because neither this scheme nor the scheme of EQ. (1) are using all of the possible 4D constellations.

To elaborate, consider other codes that provide behaviors similar to those of EQ. (1) for the same rate and number of transmit antennas. The set of all such codes which only use $x_1$, $x_2$, and their conjugates with positive or negative signs are listed below:

$$\begin{pmatrix} x_1 & x_2 \\ x_2^* & -x_1^* \end{pmatrix}, \begin{pmatrix} -x_1 & x_2 \\ x_2^* & x_1^* \end{pmatrix}, \begin{pmatrix} x_1 & -x_2 \\ x_2^* & x_1^* \end{pmatrix}, \begin{pmatrix} x_1 & x_2 \\ x_2^* & -x_1^* \end{pmatrix},$$
$$\begin{pmatrix} -x_1 & -x_2 \\ x_2^* & -x_1^* \end{pmatrix}, \begin{pmatrix} -x_1 & x_2 \\ -x_2^* & -x_1^* \end{pmatrix}, \begin{pmatrix} x_1 & -x_2 \\ -x_2^* & -x_1^* \end{pmatrix}, \begin{pmatrix} -x_1 & -x_2 \\ -x_2^* & x_1^* \end{pmatrix}.$$

The union of all these codes is referred to herein as "super-orthogonal code" set C. Using just one of the constituent codes from C (e.g. the code in EQ. (1)) one cannot create all possible orthogonal 2×2 matrices for a given constellation. To make this point more clear, consider a BPSK constellation. It can be shown that one can build all possible 2×2 orthogonal matrices using two of the codes in C. For example, one can generate the following four 2×2 matrices using the code in EQ. (1):

$$\begin{pmatrix} 1 & 1 \\ -1 & 1 \end{pmatrix}, \begin{pmatrix} -1 & -1 \\ 1 & -1 \end{pmatrix}, \begin{pmatrix} -1 & 1 \\ -1 & -1 \end{pmatrix}, \begin{pmatrix} 1 & -1 \\ 1 & 1 \end{pmatrix}. \quad (2)$$

There are four other possible distinct orthogonal 2×2 matrices, which are listed below:

$$\begin{pmatrix} -1 & 1 \\ 1 & 1 \end{pmatrix}, \begin{pmatrix} 1 & -1 \\ -1 & -1 \end{pmatrix}, \begin{pmatrix} 1 & 1 \\ 1 & -1 \end{pmatrix}, \begin{pmatrix} -1 & -1 \\ -1 & 1 \end{pmatrix}, \quad (3)$$

To create these additional matrices, one can use the following code from the set C:

$$\begin{pmatrix} -x_1 & x_2 \\ x_2^* & x_1^* \end{pmatrix}. \quad (4)$$

A set that includes all 2×2 orthogonal matrices from (2) and (3) is referred to herein as set $S_2$. It is important to note that the rank of a matrix (which determines diversity) based on the difference between any two distinct matrices within either (2) or (3) is 2, but the rank of a matrix obtained by considering the difference between any two elements in (2) and (3) is 1.

Parameterized Class of Space-time Block Codes

In accordance with the present invention, the following class of orthogonal designs is used as transmission matrices:

$$C(x_1, x_2, \theta) = \begin{pmatrix} x_1 e^{j\theta} & x_2 \\ -x_2^* e^{j\theta} & x_1^* \end{pmatrix} \quad (5A)$$

Note that $\theta=0$ provides the code in EQ. (1). An objective of the invention is to use L-PSK constellation sets (i.e., PSK constellations containing L points) and design codes that do not expand the constellation signals. Since the transmitted signals are from a PSK constellation, e $j2\pi l/L$, l=0, 1, . . . , L, the peak-to-average power ratio of the transmitted signals is equal to one. Therefore, there is no need for an amplifier that provides a higher linear operation region. In order to achieve this, the invention uses $\theta=2\pi l'/L$, where l'=0, 1, . . . , L−1. For example, the invention uses $\theta=\{0, \pi\}$ and $\theta=\{0, \pi/2, \pi, 3\pi/2\}$ for BPSK and QPSK, respectively. By using $C(x_1, x_2, 0)$ and $C(x_1, x_2, \pi)$ for BPSK constellations, one can generate all 2×2 orthogonal matrices in $S_2$. In fact, $C(x_1, x_2, 0)$ is the code in (1) and $C(x_1, x_2, \pi)$ is the code in (4).

The invention is not limited to using the class of orthogonal designs indicated by EQ. (5A). For example, another class of designs that can be used as transmission matrices in accordance with the invention is:

$$C(x_1, x_2, \theta) = \begin{pmatrix} x_1 e^{j\theta} & x_2 e^{j\theta} \\ -x_2^* & x_1^* \end{pmatrix} \quad (5B)$$

Other designs will be known and understood by persons skilled in the relevant communications art given the description herein.

Set Partitioning

Following the definitions in Tarokh et al. for a full-diversity code (see V. Tarokh et al., "Space-time codes for high data rate wireless communications: Performance analysis and code construction," in *IEEE Trans. Inform. Theory*, Vol. 44, pages 744–765 (March 1998), which is incorporated herein by reference in its entirety), the minimum of the determinant of the matrix $A(c_1, c_2)=B(c_1, c_2)B^*(c_1, c_2)$ over all possible pairs of distinct codewords $c_1$ and $c_2$ corresponds to the coding gain. The coding gain distance (CGD) between codewords $c_1$ and $c_2$ is defined herein as $d^2(c_1, c_2)=|A(c_1, c_2)|$ (in general if instead of a full-diversity, N, we have a code with diversity r<N, the distance can be defined as the $r^{th}$ root of the sum of the determinants of all r×r principal cofactors of $A(c_1, c_2)$). CGD is used herein, instead of Euclidean distance, to define a set partitioning similar to Ungerboeck's set partitioning. (See G. Ungerboeck, "Channel coding for multilevel/phase signals," in *IEEE Trans. Inform. Theory* Vol. 28, pages 55–67 (January 1982), which is incorporated herein by reference in its entirety.)

Consider now a case where one utilizes only the code of EQ. (1). One can use a multiple trellis-coded modulation (MTCM) scheme (see D. Divsalax et al., "Multiple trellis coded modulation (MTCM)," *IEEE Trans. Communications*, Vol. 36, pages 410–419 (April 1988), which is incorporated herein by reference in its entirety) and assign the code in EQ. (1) with two specific constellation symbols to each trellis path. (See S. Alamouti et al., "Trellis-coded modulation and transmit diversity: design criteria and performance evaluation," *IEEE International Conference on Universal Personal Communications (ICUPC-98)*, Vol. 2, pages 917–920 (1998)). Assuming one uses a PSK constellation with L signals, each signal can be represented by $$s = e^{\frac{j2\pi l}{L}},$$

l=0, 1, . . . , L or $s=e^{jl\Omega}$, where $$\omega = \frac{2\pi}{L}.$$

Now consider two distinct sets of constellation symbols $(s_1^1=e^{jk_1\Omega}, s_2^1=e^{jl_1\Omega})$ and $(s_1^2=e^{jk_2\Omega}, s_2^2=e^{jl_2\Omega})$ to calculate B and A. For parallel transitions in a trellis, B and A are given by EQs. (6) and (7), respectively.

$$B = \begin{pmatrix} e^{jk_1\omega} - e^{jk_2\omega} & e^{jl_1\omega} - e^{jl_2\omega} \\ e^{-jl_2\omega} - e^{-jl_1\omega} & e^{-jk_1\omega} - e^{-jk_2\omega} \end{pmatrix}, \quad (6)$$

$$A = BB^* = \begin{pmatrix} 4 - 2\cos[\omega(k_2 - k_1)] - 2\cos[\omega(l_2 - l_1)] & 0 \\ 0 & 4 - 2\cos[\omega(k_2 - k_1)] - 2\cos[\omega(l_2 - l_1)] \end{pmatrix}. \quad (7)$$

Using EQ. (7), one can show that $$|A| = \{4 - 2\cos[\Omega(k_2-k_1)] - 2\cos[\Omega(l_2-l_1)]\}^2. \quad (8)$$

Now, if there are two codewords which differ in P sets of constellation symbols, it can be shown that $A_{12}=A_{21}=0$. Also, if for the first codeword, one denotes the set of constellation symbols by $(s_1^1, s_2^1)^p=(e^{jk_1^p\Omega}, e^{jl_1^p\Omega})$, p=0, 1, . . . , P and for the second codeword, one denotes the set of constellation symbols by $(s_1^1, s_2^2)^p=(e^{jk_2^p\Omega}, e^{jl_2^p\Omega})$, p=0, 1, . . . , P then $$|A| = \left\{ \sum_{p=1}^{P} 4 - 2\cos[\omega(k_2^p - k_1^p)] - 2\cos[\omega(l_2^p - l_1^p)] \right\}^2 \quad (9)$$

Note that each term in the sum is non-negative and therefore $$|A| = \left\{ \sum_{p=1}^{P} 4 - 2\cos[\omega(k_2^p - k_1^p)] - 2\cos[\omega(l_2^p - l_1^p)] \right\}^2 \quad (10)$$

$$\geq \sum_{p=1}^{P} \{4 - 2\cos[\omega(k_2^p - k_1^p)] - 2\cos[\omega(l_2^p - l_1^p)]\}^2.$$

The performance of this code depends on the choice of trellis, constellation set, and set partitioning. As an example, consider the four-state trellis of FIG. 6. If one uses the code of EQ. (1) and an L-PSK constellation, one can generate $2^{2b}$ orthogonal 2×2 matrices ($L=2^b$). Dividing these matrices into four sets provides a rate b/2 bits/sec/Hz space-time trellis code. This is similar to the second Alamouti scheme, noted above, which can only transmit a rate that is half of the maximum possible rate. (See V. Tarokh, et al., "Space-time codes for high data rate wireless communications: performance analysis and code construction," *IEEE Trans. Inform. Theory*, Vol. 44, pages 744–765 (March 1998), which is incorporated herein by reference in its entirety.) Based on the coding distances calculated in EQs. (8) and (9), one can show that the coding gain of such a space-time trellis code is dominated by parallel transitions.

The optimal set partitioning for BPSK, QPSK, and 8-PSK are illustrated in FIGS. 7, 8, and 9, respectively. As can be seen from these Figures, the minimum CGD increases (or remains the same) as one goes down each level in the tree. As described herein, the branches at each level can be used to design a trellis code with a specific rate. This set partitioning, in addition to the known rules for designing an MTCM, provides a class of space-time trellis codes. This is a different approach for designing the codes then that presented by Alamouti (i.e., using an MTCM scheme concatenated with the Alamouti code).

Super-orthogonal Space-time Trellis Codes

FIGS. 10–14 illustrate examples of super-orthogonal space-time trellis codes according to the invention. In these figures, $C(x_1, x_2, 0)$ represents the particular member of a parameterized space-time block code which is used at a specific state. The corresponding sets from the set partitioning structures of FIGS. 7–9 are shown next to each state. FIG. 10 shows an example of a super-orthogonal space-time trellis code. In this example, one can use BPSK and the corresponding set partitioning in FIG. 7. $C(x_1, x_2, 0)$ is used when departing from states zero and two, and $C(x_1, x_2, \pi)$ is used when departing from states one and three. Note that, with this structure, one has eight possible orthogonal 2×2 matrices instead of four which allows one to design a full-rate code. The CGD of this code is 64 which can be found in FIG. 7 and Table 4. In next section, it is shown that parallel transitions are dominant in calculating the CGD for this code.

Codes with different number of states and at different rates can be systematically designed using the set partitioning in FIGS. 7–9 by applying the general well-known rules defined in Ungerboeck and Divsalax to design MTCM schemes. (See G. Ungerboeck, "Channel coding for multilevel/phase signals," *IEEE Trans. Inform.* Theory, Vol. 28, pages 55–67 (January 1982); and D. Divsalax et al., "Multiple trellis coded modulation (MTMC)," *IEEE Trans. Communications*, Vol. 36, pages 410–419 (April 1988), both of which are incorporated herein by reference in their entirety.) While the examples herein focus on the design of full-rate codes, in general, codes with lower rates can be designed to provide higher CGDs. The trellis structure of FIG. 14 is one example of a 4-state, rate 2.5 bits/sec/Hz code using 8-PSK with a CGD of 4. Based on the description herein, a person skilled in the relevant art will understand how to use the invention to design other lower rate codes that provided higher CGDs.

Table 4 below tabulates the CGDs of the super-orthogonal space-time trellis codes described herein, and compares them to corresponding codes from Tarokh. (See V. Tarokh, et al., "Space-time codes for high data rate wireless communications: performance analysis and code construction," *IEEE Trans. Inform. Theory*, Vol. 44, pages 744–765 (March 1998)).

CGD Analysis

In this section, the coding gain of different super-orthogonal space-time trellis codes according to the invention are derived. The main results in this section, which provide the dominant path for the CGD calculation in the trellis, depend on the choice of the trellis. The constellation would only affect the final value of the CGD. The approach herein is general enough to be extended to other trellises in the literature.

Consider the trellis in FIG. 6, which corresponds to the codes of FIG. 10. Note that when there are parallel transitions between two states. A different path is assigned to each possible constellation matrix (symbols), which is defined by the set partitioning in FIGS. 7–9. Two codewords may only differ in P=1 set of constellation symbols. However, due to the structure of the trellis, it is impossible to have two codewords which differ in two sets of constellation symbols (P=2). Because, for example, if two codewords diverge from state zero, they have to go through at least 3 paths to reconverge. Therefore, the shortest value of P excluding parallel transitions is three. The following Lemma is used to calculate the CGD.

Lemma 1: For the codes of FIG. 10, the minimum value of the CGD when P=3 is greater than the minimum value of the CGD when P=1.

Proof. Without loss of generality one can assume two codewords diverging from state zero and reconverging after P paths to state zero. For parallel transitions (P=1), one can calculate the CGD from EQ. (8). In this case, min $|A|$=64 for the rate 1 bit/second/hertz code of FIG. 10 and 16 for the rate 2 bits/second/hertz code of FIG. 10. For P=3, consider a typical case where the first codeword stays at state zero. For the second codeword, the first and third transitions (diverging and converging to state zero) use $C(x_1, x_2, 0)$ and the second transition uses $C(x_1, x_2, \pi)$. It can be shown that $$|A|=\{4-2\cos[\Omega(k_2^1-k_1^1)]-2\cos[\Omega(l_2^1-l_1^1)]+4-2\cos[k_2^3-k_1^3]-2\cos[\Omega(l_2^3-l_1^3)]+4+2\cos[\Omega(k_2^2-k_1^2)]-2\cos[\Omega(l_2^2-l_1^2)]\}\{4-2\cos[\Omega(k_2^1-k_1^1)]-2\cos[\Omega(l_2^1-l_1^1)]+4-2\cos[\Omega(k_2^3-k_1^3)]-2\cos[\Omega(l_2^3-l_1^3)]+4-2\cos[\Omega(k_2^2-k_1^2)]+2\cos[\Omega(l_2^2-l_1^2)]\}-8(1+\cos[\Omega(k_2^2-k_1^2+l_1^2-l_2^2)]). \quad (11)$$

If one defines $$a=4-2\cos[\Omega(k_2^1-k_1^1)]-2\cos[\Omega(l_2^1-l_1^1)],$$

$$c=4-2\cos[\Omega(k_2^3-k_1^3)]-2\cos[\Omega(l_2^3-l_1^3)],$$

$$b_1=4+2\cos[\Omega(k_2^2-k_1^2)]-2\cos[\Omega(l_2^2-l_1^2)],$$

$$b_2=4-2\cos[\Omega(k_2^2-k_1^2)]+2\cos[\Omega(l_2^2-l_1^2)],$$

$$d=8(1+\cos[\Omega(k_2^2-k_1^2+l_1^2-l_2^2)]),$$

then $$|A|=(a+b_1+c)(a+b_2+c)-d, \quad (12)$$

where $a$, $b_1$, $b_2$, $c$, $d \geq 0$.

This gives $$\min |A| \geq (\min a + \min b_1 + \min c)(\min a + \min b_2 + \min c) - \max d, \quad (13)$$

For the 1 bit/second/hertz code of FIG. 10, min a=min c=4, min $b_1$=min $b_2$=4, and max d=16. Therefore, $$\min |A| \geq 128 \quad (14)$$

Also, for $k_2^1=k_1^{1=l_1^1}=k_2^2=k_1^2=l_1^2=l_2^2=k_2^3=k_1^3=l_1^3=0$ and $l_2^1=l_2^3=1$ we have $|A|=128$ which means $$\min |A| \leq 128 \quad (15)$$

Combining inequalities (14) and (15) provides $$\min |A|=128 \quad (16)$$

which is greater than 64.

For the 2 bits/second/hertz code of FIG. 10, min a=min c=2, min $b_1$=min $b_2$=4, and max d=16. Therefore, $$\min |A| \geq 48 \quad (17)$$

which is greater than 16.

Corollary 1: The coding gain of the 1 bit/second/hertz code of FIG. 10 is 8.

Proof. It is easy to show that for any two codewords that differ in more than 3 paths (P>3) there are three transitions similar to the ones in the proof of Lemma IV.1. Also, calculating $|A|$ shows that the extra transitions can only add to the CGD positively. Therefore, the minimum value of the CGD when P>3 is greater than the minimum value of the CGD when P=3. This proves that the minimum CGD for the 1 bit/second/hertz code of FIG. 10 is dominated by parallel transitions and is equal to 64. Therefore, the coding gain is 8.

Corollary 2: The coding gain of the 2 bits/second/hertz code of FIG. 10 is 4.

Proof. Using the same argument as the one in the proof of last corollary, the minimum CGD for the code is dominated by parallel transitions and is equal to 16. Therefore, the coding gain is 4.

Note that specific codes are considered herein for clarity of presentation. One can show similar results for any trellis for which it is impossible to diverge from a state and reconverge to the same state in P=2 transitions. For the trellises which allow such a transition, consider the following Lemma.

Lemma 2: For the codes of FIGS. 11 and 13, the minimum value of the CGD when P=1 is greater than the minimum value of the CGD when P=2.

Proof: Without loss of generality one can assume two codewords diverging from state zero and reconverging after P paths to state zero. For parallel transitions (P=1), one can calculate the CGD from EQ. (8). In this case, min $|A|$=4. For P=2, consider a typical case where the first codeword stays at state zero. For the second codeword, the first transition diverging from state zero uses $C(x_1, x_2, 0)$ and the second transition converging to state zero uses $C(x_1, x_2, \theta)$, $\theta = \pi/2$, $\pi$, $3\pi/2$. It can be shown that $$|A| = \{4 - 2\cos[\omega(k_2^1 - k_1^1)] - 2\cos[\omega(l_2^1 - l_1^1)] + \quad (20)$$
$$4 - 2\cos[\omega(k_2^2 - k_1^2)] - 2\cos[\omega(l_2^2 - l_1^2)]\}$$
$$\{4 - 2\cos[\omega(k_2^1 - k_1^1)] - 2\cos[\omega(l_2^1 - l_1^1)] + 4 -$$
$$2\cos[\omega(k_2^2 - k_1^2) - \theta] + 2\cos[\omega(l_2^2 - l_1^2)] - \theta\} -$$
$$(2 - 2\cos\theta)(2 - 2\cos[\omega(k_2^2 - k_1^2 + l_1^2 - l_2^2)]).$$

If one defines $a = 4 - 2\cos[\Omega(k_2^1 - k_1^1)] - 2\cos[\Omega(l_2^1 - l_1^1)]$, $b_1 = 4 - 2\cos[\Omega(k_2^2 - k_1^2)] - 2\cos[\Omega(l_2^2 - l_1^2)]$, $b_2 = 4 - 2\cos[\Omega(k_2^2 - k_1^2) - \theta] + 2\cos[\Omega(l_2^2 - l_1^2) - \theta]$, $d = (2 - 2\cos\theta)(2 - 2\cos[\Omega(k_2^2 - k_1^2 + l_1^2 - l_2^2)])$, then $$|A| = (a+b_1)(a+b_2) - d = a^2 + a(b_1+b_2) + b_1 b_2 - d, \quad (21)$$

where $a, b_1, b_2, d \geq 0$. This gives $$\min |A| = (\min a)^2 + \min[(\min a)(b_1 + b_2) + b_1 b_2 - d]. \quad (22)$$

This is due to the fact that $a$ depends on $(k_2^1, k_1^1, l_2^1, l_1^1)$ while $b_1$, $b_2$, $d$ are independent of $(k_2^1, k_1^1, l_2^1, l_1^1)$. Since $\min a = 0.5858$, one has $$\min |A| = 0.3431 + \min[0.5858(b_1 + b_2) + b_1 b_2 - d] \quad (23)$$
$$= 2.54 < 4.$$

Corollary 3: The coding gain of the codes of FIGS. 11 and 13 is 1.59.

Proof: It is easy to show that for any two codewords that differ in more than 2 paths (P>2) there are two transitions similar to the ones in the proof of Lemma IV.2. Also, calculating |A| shows that the extra transitions can only add to the CGD positively. This proves that the minimum CGD is dominated by paths with P=2 transitions and is equal to 2.54. Therefore, the coding gain is 1.59.

TABLE 4

| FIG. | No. of states | rate (bits/sec/Hz) | CGD | CGD in (Tarokh et al., IEEE Trans. Inform. Theory 44: 744–765 (1998)) |
|---|---|---|---|---|
| 10 | 4 | 1 | 64 | — |
| 10 | 4 | 2 | 16 | 4 |
| 11 | 4 | 3 | 2.54 | — |
| 12 | 2 | 1 | 48 | — |
| 12 | 2 | 2 | 12 | — |
| 13 | 8 | 3 | 2.54 | 2 |
| 14 | 4 | 2.5 | 4 | — |

Simulation Results

In this section, simulation results for super-orthogonal space-time trellis codes (SOSTTCs), using two transmit antennas and one receive antenna, are provided. These results are compared to results of similar corresponding space-time trellis codes (STTCs) from Tarokh, when a comparable code exists. (See V. Tarokh, et al., "Space-time codes for high data rate wireless communications: performance analysis and code construction," *IEEE Trans. Inform. Theory*, Vol. 44, pages 744–765 (March 1998)). In all simulations, similar to the results in Tarokh, a frame consists of 130 transmissions out of each transmit antenna.

Figure 15:
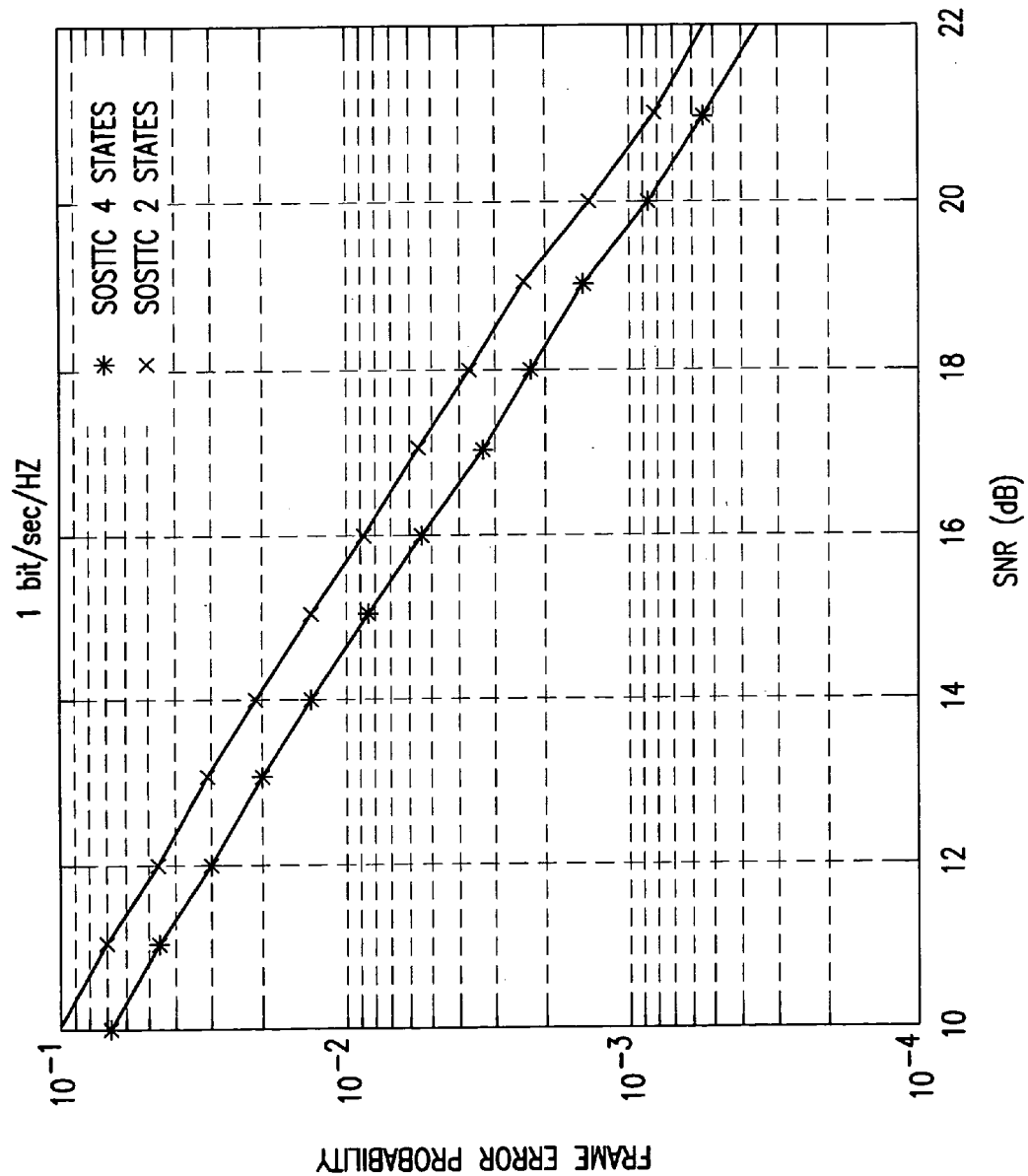
FIG. 15 illustrates simulation results for BPSK telecommunications system according to embodiments of the invention.

FIG. 15 shows the frame error probability results versus signal-to-noise ratio (SNR) for the 1 bit/second/hertz codes in FIGS. 10 and 12. Both of these codes are full-rate and transmit 1 bit/second/hertz using a BPSK constellation. Note that one cannot design such a code using the scheme of Alamouti. (See S. Alamouti et al., "Trellis-coded modulation and transmit diversity: design criteria and performance evaluation," *IEEE International Conference on Universal Personal Communications* (ICUPC-98), Vol. 2, pages 917–920 (1998).)

Figure 16:
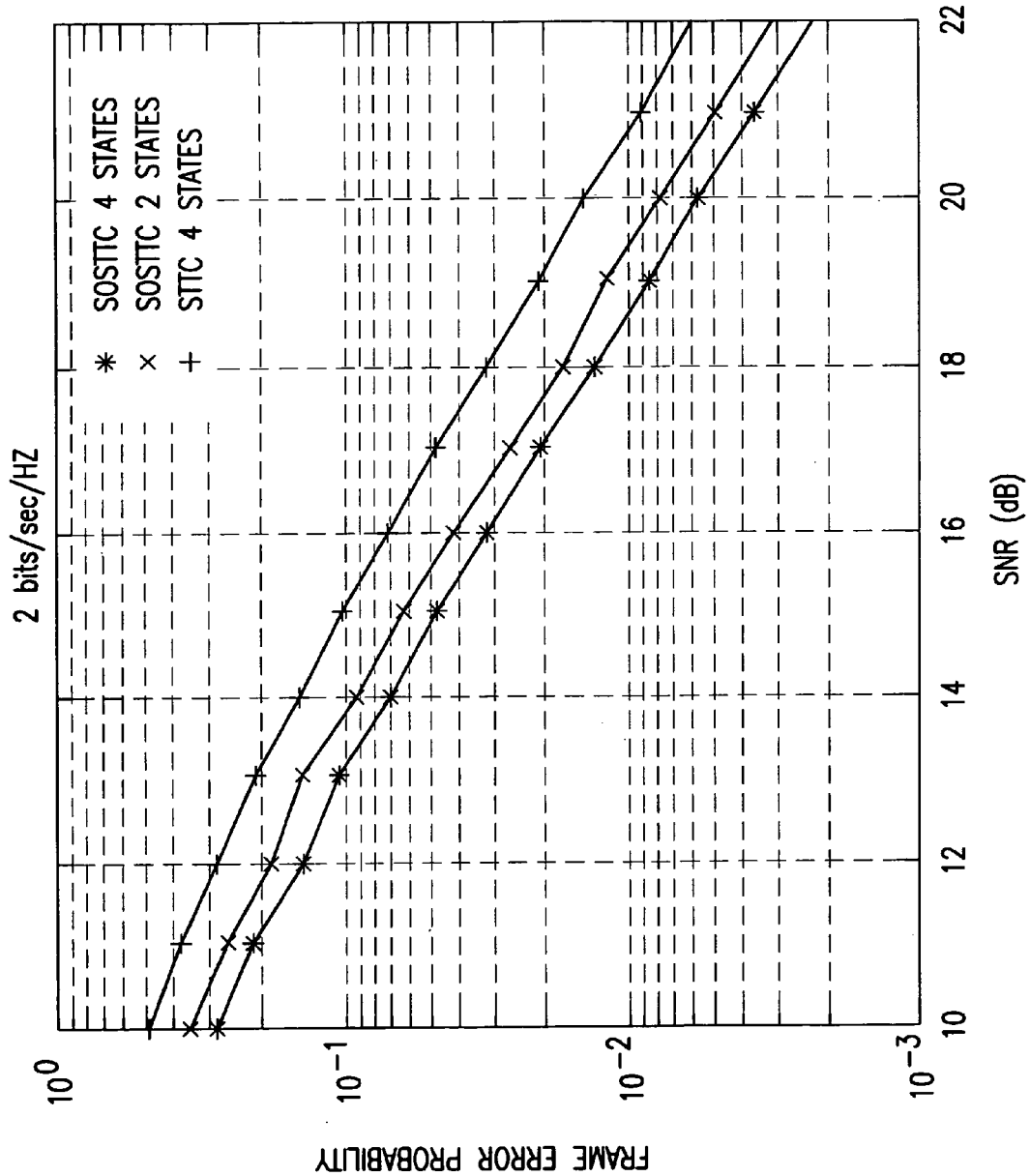
FIG. 16 illustrates simulation results for QPSK telecommunications system according to embodiments of the invention.

FIG. 16 shows the simulation results for transmitting 2 bits/second/hertz using a QPSK constellation. The codes of FIGS. 10 and 12 are denoted by "SOSTTC 4 states" and "SOSTTC 2 states" respectively. The corresponding results for a code with the same rate and 4 states from Tarokh is also provided ("STTC") for comparison. (See V. Tarokh, et al., "Space-time codes for high data rate wireless communications: performance analysis and code construction," *IEEE Trans. Inform. Theory*, Vol. 44, pages 744–765 (March 1998).) As can be seen from FIG. 16, the 4-state super-orthogonal space-time trellis code according to the invention outperforms the corresponding space-time trellis code by more than 2 dB. The performance of the 4-state super-orthogonal space-time trellis code according to the invention is very close to that of a 64-state space-time trellis code.

Summary

In this theory section, results for communications systems using two transmit antennas have been presented. The theory, however, is general and can be extended to more than two transmit antennas. For this purpose, one can use the general space-time block codes introduced in Tarokh. (See V. Tarokh et al., "Space-time block codes from orthogonal designs," *IEEE Trans. Inform. Theory*, Vol. 45, pages 1456–1467 (July 1999), which is incorporated herein by reference in its entirety.) The code design strategy described herein is general enough to be used with a quasi-orthogonal space-time block code or any other structure which guarantees diversity. (See H. Jafaxkhani, "A quasi-orthogonal space-time block code," *IEEE Trans. Communications*, Vol. 49, pages 1–4 (January 2001), which is incorporated herein by reference in its entirety.)

Conclusion

Various embodiments of the present invention have been described above. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A telecommunications system, comprising:
   a transmitter having an encoder that implements a multi-state trellis code; and
   at least two transmission elements coupled to the transmitter,
   wherein, during operation, the encoder:
      receives a group of input data bits, selects an orthogonal space-time block code of a form $$C(x_1, x_2, \theta) = \begin{pmatrix} x_1 e^{j\theta} & x_2 \\ -x_2^* e^{j\theta} & x_1^* \end{pmatrix}$$

from a set of space-time block codes, based on the group of input bits and a state of the encoder, selects at least two modulation symbols, one symbol for each of the at least two transmission elements, based on the group of input bits and the state of the encoder, wherein X1 and X2 represent modulation symbols, and θ represents a code selection parameter, and encodes the group of input data bits, using the orthogonal space-time block code and the at least two modulation symbols, for transmission by the at least two transmission elements.

2. The system of claim 1, wherein
the at least two transmission elements are antennas.

3. The system of claim 1, wherein
the at least two transmission elements are optical transmitters.

4. The system of claim 1, wherein
a coding gain distance of the multi-state trellis code is maximized.

5. The system of claim 1, wherein
at least two states of the multi-state trellis code use different values of θ.

6. The system of claim 5, wherein
the encoder determines three variables $X_1$, $X_2$, and $\Theta$ based on the group of input data bits and the state of the encoder, the encoder sends signal $X_1 e^{j\Theta}$ to the first transmission element and signal $X_2$ to the second transmission element at a time $T_1$, and the encoder sends signal $-X_2^* e^{j\Theta}$ to the first transmission element and signal $X_1^*$ to the second transmission element at a time $T_2$.

7. The system of claim 6, wherein
the encoder implements a two-state trellis code.

8. The system of claim 7, wherein
space-time block code $C(X_1, X_2, 0)$ is associated with state 1, and
space-time block code $C(X_1, X_2, \pi)$ is associated with state 2.

9. The system of claim 8, wherein
the encoder receives one state bit ($B_A$) and one modulation bit ($B_B$) at a time $T_0$, and
the transmission variables ($X_1$, $X_2$, $\Theta$) equal:
(0, 0, 0) if the encoder is in state 1, state bit ($B_A$) equals 0, and modulation bit ($B_B$) equals 0,
(1, 1, 0) if the encoder is in state 1, state bit ($B_A$) equals 0, and modulation bit ($B_B$) equals 1,
(0, 1, π) if the encoder is in state 1, state bit ($B_A$) equals 1, and modulation bit ($B_B$) equals 0, and
(1, 0, π) if the encoder is in state 1, state bit ($B_A$) equals 1, and modulation bit ($B_B$) equals 1.

10. The system of claim 8, wherein
the encoder receives one state bit ($B_A$) and one modulation bit ($B_B$) at a time $T_0$, and
the transmission variables ($X_1$, $X_2$, $\Theta$) equal:
(0, 0, 0) if the encoder is in state 2, state bit ($B_A$) equals 1, and modulation bit ($B_B$) equals 0,
(1, 1, 0) if the encoder is in state 2, state bit ($B_A$) equals 1, and modulation bit ($B_B$) equals 1,
(0, 1, π) if the encoder is in state 2, state bit ($B_A$) equals 0, and modulation bit ($B_B$) equals 0, and
(1, 0, π) if the encoder is in state 2, state bit ($B_A$) equals 0, and modulation bit ($B_B$) equals 1.

11. The system of claim 8, wherein
the encoder receives one state bit ($B_A$) and three modulation bits ($B_B$) at a time $T_0$, and
the transmission variables ($X_1$, $X_2$, $\Theta$) equal:
(0, 0, 0) if the encoder is in state 1, the state bit ($B_A$) equals 0, and the modulation bits ($B_B$) equal 000,
(2, 2, 0) if the encoder is in state 1, the state bit ($B_A$) equals 0, and the modulation bits ($B_B$) equal 001,
(0, 2, 0) if the encoder is in state 1, the state bit ($B_A$) equals 0, and the modulation bits ($B_B$) equal 010,
(2, 0, 0) if the encoder is in state 1, the state bit ($B_A$) equals 0, and the modulation bits ($B_B$) equal 011,
(1, 1, 0) if the encoder is in state 1, the state bit ($B_A$) equals 0, and the modulation bits ($B_B$) equal 100,
(3, 3, 0) if the encoder is in state 1, the state bit ($B_A$) equals 0, and the modulation bits ($B_B$) equal 101,
(1, 3, 0) if the encoder is in state 1, the state bit ($B_A$) equals 0, and modulation bits ($B_B$) equal 110,
(3, 1, 0) if the encoder is in state 1, the state bit ($B_A$) equals 0, and the modulation bits ($B_B$) equal 111,
(0, 1, π) if the encoder is in state 1, the state bit ($B_A$) equals 1, and the modulation bits ($B_B$) equal 000,
(2, 3, π) if the encoder is in state 1, the state bit ($B_A$) equals 1, and the modulation bits ($B_B$) equal 001,
(0, 3, π) if the encoder is in state 1, the state bit ($B_A$) equals 1, and modulation bits ($B_B$) equal 010,
(2, 1, π) if the encoder is in state 1, the state bit ($B_A$) equals 1, and modulation bits ($B_B$) equal 011,
(1, 0, π) if the encoder is in state 1, the state bit ($B_A$) equals 1, and modulation bits ($B_B$) equal 100,
(3, 2, π) if the encoder is in state 1, the state bit ($B_A$) equals 1, and modulation bits ($B_B$) equal 101,
(1, 2, π) if the encoder is in state 1, the state bit ($B_A$) equals 1, and modulation bits ($B_B$) equal 110, and
(3, 0, π) if the encoder is in state 1, the state bit ($B_A$) equals 1, and modulation bits ($B_B$) equals 111.

12. The system of claim 8, wherein
the encoder receives one state bit ($B_A$) and three modulation bits ($B_B$) at a time $T_0$, and
the transmission variables ($X_1$, $X_2$, $\Theta$) equal:
(0, 1, 0) if the encoder is in state 2, the state bit ($B_A$) equals 1, and the modulation bits ($B_B$) equal 000,
(2, 3, 0) if the encoder is in state 2, the state bit ($B_A$) equals 1, and the modulation bits ($B_B$) equal 001,
(0, 3, 0) if the encoder is in state 2, the state bit ($B_A$) equals 1, and the modulation bits ($B_B$) equal 010,
(2, 1, 0) if the encoder is in state 2, the state bit ($B_A$) equals 1, and the modulation bits ($B_B$) equal 011,
(1, 0, 0) if the encoder is in state 2, the state bit ($B_A$) equals 1, and the modulation bits ($B_B$) equal 100,
(3, 2, 0) if the encoder is in state 2, the state bit ($B_A$) equals 1, and the modulation bits ($B_B$) equal 101,
(1, 2, 0) if the encoder is in state 2, the state bit ($B_A$) equals 1, and modulation bits ($B_B$) equal 110,
(3, 0, 0) if the encoder is in state 2, the state bit ($B_A$) equals 1, and the modulation bits ($B_B$) equal 111,
(0, 0, π) if the encoder is in state 2, the state bit ($B_A$) equals 0, and the modulation bits ($B_B$) equal 000,
(2, 2, π) if the encoder is in state 2, the state bit ($B_A$) equals 0, and the modulation bits ($B_B$) equal 001, (0, 2, π) if the encoder is in state 2, the state bit ($B_A$) equals 0, and modulation bits ($B_B$) equal 010, (2, 0, π) if the encoder is in state 2, the state bit ($B_A$) equals 0, and modulation bits ($B_B$) equal 011, (1, 1, π) if the encoder is in state 2, the state bit ($B_A$) equals 0, and modulation bits ($B_B$) equal 100, (3, 3, π) if the encoder is in state 2, the state bit ($B_A$) equals 0, and modulation bits ($B_B$) equal 101, (1, 3, π) if the encoder is in state 2, the state bit ($B_A$) equals 0, and modulation bits ($B_B$) equal 110, and (3, 1, π) if the encoder is in state 2, the state bit ($B_A$) equals 0, and modulation bits ($B_B$) equals 111.

13. The system of claim 6, wherein
the encoder implements a four-state trellis code.

14. The system of claim 13, wherein
space-time block code $C(X_1, X_2, 0)$ is associated with state 1,
space-time block code $C(X_1, X_2, \pi)$ is associated with state 2,
space-time block code $C(X_1, X_2, 0)$ is associated with state 3, and
space-time block code $C(X_1, X_2, \pi)$ is associated with state 4.

15. The system of claim 14, wherein
the encoder receives one state bit ($B_A$) and one modulation bit ($B_B$) at a time $T_0$, and
the transmission variables ($X_1$, $X_2$, Θ) equal:
(0, 0, 0) if the encoder is in state 1, state bit ($B_A$) equals 0, and modulation bit ($B_B$) equals 0,
(1, 1, 0) if the encoder is in state 1, state bit ($B_A$) equals 0, and modulation bit ($B_B$) equals 1,
(0, 1, π) if the encoder is in state 1, state bit ($B_A$) equals 1, and modulation bit ($B_B$) equals 0, and
(1, 0, π) if the encoder is in state 1, state bit ($B_A$) equals 1, and modulation bit ($B_B$) equals 1.

16. The system of claim 14, wherein
the encoder receives one state bit ($B_A$) and one modulation bit ($B_B$) at a time $T_0$, and
the transmission variables ($X_1$, $X_2$, Θ) equal:
(0, 0, 0) if the encoder is in state 2, state bit ($B_A$) equals 0, and modulation bit ($B_B$) equals 0,
(1, 1, 0) if the encoder is in state 2, state bit ($B_A$) equals 0, and modulation bit ($B_B$) equals 1,
(0, 1, π) if the encoder is in state 2, state bit ($B_A$) equals 1, and modulation bit ($B_B$) equals 0, and
(1, 0, π) if the encoder is in state 2, state bit ($B_A$) equals 1, and modulation bit ($B_B$) equals 1.

17. The system of claim 14, wherein
the encoder receives one state bit ($B_A$) and one modulation bit ($B_B$) at a time $T_0$, and
the transmission variables ($X_1$, $X_2$, Θ) equal:
(0, 0, π) if the encoder is in state 3, state bit ($B_A$) equals 0, and modulation bit ($B_B$) equals 0,
(1, 1, π) if the encoder is in state 3, state bit ($B_A$) equals 0, and modulation bit ($B_B$) equals 1,
(0, 1, 0) if the encoder is in state 3, state bit ($B_A$) equals 1, and modulation bit ($B_B$) equals 0, and
(1, 0, 0) if the encoder is in state 3, state bit ($B_A$) equals 1, and modulation bit ($B_B$) equals 1.

18. The system of claim 14, wherein
the encoder receives one state bit ($B_A$) and one modulation bit ($B_B$) at a time $T_0$, and
the transmission variables ($X_1$, $X_2$, Θ) equal:
(0, 0, π) if the encoder is in state 4, state bit ($B_A$) equals 0, and modulation bit ($B_B$) equals 0,
(1, 1, π) if the encoder is in state 4, state bit ($B_A$) equals 0, and modulation bit ($B_B$) equals 1,
(0, 1, 0) if the encoder is in state 4, state bit ($B_A$) equals 1, and modulation bit ($B_B$) equals 0, and
(1, 0, 0) if the encoder is in state 4, state bit ($B_A$) equals 1, and modulation bit ($B_B$) equals 1.

19. The system of claim 14, wherein
the encoder receives one state bit ($B_A$) and three modulation bits ($B_B$) at a time $T_0$, and
the transmission variables ($X_1$, $X_2$, Θ) equal:
(0, 0, 0) if the encoder is in state 1, state bit ($B_A$) equals 0, and the modulation bits ($B_B$) equal 000,
(2, 2, 0) if the encoder is in state 1, state bit ($B_A$) equals 0, and the modulation bits ($B_B$) equal 001,
(0, 2, 0) if the encoder is in state 1, state bit ($B_A$) equals 0, and the modulation bits ($B_B$) equal 010,
(2, 0, 0) if the encoder is in state 1, state bit ($B_A$) equals 0, and the modulation bits ($B_B$) equal 011,
(1, 1, 0) if the encoder is in state 1, state bit ($B_A$) equals 0, and the modulation bits ($B_B$) equal 100,
(3, 3, 0) if the encoder is in state 1, state bit ($B_A$) equals 0, and the modulation bits ($B_B$) equal 101,
(1, 3, 0) if the encoder is in state 1, state bit ($B_A$) equals 0, and the modulation bits ($B_B$) equal 110,
(3, 1, 0) if the encoder is in state 1, state bit ($B_A$) equals 0, and the modulation bits ($B_B$) equal 111,
(0, 1, π) if the encoder is in state 1, state bit ($B_A$) equals 1, and the modulation bits ($B_B$) equal 000,
(2, 3, π) if the encoder is in state 1, state bit ($B_A$) equals 1, and the modulation bits ($B_B$) equal 001,
(0, 3, π) if the encoder is in state 1, state bit ($B_A$) equals 1, and the modulation bits ($B_B$) equal 010,
(2, 1, π) if the encoder is in state 1, state bit ($B_A$) equals 1, and the modulation bits ($B_B$) equal 011,
(1, 0, π) if the encoder is in state 1, state bit ($B_A$) equals 1, and the modulation bits ($B_B$) equal 100,
(3, 2, π) if the encoder is in state 1, state bit ($B_A$) equals 1, and the modulation bits ($B_B$) equal 101,
(1, 2, π) if the encoder is in state 1, state bit ($B_A$) equals 1, and the modulation bits ($B_B$) equal 110, and
(3, 0, π) if the encoder is in state 1, state bit ($B_A$) equals 1, and the modulation bits ($B_B$) equal 111.

20. The system of claim 14, wherein
the encoder receives one state bit ($B_A$) and three modulation bits ($B_B$) at a time $T_0$, and
the transmission variables ($X_1$, $X_2$, Θ) equal:
(0, 0, 0) if the encoder is in state 2, state bit ($B_A$) equals 0, and the modulation bits ($B_B$) equal 000,
(2, 2, 0) if the encoder is in state 2, state bit ($B_A$) equals 0, and the modulation bits ($B_B$) equal 001,
(0, 2, 0) if the encoder is in state 2, state bit ($B_A$) equals 0, and the modulation bits ($B_B$) equal 010,
(2, 0, 0) if the encoder is in state 2, state bit ($B_A$) equals 0, and the modulation bits ($B_B$) equal 011,
(1, 1, 0) if the encoder is in state 2, state bit ($B_A$) equals 0, and the modulation bits ($B_B$) equal 100,
(3, 3, 0) if the encoder is in state 2, state bit ($B_A$) equals 0, and the modulation bits ($B_B$) equal 101,
(1, 3, 0) if the encoder is in state 2, state bit ($B_A$) equals 0, and the modulation bits ($B_B$) equal 110,
(3, 1, 0) if the encoder is in state 2, state bit ($B_A$) equals 0, and the modulation bits ($B_B$) equal 111,
(0, 1, π) if the encoder is in state 2, state bit ($B_A$) equals 1, and the modulation bits ($B_B$) equal 000,
(2, 3, π) if the encoder is in state 2, state bit ($B_A$) equals 1, and the modulation bits ($B_B$) equal 001,
(0, 3, π) if the encoder is in state 2, state bit ($B_A$) equals 1, and the modulation bits ($B_B$) equal 010, (2, 1, π) if the encoder is in state 2, state bit ($B_A$) equals 1, and the modulation bits ($B_B$) equal 011,
(1, 0, π) if the encoder is in state 2, state bit ($B_A$) equals 1, and the modulation bits ($B_B$) equal 100,
(3, 2, π) if the encoder is in state 2, state bit ($B_A$) equals 1, and the modulation bits ($B_B$) equal 101,
(1, 2, π) if the encoder is in state 2, state bit ($B_A$) equals 1, and the modulation bits ($B_B$) equal 110, and
(3, 0, π) if the encoder is in state 2, state bit ($B_A$) equals 1, and the modulation bits ($B_B$) equal 111.

21. The system of claim 14, wherein
the encoder receives one state bit ($B_A$) and three modulation bits ($B_B$) at a time $T_0$, and
the transmission variables ($X_1$, $X_2$, Θ) equal:
(0, 1, 0) if the encoder is in state 3, state bit ($B_A$) equals 1, and the modulation bits ($B_B$) equal 000,
(2, 3, 0) if the encoder is in state 3, state bit ($B_A$) equals 1, and the modulation bits ($B_B$) equal 001,
(0, 3, 0) if the encoder is in state 3, state bit ($B_A$) equals 1, and the modulation bits ($B_B$) equal 010,
(2, 1, 0) if the encoder is in state 3, state bit ($B_A$) equals 1, and the modulation bits ($B_B$) equal 011,
(1, 0, 0) if the encoder is in state 3, state bit ($B_A$) equals 1, and the modulation bits ($B_B$) equal 100,
(3, 2, 0) if the encoder is in state 3, state bit ($B_A$) equals 1, and the modulation bits ($B_B$) equal 101,
(1, 2, 0) if the encoder is in state 3, state bit ($B_A$) equals 1, and the modulation bits ($B_B$) equal 110,
(3, 0, 0) if the encoder is in state 3, state bit ($B_A$) equals 1, and the modulation bits ($B_B$) equal 111,
(0, 0, π) if the encoder is in state 3, state bit ($B_A$) equals 0, and the modulation bits ($B_B$) equal 000,
(2, 2, π) if the encoder is in state 3, state bit ($B_A$) equals 0, and the modulation bits ($B_B$) equal 001,
(0, 2, π) if the encoder is in state 3, state bit ($B_A$) equals 0, and the modulation bits ($B_B$) equal 010,
(2, 0, π) if the encoder is in state 3, state bit ($B_A$) equals 0, and the modulation bits ($B_B$) equal 011,
(1, 1, π) if the encoder is in state 3, state bit ($B_A$) equals 0, and the modulation bits ($B_B$) equal 100,
(3, 3, π) if the encoder is in state 3, state bit ($B_A$) equals 0, and the modulation bits ($B_B$) equal 101,
(1, 3, π) if the encoder is in state 3, state bit ($B_A$) equals 0, and the modulation bits ($B_B$) equal 110, and
(3, 1, π) if the encoder is in state 3, state bit ($B_A$) equals 0, and the modulation bits ($B_B$) equal 111.

22. The system of claim 14, wherein
the encoder receives one state bit ($B_A$) and three modulation bits ($B_B$) at a time $T_0$, and
the transmission variables ($X_1$, $X_2$, Θ) equal:
(0, 1, 0) if the encoder is in state 4, state bit ($B_A$) equals 1, and the modulation bits ($B_B$) equal 000,
(2, 3, 0) if the encoder is in state 4, state bit ($B_A$) equals 1, and the modulation bits ($B_B$) equal 001,
(0, 3, 0) if the encoder is in state 4, state bit ($B_A$) equals 1, and the modulation bits ($B_B$) equal 010,
(2, 1, 0) if the encoder is in state 4, state bit ($B_A$) equals 1, and the modulation bits ($B_B$) equal 011,
(1, 0, 0) if the encoder is in state 4, state bit ($B_A$) equals 1, and the modulation bits ($B_B$) equal 100,
(3, 2, 0) if the encoder is in state 4, state bit ($B_A$) equals 1, and the modulation bits ($B_B$) equal 101,
(1, 2, 0) if the encoder is in state 4, state bit ($B_A$) equals 1, and the modulation bits ($B_B$) equal 110,
(3, 0, 0) if the encoder is in state 4, state bit ($B_A$) equals 1, and the modulation bits ($B_B$) equal 111,
(0, 0, π) if the encoder is in state 4, state bit ($B_A$) equals 0, and the modulation bits ($B_B$) equal 000,
(2, 2, π) if the encoder is in state 4, state bit ($B_A$) equals 0, and the modulation bits ($B_B$) equal 001,
(0, 2, π) if the encoder is in state 4, state bit ($B_A$) equals 0, and the modulation bits ($B_B$) equal 010,
(2, 0, π) if the encoder is in state 4, state bit ($B_A$) equals 0, and the modulation bits ($B_B$) equal 011,
(1, 1, π) if the encoder is in state 4, state bit ($B_A$) equals 0, and the modulation bits ($B_B$) equal 100,
(3, 3, π) if the encoder is in state 4, state bit ($B_A$) equals 0, and the modulation bits ($B_B$) equal 101,
(1, 3, π) if the encoder is in state 4, state bit ($B_A$) equals 0, and the modulation bits ($B_B$) equal 110, and
(3, 1, π) if the encoder is in state 4, state bit ($B_A$) equals 0, and the modulation bits ($B_B$) equal 111.

23. The system of claim 14, wherein
the encoder receives one state bit ($B_A$) and four modulation bits ($B_B$) at a time $T_0$, and
the transmission variables ($X_1$, $X_2$, Θ) equal:
(0, 0, 0) if the encoder is in state 1, the state bit ($B_A$) equals 0, and the modulation bits ($B_B$) equal 0000,
(4, 4, 0) if the encoder is in state 1, the state bit ($B_A$) equals 0, and the modulation bits ($B_B$) equal 0001,
(0, 4, 0) if the encoder is in state 1, the state bit ($B_A$) equals 0, and the modulation bits ($B_B$) equal 0010,
(4, 0, 0) if the encoder is in state 1, the state bit ($B_A$) equals 0, and the modulation bits ($B_B$) equal 0011,
(2, 2, 0) if the encoder is in state 1, the state bit ($B_A$) equals 0, and the modulation bits ($B_B$) equal 0100,
(6, 6, 0) if the encoder is in state 1, the state bit ($B_A$) equals 0, and the modulation bits ($B_B$) equal 0101,
(2, 6, 0) if the encoder is in state 1, the state bit ($B_A$) equals 0, and the modulation bits ($B_B$) equal 0110,
(6, 2, 0) if the encoder is in state 1, the state bit ($B_A$) equals 0, and the modulation bits ($B_B$) equal 0111,
(0, 2, 0) if the encoder is in state 1, the state bit ($B_A$) equals 0, and the modulation bits ($B_B$) equal 1000,
(4, 6, 0) if the encoder is in state 1, the state bit ($B_A$) equals 0, and the modulation bits ($B_B$) equal 1001,
(0, 6, 0) if the encoder is in state 1, the state bit ($B_A$) equals 0, and the modulation bits ($B_B$) equal 1010,
(4, 2, 0) if the encoder is in state 1, the state bit ($B_A$) equals 0, and the modulation bits ($B_B$) equal 1011,
(2, 4, 0) if the encoder is in state 1, the state bit ($B_A$) equals 0, and the modulation bits ($B_B$) equal 1100,
(6, 0, 0) if the encoder is in state 1, the state bit ($B_A$) equals 0, and the modulation bits ($B_B$) equal 1101,
(2, 0, 0) if the encoder is in state 1, the state bit ($B_A$) equals 0, and the modulation bits ($B_B$) equal 1110,
(6, 4, 0) if the encoder is in state 1, the state bit ($B_A$) equals 0, and the modulation bits ($B_B$) equal 1111,
(1, 1, π) if the encoder is in state 1, the state bit ($B_A$) equals 1, and the modulation bits ($B_B$) equal 0000,
(5, 5, π) if the encoder is in state 1, the state bit ($B_A$) equals 1, and the modulation bits ($B_B$) equal 0001,
(1, 5, π) if the encoder is in state 1, the state bit ($B_A$) equals 1, and the modulation bits ($B_B$) equal 0010,
(5, 1, π) if the encoder is in state 1, the state bit ($B_A$) equals 1, and the modulation bits ($B_B$) equal 0011,
(3, 3, π) if the encoder is in state 1, the state bit ($B_A$) equals 1, and the modulation bits ($B_B$) equal 0100,
(7, 7, π) if the encoder is in state 1, the state bit ($B_A$) equals 1, and the modulation bits ($B_B$) equal 0101,
(3, 7, π) if the encoder is in state 1, the state bit ($B_A$) equals 1, and the modulation bits ($B_B$) equal 0110, (7, 3, π) if the encoder is in state 1, the state bit ($B_A$) equals 1, and the modulation bits ($B_B$) equal 0111,
(1, 3, π) if the encoder is in state 1, the state bit ($B_A$) equals 1, and the modulation bits ($B_B$) equal 1000,
(5, 7, π) if the encoder is in state 1, the state bit ($B_A$) equals 1, and the modulation bits ($B_B$) equal 1001,
(1, 7, π) if the encoder is in state 1, the state bit ($B_A$) equals 1, and the modulation bits ($B_B$) equal 1010,
(5, 3, π) if the encoder is in state 1, the state bit ($B_A$) equals 1, and the modulation bits ($B_B$) equal 1011,
(3, 1, π) if the encoder is in state 1, the state bit ($B_A$) equals 1, and the modulation bits ($B_B$) equal 1100,
(7, 5, π) if the encoder is in state 1, the state bit ($B_A$) equals 1, and the modulation bits ($B_B$) equal 1101,
(3, 5, π) if the encoder is in state 1, the state bit ($B_A$) equals 1, and the modulation bits ($B_B$) equal 1110, and
(7, 1, π) if the encoder is in state 1, the state bit ($B_A$) equals 1, and the modulation bits ($B_B$) equal 1111.

24. The system of claim 14, wherein
the encoder receives one state bit ($B_A$) and four modulation bits ($B_B$) at a time $T_0$, and
the transmission variables ($X_1$, $X_2$, $\Theta$) equal:
(0, 0, 0) if the encoder is in state 2, the state bit ($B_A$) equals 0, and the modulation bits ($B_B$) equal 0000,
(4, 4, 0) if the encoder is in state 2, the state bit ($B_A$) equals 0, and the modulation bits ($B_B$) equal 0001,
(0, 4, 0) if the encoder is in state 2, the state bit ($B_A$) equals 0, and the modulation bits ($B_B$) equal 0010,
(4, 0, 0) if the encoder is in state 2, the state bit ($B_A$) equals 0, and the modulation bits ($B_B$) equal 0011,
(2, 2, 0) if the encoder is in state 2, the state bit ($B_A$) equals 0, and the modulation bits ($B_B$) equal 0100,
(6, 6, 0) if the encoder is in state 2, the state bit ($B_A$) equals 0, and the modulation bits ($B_B$) equal 0101,
(2, 6, 0) if the encoder is in state 2, the state bit ($B_A$) equals 0, and the modulation bits ($B_B$) equal 0110,
(6, 2, 0) if the encoder is in state 2, the state bit ($B_A$) equals 0, and the modulation bits ($B_B$) equal 0111,
(0, 2, 0) if the encoder is in state 2, the state bit ($B_A$) equals 0, and the modulation bits ($B_B$) equal 1000,
(4, 6, 0) if the encoder is in state 2, the state bit ($B_A$) equals 0, and the modulation bits ($B_B$) equal 1001,
(0, 6, 0) if the encoder is in state 2, the state bit ($B_A$) equals 0, and the modulation bits ($B_B$) equal 1010,
(4, 2, 0) if the encoder is in state 2, the state bit ($B_A$) equals 0, and the modulation bits ($B_B$) equal 1011,
(2, 4, 0) if the encoder is in state 2, the state bit ($B_A$) equals 0, and the modulation bits ($B_B$) equal 1100,
(6, 0, 0) if the encoder is in state 2, the state bit ($B_A$) equals 0, and the modulation bits ($B_B$) equal 1101,
(2, 0, 0) if the encoder is in state 2, the state bit ($B_A$) equals 0, and the modulation bits ($B_B$) equal 1110,
(6, 4, 0) if the encoder is in state 2, the state bit ($B_A$) equals 0, and the modulation bits ($B_B$) equal 1111,
(1, 1, π) if the encoder is in state 2, the state bit ($B_A$) equals 1, and the modulation bits ($B_B$) equal 0000,
(5, 5, π) if the encoder is in state 2, the state bit ($B_A$) equals 1, and the modulation bits ($B_B$) equal 0001,
(1, 5, π) if the encoder is in state 2, the state bit ($B_A$) equals 1, and the modulation bits ($B_B$) equal 0010,
(5, 1, π) if the encoder is in state 2, the state bit ($B_A$) equals 1, and the modulation bits ($B_B$) equal 0011,
(3, 3, π) if the encoder is in state 2, the state bit ($B_A$) equals 1, and the modulation bits ($B_B$) equal 0100,
(7, 7, π) if the encoder is in state 2, the state bit ($B_A$) equals 1, and the modulation bits ($B_B$) equal 0101,
(3, 7, π) if the encoder is in state 2, the state bit ($B_A$) equals 1, and the modulation bits ($B_B$) equal 0110,
(7, 3, π) if the encoder is in state 2, the state bit ($B_A$) equals 1, and the modulation bits ($B_B$) equal 0111,
(1, 3, π) if the encoder is in state 2, the state bit ($B_A$) equals 1, and the modulation bits ($B_B$) equal 1000,
(5, 7, π) if the encoder is in state 2, the state bit ($B_A$) equals 1, and the modulation bits ($B_B$) equal 1001,
(1, 7, π) if the encoder is in state 2, the state bit ($B_A$) equals 1, and the modulation bits ($B_B$) equal 1010,
(5, 3, π) if the encoder is in state 2, the state bit ($B_A$) equals 1, and the modulation bits ($B_B$) equal 1011,
(3, 1, π) if the encoder is in state 2, the state bit ($B_A$) equals 1, and the modulation bits ($B_B$) equal 1100,
(7, 5, π) if the encoder is in state 2, the state bit ($B_A$) equals 1, and the modulation bits ($B_B$) equal 1101,
(3, 5, π) if the encoder is in state 2, the state bit ($B_A$) equals 1, and the modulation bits ($B_B$) equal 1110, and
(7, 1, π) if the encoder is in state 2, the state bit ($B_A$) equals 1, and the modulation bits ($B_B$) equal 1111.

25. The system of claim 14, wherein
the encoder receives one state bit ($B_A$) and four modulation bits ($B_B$) at a time $T_0$, and
the transmission variables ($X_1$, $X_2$, $\Theta$) equal:
(1, 1, 0) if the encoder is in state 3, the state bit ($B_A$) equals 0, and the modulation bits ($B_B$) equal 0000,
(5, 5, 0) if the encoder is in state 3, the state bit ($B_A$) equals 0, and the modulation bits ($B_B$) equal 0001,
(1, 5, 0) if the encoder is in state 3, the state bit ($B_A$) equals 0, and the modulation bits ($B_B$) equal 0010,
(5, 1, 0) if the encoder is in state 3, the state bit ($B_A$) equals 0, and the modulation bits ($B_B$) equal 0011,
(3, 3, 0) if the encoder is in state 3, the state bit ($B_A$) equals 0, and the modulation bits ($B_B$) equal 0100,
(7, 7, 0) if the encoder is in state 3, the state bit ($B_A$) equals 0, and the modulation bits ($B_B$) equal 0101,
(3, 7, 0) if the encoder is in state 3, the state bit ($B_A$) equals 0, and the modulation bits ($B_B$) equal 0110,
(7, 3, 0) if the encoder is in state 3, the state bit ($B_A$) equals 0, and the modulation bits ($B_B$) equal 0111,
(1, 3, 0) if the encoder is in state 3, the state bit ($B_A$) equals 0, and the modulation bits ($B_B$) equal 1000,
(5, 7, 0) if the encoder is in state 3, the state bit ($B_A$) equals 0, and the modulation bits ($B_B$) equal 1001,
(1, 7, 0) if the encoder is in state 3, the state bit ($B_A$) equals 0, and the modulation bits ($B_B$) equal 1010,
(5, 3, 0) if the encoder is in state 3, the state bit ($B_A$) equals 0, and the modulation bits ($B_B$) equal 1011,
(3, 1, 0) if the encoder is in state 3, the state bit ($B_A$) equals 0, and the modulation bits ($B_B$) equal 1100,
(7, 5, 0) if the encoder is in state 3, the state bit ($B_A$) equals 0, and the modulation bits ($B_B$) equal 1101,
(3, 5, 0) if the encoder is in state 3, the state bit ($B_A$) equals 0, and the modulation bits ($B_B$) equal 1110,
(7, 1, 0) if the encoder is in state 3, the state bit ($B_A$) equals 0, and the modulation bits ($B_B$) equal 1111,
(0, 0, π) if the encoder is in state 3, the state bit ($B_A$) equals 1, and the modulation bits ($B_B$) equal 0000,
(4, 4, π) if the encoder is in state 3, the state bit ($B_A$) equals 1, and the modulation bits ($B_B$) equal 0001,
(0, 4, π) if the encoder is in state 3, the state bit ($B_A$) equals 1, and the modulation bits ($B_B$) equal 0010,
(4, 0, π) if the encoder is in state 3, the state bit ($B_A$) equals 1, and the modulation bits ($B_B$) equal 0011,
(2, 2, π) if the encoder is in state 3, the state bit ($B_A$) equals 1, and the modulation bits ($B_B$) equal 0100, (6, 6, π) if the encoder is in state 3, the state bit ($B_A$) equals 1, and the modulation bits ($B_B$) equal 0101,
(2, 6, π) if the encoder is in state 3, the state bit ($B_A$) equals 1, and the modulation bits ($B_B$) equal 0110,
(6, 2, π) if the encoder is in state 3, the state bit ($B_A$) equals 1, and the modulation bits ($B_B$) equal 0111,
(0, 2, π) if the encoder is in state 3, the state bit ($B_A$) equals 1, and the modulation bits ($B_B$) equal 1000,
(4, 6, π) if the encoder is in state 3, the state bit ($B_A$) equals 1, and the modulation bits ($B_B$) equal 1001,
(0, 6, π) if the encoder is in state 3, the state bit ($B_A$) equals 1, and the modulation bits ($B_B$) equal 1010,
(4, 2, π) if the encoder is in state 3, the state bit ($B_A$) equals 1, and the modulation bits ($B_B$) equal 1011,
(2, 4, π) if the encoder is in state 3, the state bit ($B_A$) equals 1, and the modulation bits ($B_B$) equal 1100,
(6, 0, π) if the encoder is in state 3, the state bit ($B_A$) equals 1, and the modulation bits ($B_B$) equal 1101,
(2, 0, π) if the encoder is in state 3, the state bit ($B_A$) equals 1, and the modulation bits ($B_B$) equal 1110, and
(6, 4, π) if the encoder is in state 3, the state bit ($B_A$) equals 1, and the modulation bits ($B_B$) equal 1111.

26. The system of claim 14, wherein
the encoder receives one state bit ($B_A$) and four modulation bits ($B_B$) at a time $T_0$, and
the transmission variables ($X_1$, $X_2$, $\Theta$) equal:
(1, 1, 0) if the encoder is in state 4, the state bit ($B_A$) equals 0, and the modulation bits ($B_B$) equal 0000,
(5, 5, 0) if the encoder is in state 4, the state bit ($B_A$) equals 0, and the modulation bits ($B_B$) equal 0001,
(1, 5, 0) if the encoder is in state 4, the state bit ($B_A$) equals 0, and the modulation bits ($B_B$) equal 0010,
(5, 1, 0) if the encoder is in state 4, the state bit ($B_A$) equals 0, and the modulation bits ($B_B$) equal 0011,
(3, 3, 0) if the encoder is in state 4, the state bit ($B_A$) equals 0, and the modulation bits ($B_B$) equal 0100,
(7, 7, 0) if the encoder is in state 4, the state bit ($B_A$) equals 0, and the modulation bits ($B_B$) equal 0101,
(3, 7, 0) if the encoder is in state 4, the state bit ($B_A$) equals 0, and the modulation bits ($B_B$) equal 0110,
(7, 3, 0) if the encoder is in state 4, the state bit ($B_A$) equals 0, and the modulation bits ($B_B$) equal 0111,
(1, 3, 0) if the encoder is in state 4, the state bit ($B_A$) equals 0, and the modulation bits ($B_B$) equal 1000,
(5, 7, 0) if the encoder is in state 4, the state bit ($B_A$) equals 0, and the modulation bits ($B_B$) equal 1001,
(1, 7, 0) if the encoder is in state 4, the state bit ($B_A$) equals 0, and the modulation bits ($B_B$) equal 1010,
(5, 3, 0) if the encoder is in state 4, the state bit ($B_A$) equals 0, and the modulation bits ($B_B$) equal 1011,
(3, 1, 0) if the encoder is in state 4, the state bit ($B_A$) equals 0, and the modulation bits ($B_B$) equal 1100,
(7, 5, 0) if the encoder is in state 4, the state bit ($B_A$) equals 0, and the modulation bits ($B_B$) equal 1101,
(3, 5, 0) if the encoder is in state 4, the state bit ($B_A$) equals 0, and the modulation bits ($B_B$) equal 1110,
(7, 1, 0) if the encoder is in state 4, the state bit ($B_A$) equals 0, and the modulation bits ($B_B$) equal 1111,
(0, 0, π) if the encoder is in state 4, the state bit ($B_A$) equals 1, and the modulation bits ($B_B$) equal 0000,
(4, 4, π) if the encoder is in state 4, the state bit ($B_A$) equals 1, and the modulation bits ($B_B$) equal 0001,
(0, 4, π) if the encoder is in state 4, the state bit ($B_A$) equals 1, and the modulation bits ($B_B$) equal 0010,
(4, 0, π) if the encoder is in state 4, the state bit ($B_A$) equals 1, and the modulation bits ($B_B$) equal 0011,
(2, 2, π) if the encoder is in state 4, the state bit ($B_A$) equals 1, and the modulation bits ($B_B$) equal 0100,
(6, 6, π) if the encoder is in state 4, the state bit ($B_A$) equals 1, and the modulation bits ($B_B$) equal 0101,
(2, 6, π) if the encoder is in state 4, the state bit ($B_A$) equals 1, and the modulation bits ($B_B$) equal 0110,
(6, 2, π) if the encoder is in state 4, the state bit ($B_A$) equals 1, and the modulation bits ($B_B$) equal 0111,
(0, 2, π) if the encoder is in state 4, the state bit ($B_A$) equals 1, and the modulation bits ($B_B$) equal 1000,
(4, 6, π) if the encoder is in state 4, the state bit ($B_A$) equals 1, and the modulation bits ($B_B$) equal 1001,
(0, 6, π) if the encoder is in state 4, the state bit ($B_A$) equals 1, and the modulation bits ($B_B$) equal 1010,
(4, 2, π) if the encoder is in state 4, the state bit ($B_A$) equals 1, and the modulation bits ($B_B$) equal 1011,
(2, 4, π) if the encoder is in state 4, the state bit ($B_A$) equals 1, and the modulation bits ($B_B$) equal 1100,
(6, 0, π) if the encoder is in state 4, the state bit ($B_A$) equals 1, and the modulation bits ($B_B$) equal 1101,
(2, 0, π) if the encoder is in state 4, the state bit ($B_A$) equals 1, and the modulation bits ($B_B$) equal 1110, and
(6, 4, π) if the encoder is in state 4, the state bit ($B_A$) equals 1, and the modulation bits ($B_B$) equal 1111.

27. The system of claim 13, wherein
space-time block code $C(X_1, X_2, 0)$ is associated with state 1,
space-time block code $C(X_1, X_2, \pi/2)$ is associated with state 2,
space-time block code $C(X_1, X_2, \pi)$ is associated with state 3, and
space-time block code $C(X_1, X_2, 3\pi/2)$ is associated with state 4.

28. The system of claim 27, wherein
the encoder receives two state bits ($B_A$) and three modulation bits ($B_B$) at a time $T_0$, and
the transmission variables ($X_1$, $X_2$, $\Theta$) equal:
(0, 1, 0) if the encoder is in state 1, the state bits ($B_A$) equal 10, and the modulation bits ($B_B$) equal 0000,
(4, 5, 0) if the encoder is in state 1, the state bits ($B_A$) equal 10, and the modulation bits ($B_B$) equal 0001,
(0, 5, 0) if the encoder is in state 1, the state bits ($B_A$) equal 10, and the modulation bits ($B_B$) equal 0010,
(4, 1, 0) if the encoder is in state 1, the state bits ($B_A$) equal 10, and the modulation bits ($B_B$) equal 0011,
(2, 3, 0) if the encoder is in state 1, the state bits ($B_A$) equal 10, and the modulation bits ($B_B$) equal 0100,
(6, 7, 0) if the encoder is in state 1, the state bits ($B_A$) equal 10, and the modulation bits ($B_B$) equal 0101,
(2, 7, 0) if the encoder is in state 1, the state bits ($B_A$) equal 10, and the modulation bits ($B_B$) equal 0110,
(6, 3, 0) if the encoder is in state 1, the state bits ($B_A$) equal 10, and the modulation bits ($B_B$) equal 0111,
(0, 3, 0) if the encoder is in state 1, the state bits ($B_A$) equal 10, and the modulation bits ($B_B$) equal 1000,
(4, 7, 0) if the encoder is in state 1, the state bits ($B_A$) equal 10, and the modulation bits ($B_B$) equal 1001,
(0, 7, 0) if the encoder is in state 1, the state bits ($B_A$) equal 10, and the modulation bits ($B_B$) equal 1010,
(4, 3, 0) if the encoder is in state 1, the state bits ($B_A$) equal 10, and the modulation bits ($B_B$) equal 1011,
(2, 1, 0) if the encoder is in state 1, the state bits ($B_A$) equal 10, and the modulation bits ($B_B$) equal 1100,
(6, 5, 0) if the encoder is in state 1, the state bits ($B_A$) equal 10, and the modulation bits ($B_B$) equal 1101, (2, 5, 0) if the encoder is in state 1, the state bits ($B_A$) equal 10, and the modulation bits ($B_B$) equal 1110,
(6, 1, 0) if the encoder is in state 1, the state bits ($B_A$) equal 10, and the modulation bits ($B_B$) equal 1111,
(1, 0, π/2) if the encoder is in state 1, the state bits ($B_A$) equal 11, and the modulation bits ($B_B$) equal 0000,
(5, 4, π/2) if the encoder is in state 1, the state bits ($B_A$) equal 11, and the modulation bits ($B_B$) equal 0001,
(1, 4, π/2) if the encoder is in state 1, the state bits ($B_A$) equal 11, and the modulation bits ($B_B$) equal 0010,
(5, 0, π/2) if the encoder is in state 1, the state bits ($B_A$) equal 11, and the modulation bits ($B_B$) equal 0011,
(3, 2, π/2) if the encoder is in state 1, the state bits ($B_A$) equal 11, and the modulation bits ($B_B$) equal 0100,
(7, 6, π/2) if the encoder is in state 1, the state bits ($B_A$) equal 11, and the modulation bits ($B_B$) equal 0101,
(3, 6, π/2) if the encoder is in state 1, the state bits ($B_A$) equal 11, and the modulation bits ($B_B$) equal 0110,
(7, 2, π/2) if the encoder is in state 1, the state bits ($B_A$) equal 11, and the modulation bits ($B_B$) equal 0111,
(1, 2, π/2) if the encoder is in state 1, the state bits ($B_A$) equal 11, and the modulation bits ($B_B$) equal 1000,
(5, 6, π/2) if the encoder is in state 1, the state bits ($B_A$) equal 11, and the modulation bits ($B_B$) equal 1001,
(1, 6, π/2) if the encoder is in state 1, the state bits ($B_A$) equal 11, and the modulation bits ($B_B$) equal 1010,
(5, 2, π/2) if the encoder is in state 1, the state bits ($B_A$) equal 11, and the modulation bits ($B_B$) equal 1011,
(3, 0, π/2) if the encoder is in state 1, the state bits ($B_A$) equal 11, and the modulation bits ($B_B$) equal 1100,
(7, 4, π/2) if the encoder is in state 1, the state bits ($B_A$) equal 11, and the modulation bits ($B_B$) equal 1101,
(3, 4, π/2) if the encoder is in state 1, the state bits ($B_A$) equal 11, and the modulation bits ($B_B$) equal 1110,
(7, 0, π/2) if the encoder is in state 1, the state bits ($B_A$) equal 11, and the modulation bits ($B_B$) equal 1111,
(0, 0, π) if the encoder is in state 1, the state bits ($B_A$) equal 00, and the modulation bits ($B_B$) equal 0000,
(4, 4, π) if the encoder is in state 1, the state bits ($B_A$) equal 00, and the modulation bits ($B_B$) equal 0001,
(0, 4, π) if the encoder is in state 1, the state bits ($B_A$) equal 00, and the modulation bits ($B_B$) equal 0010,
(4, 0, π) if the encoder is in state 1, the state bits ($B_A$) equal 00, and the modulation bits ($B_B$) equal 0011,
(2, 2, π) if the encoder is in state 1, the state bits ($B_A$) equal 00, and the modulation bits ($B_B$) equal 0100,
(6, 6, π) if the encoder is in state 1, the state bits ($B_A$) equal 00, and the modulation bits ($B_B$) equal 0101,
(2, 6, π) if the encoder is in state 1, the state bits ($B_A$) equal 00, and the modulation bits ($B_B$) equal 0110,
(6, 2, π) if the encoder is in state 1, the state bits ($B_A$) equal 00, and the modulation bits ($B_B$) equal 0111,
(0, 2, π) if the encoder is in state 1, the state bits ($B_A$) equal 00, and the modulation bits ($B_B$) equal 1000,
(4, 6, π) if the encoder is in state 1, the state bits ($B_A$) equal 00, and the modulation bits ($B_B$) equal 1001,
(0, 6, π) if the encoder is in state 1, the state bits ($B_A$) equal 00, and the modulation bits ($B_B$) equal 1010,
(4, 2, π) if the encoder is in state 1, the state bits ($B_A$) equal 00, and the modulation bits ($B_B$) equal 1011,
(2, 4, π) if the encoder is in state 1, the state bits ($B_A$) equal 00, and the modulation bits ($B_B$) equal 1100,
(6, 0, π) if the encoder is in state 1, the state bits ($B_A$) equal 00, and the modulation bits ($B_B$) equal 1101,
(2, 0, π) if the encoder is in state 1, the state bits ($B_A$) equal 00, and the modulation bits ($B_B$) equal 1110,
(6, 4, π) if the encoder is in state 1, the state bits ($B_A$) equal 00, and the modulation bits ($B_B$) equal 1111,
(1, 1, 3π/2) if the encoder is in state 1, the state bits ($B_A$) equal 01, and the modulation bits ($B_B$) equal 0000,
(5, 5, 3π/2) if the encoder is in state 1, the state bits ($B_A$) equal 01, and the modulation bits ($B_B$) equal 0001,
(1, 5, 3π/2) if the encoder is in state 1, the state bits ($B_A$) equal 01, and the modulation bits ($B_B$) equal 0010,
(5, 1, 3π/2) if the encoder is in state 1, the state bits ($B_A$) equal 01, and the modulation bits ($B_B$) equal 0011,
(3, 3, 3π/2) if the encoder is in state 1, the state bits ($B_A$) equal 01, and the modulation bits ($B_B$) equal 0100,
(7, 7, 3π/2) if the encoder is in state 1, the state bits ($B_A$) equal 01, and the modulation bits ($B_B$) equal 0101,
(3, 7, 3π/2) if the encoder is in state 1, the state bits ($B_A$) equal 01, and the modulation bits ($B_B$) equal 0110,
(7, 3, 3π/2) if the encoder is in state 1, the state bits ($B_A$) equal 01, and the modulation bits ($B_B$) equal 0111,
(1, 3, 3π/2) if the encoder is in state 1, the state bits ($B_A$) equal 01, and the modulation bits ($B_B$) equal 1000,
(5, 7, 3π/2) if the encoder is in state 1, the state bits ($B_A$) equal 01, and the modulation bits ($B_B$) equal 1001,
(1, 7, 3π/2) if the encoder is in state 1, the state bits ($B_A$) equal 01, and the modulation bits ($B_B$) equal 1010,
(5, 3, 3π/2) if the encoder is in state 1, the state bits ($B_A$) equal 01, and the modulation bits ($B_B$) equal 1011,
(3, 1, 3π/2) if the encoder is in state 1, the state bits ($B_A$) equal 01, and the modulation bits ($B_B$) equal 1100,
(7, 5, 3π/2) if the encoder is in state 1, the state bits ($B_A$) equal 01, and the modulation bits ($B_B$) equal 1101,
(3, 5, 3π/2) if the encoder is in state 1, the state bits ($B_A$) equal 01, and the modulation bits ($B_B$) equal 1110, and
(7, 1, 3π/2) if the encoder is in state 1, the state bits ($B_A$) equal 01, and the modulation bits ($B_B$) equal 1111.

29. The system of claim 27, wherein
the encoder receives two state bits ($B_A$) and three modulation bits ($B_B$) at a time $T_0$, and
the transmission variables ($X_1$, $X_2$, Θ) equal:
(0, 1, 0) if the encoder is in state 2, the state bits ($B_A$) equal 10, and the modulation bits ($B_B$) equal 0000,
(4, 5, 0) if the encoder is in state 2, the state bits ($B_A$) equal 10, and the modulation bits ($B_B$) equal 0001,
(0, 5, 0) if the encoder is in state 2, the state bits ($B_A$) equal 10, and the modulation bits ($B_B$) equal 0010,
(4, 1, 0) if the encoder is in state 2, the state bits ($B_A$) equal 10, and the modulation bits ($B_B$) equal 0011,
(2, 3, 0) if the encoder is in state 2, the state bits ($B_A$) equal 10, and the modulation bits ($B_B$) equal 0100,
(6, 7, 0) if the encoder is in state 2, the state bits ($B_A$) equal 10, and the modulation bits ($B_B$) equal 0101,
(2, 7, 0) if the encoder is in state 2, the state bits ($B_A$) equal 10, and the modulation bits ($B_B$) equal 0110,
(6, 3, 0) if the encoder is in state 2, the state bits ($B_A$) equal 10, and the modulation bits ($B_B$) equal 0111,
(0, 3, 0) if the encoder is in state 2, the state bits ($B_A$) equal 10, and the modulation bits ($B_B$) equal 1000,
(4, 7, 0) if the encoder is in state 2, the state bits ($B_A$) equal 10, and the modulation bits ($B_B$) equal 1001,
(0, 7, 0) if the encoder is in state 2, the state bits ($B_A$) equal 10, and the modulation bits ($B_B$) equal 1010,
(4, 3, 0) if the encoder is in state 2, the state bits ($B_A$) equal 10, and the modulation bits ($B_B$) equal 1011,
(2, 1, 0) if the encoder is in state 2, the state bits ($B_A$) equal 10, and the modulation bits ($B_B$) equal 1100,
(6, 5, 0) if the encoder is in state 2, the state bits ($B_A$) equal 10, and the modulation bits ($B_B$) equal 1101, (2, 5, 0) if the encoder is in state 2, the state bits ($B_A$) equal 10, and the modulation bits ($B_B$) equal 1110,
(6, 1, 0) if the encoder is in state 2, the state bits ($B_A$) equal 10, and the modulation bits ($B_B$) equal 1111,
(1, 0, π/2) if the encoder is in state 2, the state bits ($B_A$) equal 11, and the modulation bits ($B_B$) equal 0000,
(5, 4, π/2) if the encoder is in state 2, the state bits ($B_A$) equal 11, and the modulation bits ($B_B$) equal 0001,
(1, 4, π/2) if the encoder is in state 2, the state bits ($B_A$) equal 11, and the modulation bits ($B_B$) equal 0010,
(5, 0, π/2) if the encoder is in state 2, the state bits ($B_A$) equal 11, and the modulation bits ($B_B$) equal 0011,
(3, 2, π/2) if the encoder is in state 2, the state bits ($B_A$) equal 11, and the modulation bits ($B_B$) equal 0100,
(7, 6, π/2) if the encoder is in state 2, the state bits ($B_A$) equal 11, and the modulation bits ($B_B$) equal 0101,
(3, 6, π/2) if the encoder is in state 2, the state bits ($B_A$) equal 11, and the modulation bits ($B_B$) equal 0110,
(7, 2, π/2) if the encoder is in state 2, the state bits ($B_A$) equal 11, and the modulation bits ($B_B$) equal 0111,
(1, 2, π/2) if the encoder is in state 2, the state bits ($B_A$) equal 11, and the modulation bits ($B_B$) equal 1000,
(5, 6, π/2) if the encoder is in state 2, the state bits ($B_A$) equal 11, and the modulation bits ($B_B$) equal 1001,
(1, 6, π/2) if the encoder is in state 2, the state bits ($B_A$) equal 11, and the modulation bits ($B_B$) equal 1010,
(5, 2, π/2) if the encoder is in state 2, the state bits ($B_A$) equal 11, and the modulation bits ($B_B$) equal 1011,
(3, 0, π/2) if the encoder is in state 2, the state bits ($B_A$) equal 11, and the modulation bits ($B_B$) equal 1100,
(7, 4, π/2) if the encoder is in state 2, the state bits ($B_A$) equal 11, and the modulation bits ($B_B$) equal 1101,
(3, 4, π/2) if the encoder is in state 2, the state bits ($B_A$) equal 11, and the modulation bits ($B_B$) equal 1110,
(7, 0, π/2) if the encoder is in state 2, the state bits ($B_A$) equal 11, and the modulation bits ($B_B$) equal 1111,
(0, 0, π) if the encoder is in state 2, the state bits ($B_A$) equal 00, and the modulation bits ($B_B$) equal 0000,
(4, 4, π) if the encoder is in state 2, the state bits ($B_A$) equal 00, and the modulation bits ($B_B$) equal 0001,
(0, 4, π) if the encoder is in state 2, the state bits ($B_A$) equal 00, and the modulation bits ($B_B$) equal 0010,
(4, 0, π) if the encoder is in state 2, the state bits ($B_A$) equal 00, and the modulation bits ($B_B$) equal 0011,
(2, 2, π) if the encoder is in state 2, the state bits ($B_A$) equal 00, and the modulation bits ($B_B$) equal 0100,
(6, 6, π) if the encoder is in state 2, the state bits ($B_A$) equal 00, and the modulation bits ($B_B$) equal 0101,
(2, 6, π) if the encoder is in state 2, the state bits ($B_A$) equal 00, and the modulation bits ($B_B$) equal 0110,
(6, 2, π) if the encoder is in state 2, the state bits ($B_A$) equal 00, and the modulation bits ($B_B$) equal 0111,
(0, 2, π) if the encoder is in state 2, the state bits ($B_A$) equal 00, and the modulation bits ($B_B$) equal 1000,
(4, 6, π) if the encoder is in state 2, the state bits ($B_A$) equal 00, and the modulation bits ($B_B$) equal 1001,
(0, 6, π) if the encoder is in state 2, the state bits ($B_A$) equal 00, and the modulation bits ($B_B$) equal 1010,
(4, 2, π) if the encoder is in state 2, the state bits ($B_A$) equal 00, and the modulation bits ($B_B$) equal 1011,
(2, 4, π) if the encoder is in state 2, the state bits ($B_A$) equal 00, and the modulation bits ($B_B$) equal 1100,
(6, 0, π) if the encoder is in state 2, the state bits ($B_A$) equal 00, and the modulation bits ($B_B$) equal 1101,
(2, 0, π) if the encoder is in state 2, the state bits ($B_A$) equal 00, and the modulation bits ($B_B$) equal 1110,
(6, 4, π) if the encoder is in state 2, the state bits ($B_A$) equal 00, and the modulation bits ($B_B$) equal 1111,
(1, 1, 3π/2) if the encoder is in state 2, the state bits ($B_A$) equal 01, and the modulation bits ($B_B$) equal 0000,
(5, 5, 3π/2) if the encoder is in state 2, the state bits ($B_A$) equal 01, and the modulation bits ($B_B$) equal 0001,
(1, 5, 3π/2) if the encoder is in state 2, the state bits ($B_A$) equal 01, and the modulation bits ($B_B$) equal 0010,
(5, 1, 3π/2) if the encoder is in state 2, the state bits ($B_A$) equal 01, and the modulation bits ($B_B$) equal 0011,
(3, 3, 3π/2) if the encoder is in state 2, the state bits ($B_A$) equal 01, and the modulation bits ($B_B$) equal 0100,
(7, 7, 3π/2) if the encoder is in state 2, the state bits ($B_A$) equal 01, and the modulation bits ($B_B$) equal 0101,
(3, 7, 3π/2) if the encoder is in state 2, the state bits ($B_A$) equal 01, and the modulation bits ($B_B$) equal 0110,
(7, 3, 3π/2) if the encoder is in state 2, the state bits ($B_A$) equal 01, and the modulation bits ($B_B$) equal 0111,
(1, 3, 3π/2) if the encoder is in state 2, the state bits ($B_A$) equal 01, and the modulation bits ($B_B$) equal 1000,
(5, 7, 3π/2) if the encoder is in state 2, the state bits ($B_A$) equal 01, and the modulation bits ($B_B$) equal 1001,
(1, 7, 3π/2) if the encoder is in state 2, the state bits ($B_A$) equal 01, and the modulation bits ($B_B$) equal 1010,
(5, 3, 3π/2) if the encoder is in state 2, the state bits ($B_A$) equal 01, and the modulation bits ($B_B$) equal 1011,
(3, 1, 3π/2) if the encoder is in state 2, the state bits ($B_A$) equal 01, and the modulation bits ($B_B$) equal 1100,
(7, 5, 3π/2) if the encoder is in state 2, the state bits ($B_A$) equal 01, and the modulation bits ($B_B$) equal 1101,
(3, 5, 3π/2) if the encoder is in state 2, the state bits ($B_A$) equal 01, and the modulation bits ($B_B$) equal 1110, and
(7, 1, 3π/2) if the encoder is in state 2, the state bits ($B_A$) equal 01, and the modulation bits ($B_B$) equal 1111.

30. The system of claim 27, wherein
the encoder receives two state bits ($B_A$) and three modulation bits ($B_B$) at a time $T_0$, and
the transmission variables ($X_1$, $X_2$, Θ) equal:
(0, 1, 0) if the encoder is in state 3, the state bits ($B_A$) equal 10, and the modulation bits ($B_B$) equal 0000,
(4, 5, 0) if the encoder is in state 3, the state bits ($B_A$) equal 10, and the modulation bits ($B_B$) equal 0001,
(0, 5, 0) if the encoder is in state 3, the state bits ($B_A$) equal 10, and the modulation bits ($B_B$) equal 0010,
(4, 1, 0) if the encoder is in state 3, the state bits ($B_A$) equal 10, and the modulation bits ($B_B$) equal 0011,
(2, 3, 0) if the encoder is in state 3, the state bits ($B_A$) equal 10, and the modulation bits ($B_B$) equal 0100,
(6, 7, 0) if the encoder is in state 3, the state bits ($B_A$) equal 10, and the modulation bits ($B_B$) equal 0101,
(2, 7, 0) if the encoder is in state 3, the state bits ($B_A$) equal 10, and the modulation bits ($B_B$) equal 0110,
(6, 3, 0) if the encoder is in state 3, the state bits ($B_A$) equal 10, and the modulation bits ($B_B$) equal 0111,
(0, 3, 0) if the encoder is in state 3, the state bits ($B_A$) equal 10, and the modulation bits ($B_B$) equal 1000,
(4, 7, 0) if the encoder is in state 3, the state bits ($B_A$) equal 10, and the modulation bits ($B_B$) equal 1001,
(0, 7, 0) if the encoder is in state 3, the state bits ($B_A$) equal 10, and the modulation bits ($B_B$) equal 1010,
(4, 3, 0) if the encoder is in state 3, the state bits ($B_A$) equal 10, and the modulation bits ($B_B$) equal 1011,
(2, 1, 0) if the encoder is in state 3, the state bits ($B_A$) equal 10, and the modulation bits ($B_B$) equal 1100,
(6, 5, 0) if the encoder is in state 3, the state bits ($B_A$) equal 10, and the modulation bits ($B_B$) equal 1101, (2, 5, 0) if the encoder is in state 3, the state bits ($B_A$) equal 10, and the modulation bits ($B_B$) equal 1110,
(6, 1, 0) if the encoder is in state 3, the state bits ($B_A$) equal 10, and the modulation bits ($B_B$) equal 1111,
(1, 0, π/2) if the encoder is in state 3, the state bits ($B_A$) equal 11, and the modulation bits ($B_B$) equal 0000,
(5, 4, π/2) if the encoder is in state 3, the state bits ($B_A$) equal 11, and the modulation bits ($B_B$) equal 0001,
(1, 4, π/2) if the encoder is in state 3, the state bits ($B_A$) equal 11, and the modulation bits ($B_B$) equal 0010,
(5, 0, π/2) if the encoder is in state 3, the state bits ($B_A$) equal 11, and the modulation bits ($B_B$) equal 0011,
(3, 2, π/2) if the encoder is in state 3, the state bits ($B_A$) equal 11, and the modulation bits ($B_B$) equal 0100,
(7, 6, π/2) if the encoder is in state 3, the state bits ($B_A$) equal 11, and the modulation bits ($B_B$) equal 0101,
(3, 6, π/2) if the encoder is in state 3, the state bits ($B_A$) equal 11, and the modulation bits ($B_B$) equal 0110,
(7, 2, π/2) if the encoder is in state 3, the state bits ($B_A$) equal 11, and the modulation bits ($B_B$) equal 0111,
(1, 2, π/2) if the encoder is in state 3, the state bits ($B_A$) equal 11, and the modulation bits ($B_B$) equal 1000,
(5, 6, π/2) if the encoder is in state 3, the state bits ($B_A$) equal 11, and the modulation bits ($B_B$) equal 1001,
(1, 6, π/2) if the encoder is in state 3, the state bits ($B_A$) equal 11, and the modulation bits ($B_B$) equal 1010,
(5, 2, π/2) if the encoder is in state 3, the state bits ($B_A$) equal 11, and the modulation bits ($B_B$) equal 1011,
(3, 0, π/2) if the encoder is in state 3, the state bits ($B_A$) equal 11, and the modulation bits ($B_B$) equal 1100,
(7, 4, π/2) if the encoder is in state 3, the state bits ($B_A$) equal 11, and the modulation bits ($B_B$) equal 1101,
(3, 4, π/2) if the encoder is in state 3, the state bits ($B_A$) equal 11, and the modulation bits ($B_B$) equal 1110,
(7, 0, π/2) if the encoder is in state 3, the state bits ($B_A$) equal 11, and the modulation bits ($B_B$) equal 1111,
(0, 0, π) if the encoder is in state 3, the state bits ($B_A$) equal 00, and the modulation bits ($B_B$) equal 0000,
(4, 4, π) if the encoder is in state 3, the state bits ($B_A$) equal 00, and the modulation bits ($B_B$) equal 0001,
(0, 4, π) if the encoder is in state 3, the state bits ($B_A$) equal 00, and the modulation bits ($B_B$) equal 0010,
(4, 0, π) if the encoder is in state 3, the state bits ($B_A$) equal 00, and the modulation bits ($B_B$) equal 0011,
(2, 2, π) if the encoder is in state 3, the state bits ($B_A$) equal 00, and the modulation bits ($B_B$) equal 0100,
(6, 6, π) if the encoder is in state 3, the state bits ($B_A$) equal 00, and the modulation bits ($B_B$) equal 0101,
(2, 6, π) if the encoder is in state 3, the state bits ($B_A$) equal 00, and the modulation bits ($B_B$) equal 0110,
(6, 2, π) if the encoder is in state 3, the state bits ($B_A$) equal 00, and the modulation bits ($B_B$) equal 0111,
(0, 2, π) if the encoder is in state 3, the state bits ($B_A$) equal 00, and the modulation bits ($B_B$) equal 1000,
(4, 6, π) if the encoder is in state 3, the state bits ($B_A$) equal 00, and the modulation bits ($B_B$) equal 1001,
(0, 6, π) if the encoder is in state 3, the state bits ($B_A$) equal 00, and the modulation bits ($B_B$) equal 1010,
(4, 2, π) if the encoder is in state 3, the state bits ($B_A$) equal 00, and the modulation bits ($B_B$) equal 1011,
(2, 4, π) if the encoder is in state 3, the state bits ($B_A$) equal 00, and the modulation bits ($B_B$) equal 1100,
(6, 0, π) if the encoder is in state 3, the state bits ($B_A$) equal 00, and the modulation bits ($B_B$) equal 1101,
(2, 0, π) if the encoder is in state 3, the state bits ($B_A$) equal 00, and the modulation bits ($B_B$) equal 1110,
(6, 4, π) if the encoder is in state 3, the state bits ($B_A$) equal 00, and the modulation bits ($B_B$) equal 1111,
(1, 1, 3π/2) if the encoder is in state 3, the state bits ($B_A$) equal 01, and the modulation bits ($B_B$) equal 0000,
(5, 5, 3π/2) if the encoder is in state 3, the state bits ($B_A$) equal 01, and the modulation bits ($B_B$) equal 0001,
(1, 5, 3π/2) if the encoder is in state 3, the state bits ($B_A$) equal 01, and the modulation bits ($B_B$) equal 0010,
(5, 1, 3π/2) if the encoder is in state 3, the state bits ($B_A$) equal 01, and the modulation bits ($B_B$) equal 0011,
(3, 3, 3π/2) if the encoder is in state 3, the state bits ($B_A$) equal 01, and the modulation bits ($B_B$) equal 0100,
(7, 7, 3π/2) if the encoder is in state 3, the state bits ($B_A$) equal 01, and the modulation bits ($B_B$) equal 0101,
(3, 7, 3π/2) if the encoder is in state 3, the state bits ($B_A$) equal 01, and the modulation bits ($B_B$) equal 0110,
(7, 3, 3π/2) if the encoder is in state 3, the state bits ($B_A$) equal 01, and the modulation bits ($B_B$) equal 0111,
(1, 3, 3π/2) if the encoder is in state 3, the state bits ($B_A$) equal 01, and the modulation bits ($B_B$) equal 1000,
(5, 7, 3π/2) if the encoder is in state 3, the state bits ($B_A$) equal 01, and the modulation bits ($B_B$) equal 1001,
(1, 7, 3π/2) if the encoder is in state 3, the state bits ($B_A$) equal 01, and the modulation bits ($B_B$) equal 1010,
(5, 3, 3π/2) if the encoder is in state 3, the state bits ($B_A$) equal 01, and the modulation bits ($B_B$) equal 1011,
(3, 1, 3π/2) if the encoder is in state 3, the state bits ($B_A$) equal 01, and the modulation bits ($B_B$) equal 1100,
(7, 5, 3π/2) if the encoder is in state 3, the state bits ($B_A$) equal 01, and the modulation bits ($B_B$) equal 1101,
(3, 5, 3π/2) if the encoder is in state 3, the state bits ($B_A$) equal 01, and the modulation bits ($B_B$) equal 1110, and
(7, 1, 3π/2) if the encoder is in state 3, the state bits ($B_A$) equal 01, and the modulation bits ($B_B$) equal 1111.

31. The system of claim 27, wherein
the encoder receives two state bits ($B_A$) and three modulation bits ($B_B$) at a time $T_0$, and
the transmission variables ($X_1$, $X_2$, Θ) equal:
(0, 1, 0) if the encoder is in state 4, the state bits ($B_A$) equal 10, and the modulation bits ($B_B$) equal 0000,
(4, 5, 0) if the encoder is in state 4, the state bits ($B_A$) equal 10, and the modulation bits ($B_B$) equal 0001,
(0, 5, 0) if the encoder is in state 4, the state bits ($B_A$) equal 10, and the modulation bits ($B_B$) equal 0010,
(4, 1, 0) if the encoder is in state 4, the state bits ($B_A$) equal 10, and the modulation bits ($B_B$) equal 0011,
(2, 3, 0) if the encoder is in state 4, the state bits ($B_A$) equal 10, and the modulation bits ($B_B$) equal 0100,
(6, 7, 0) if the encoder is in state 4, the state bits ($B_A$) equal 10, and the modulation bits ($B_B$) equal 0101,
(2, 7, 0) if the encoder is in state 4, the state bits ($B_A$) equal 10, and the modulation bits ($B_B$) equal 0110,
(6, 3, 0) if the encoder is in state 4, the state bits ($B_A$) equal 10, and the modulation bits ($B_B$) equal 0111,
(0, 3, 0) if the encoder is in state 4, the state bits ($B_A$) equal 10, and the modulation bits ($B_B$) equal 1000,
(4, 7, 0) if the encoder is in state 4, the state bits ($B_A$) equal 10, and the modulation bits ($B_B$) equal 1001,
(0, 7, 0) if the encoder is in state 4, the state bits ($B_A$) equal 10, and the modulation bits ($B_B$) equal 1010,
(4, 3, 0) if the encoder is in state 4, the state bits ($B_A$) equal 10, and the modulation bits ($B_B$) equal 1011,
(2, 1, 0) if the encoder is in state 4, the state bits ($B_A$) equal 10, and the modulation bits ($B_B$) equal 1100,
(6, 5, 0) if the encoder is in state 4, the state bits ($B_A$) equal 10, and the modulation bits ($B_B$) equal 1101, (2, 5, 0) if the encoder is in state 4, the state bits ($B_A$) equal 10, and the modulation bits ($B_B$) equal 1110,
(6, 1, 0) if the encoder is in state 4, the state bits ($B_A$) equal 10, and the modulation bits ($B_B$) equal 1111,
(1, 0, π/2) if the encoder is in state 4, the state bits ($B_A$) equal 11, and the modulation bits ($B_B$) equal 0000,
(5, 4, π/2) if the encoder is in state 4, the state bits ($B_A$) equal 11, and the modulation bits ($B_B$) equal 0001,
(1, 4, π/2) if the encoder is in state 4, the state bits ($B_A$) equal 11, and the modulation bits ($B_B$) equal 0010,
(5, 0, π/2) if the encoder is in state 4, the state bits ($B_A$) equal 11, and the modulation bits ($B_B$) equal 0011,
(3, 2, π/2) if the encoder is in state 4, the state bits ($B_A$) equal 11, and the modulation bits ($B_B$) equal 0100,
(7, 6, π/2) if the encoder is in state 4, the state bits ($B_A$) equal 11, and the modulation bits ($B_B$) equal 0101,
(3, 6, π/2) if the encoder is in state 4, the state bits ($B_A$) equal 11, and the modulation bits ($B_B$) equal 0110,
(7, 2, π/2) if the encoder is in state 4, the state bits ($B_A$) equal 11, and the modulation bits ($B_B$) equal 0111,
(1, 2, π/2) if the encoder is in state 4, the state bits ($B_A$) equal 11, and the modulation bits ($B_B$) equal 1000,
(5, 6, π/2) if the encoder is in state 4, the state bits ($B_A$) equal 11, and the modulation bits ($B_B$) equal 1001,
(1, 6, π/2) if the encoder is in state 4, the state bits ($B_A$) equal 11, and the modulation bits ($B_B$) equal 1010,
(5, 2, π/2) if the encoder is in state 4, the state bits ($B_A$) equal 11, and the modulation bits ($B_B$) equal 1011,
(3, 0, π/2) if the encoder is in state 4, the state bits ($B_A$) equal 11, and the modulation bits ($B_B$) equal 1100,
(7, 4, π/2) if the encoder is in state 4, the state bits ($B_A$) equal 11, and the modulation bits ($B_B$) equal 1101,
(3, 4, π/2) if the encoder is in state 4, the state bits ($B_A$) equal 11, and the modulation bits ($B_B$) equal 1110,
(7, 0, π/2) if the encoder is in state 4, the state bits ($B_A$) equal 11, and the modulation bits ($B_B$) equal 1111,
(0, 0, π) if the encoder is in state 4, the state bits ($B_A$) equal 00, and the modulation bits ($B_B$) equal 0000,
(4, 4, π) if the encoder is in state 4, the state bits ($B_A$) equal 00, and the modulation bits ($B_B$) equal 0001,
(0, 4, π) if the encoder is in state 4, the state bits ($B_A$) equal 00, and the modulation bits ($B_B$) equal 0010,
(4, 0, π) if the encoder is in state 4, the state bits ($B_A$) equal 00, and the modulation bits ($B_B$) equal 0011,
(2, 2, π) if the encoder is in state 4, the state bits ($B_A$) equal 00, and the modulation bits ($B_B$) equal 0100,
(6, 6, π) if the encoder is in state 4, the state bits ($B_A$) equal 00, and the modulation bits ($B_B$) equal 0101,
(2, 6, π) if the encoder is in state 4, the state bits ($B_A$) equal 00, and the modulation bits ($B_B$) equal 0110,
(6, 2, π) if the encoder is in state 4, the state bits ($B_A$) equal 00, and the modulation bits ($B_B$) equal 0111,
(0, 2, π) if the encoder is in state 4, the state bits ($B_A$) equal 00, and the modulation bits ($B_B$) equal 1000,
(4, 6, π) if the encoder is in state 4, the state bits ($B_A$) equal 00, and the modulation bits ($B_B$) equal 1001,
(0, 6, π) if the encoder is in state 4, the state bits ($B_A$) equal 00, and the modulation bits ($B_B$) equal 1010,
(4, 2, π) if the encoder is in state 4, the state bits ($B_A$) equal 00, and the modulation bits ($B_B$) equal 1011,
(2, 4, π) if the encoder is in state 4, the state bits ($B_A$) equal 00, and the modulation bits ($B_B$) equal 1100,
(6, 0, π) if the encoder is in state 4, the state bits ($B_A$) equal 00, and the modulation bits ($B_B$) equal 1101,
(2, 0, π) if the encoder is in state 4, the state bits ($B_A$) equal 00, and the modulation bits ($B_B$) equal 1110,
(6, 4, π) if the encoder is in state 4, the state bits ($B_A$) equal 00, and the modulation bits ($B_B$) equal 1111,
(1, 1, 3π/2) if the encoder is in state 4, the state bits ($B_A$) equal 01, and the modulation bits ($B_B$) equal 0000,
(5, 5, 3π/2) if the encoder is in state 4, the state bits ($B_A$) equal 01, and the modulation bits ($B_B$) equal 0001,
(1, 5, 3π/2) if the encoder is in state 4, the state bits ($B_A$) equal 01, and the modulation bits ($B_B$) equal 0010,
(5, 1, 3π/2) if the encoder is in state 4, the state bits ($B_A$) equal 01, and the modulation bits ($B_B$) equal 0011,
(3, 3, 3π/2) if the encoder is in state 4, the state bits ($B_A$) equal 01, and the modulation bits ($B_B$) equal 0100,
(7, 7, 3π/2) if the encoder is in state 4, the state bits ($B_A$) equal 01, and the modulation bits ($B_B$) equal 0101,
(3, 7, 3π/2) if the encoder is in state 4, the state bits ($B_A$) equal 01, and the modulation bits ($B_B$) equal 0110,
(7, 3, 3π/2) if the encoder is in state 4, the state bits ($B_A$) equal 01, and the modulation bits ($B_B$) equal 0111,
(1, 3, 3π/2) if the encoder is in state 4, the state bits ($B_A$) equal 01, and the modulation bits ($B_B$) equal 1000,
(5, 7, 3π/2) if the encoder is in state 4, the state bits ($B_A$) equal 01, and the modulation bits ($B_B$) equal 1001,
(1, 7, 3π/2) if the encoder is in state 4, the state bits ($B_A$) equal 01, and the modulation bits ($B_B$) equal 1010,
(5, 3, 3π/2) if the encoder is in state 4, the state bits ($B_A$) equal 01, and the modulation bits ($B_B$) equal 1011,
(3, 1, 3π/2) if the encoder is in state 4, the state bits ($B_A$) equal 01, and the modulation bits ($B_B$) equal 1100,
(7, 5, 3π/2) if the encoder is in state 4, the state bits ($B_A$) equal 01, and the modulation bits ($B_B$) equal 1101,
(3, 5, 3π/2) if the encoder is in state 4, the state bits ($B_A$) equal 01, and the modulation bits ($B_B$) equal 1110, and
(7, 1, 3π/2) if the encoder is in state 4, the state bits ($B_A$) equal 01, and the modulation bits ($B_B$) equal 1111.

32. The system of claim 6, wherein
the encoder implements an eight-state trellis code.

33. The system of claim 32, wherein
space-time block code $C(X_1, X_2, 0)$ is associated with state 1,
space-time block code $C(X_1, X_2, π/2)$ is associated with state 2,
space-time block code $C(X_1, X_2, π)$ is associated with state 3,
space-time block code $C(X_1, X_2, 3π/2)$ is associated with state 4,
space-time block code $C(X_1, X_2, 0)$ is associated with state 5,
space-time block code $C(X_1, X_2, π/2)$ is associated with state 6,
space-time block code $C(X_1, X_2, 0)$ is associated with state 7, and
space-time block code $C(X_1, X_2, 3π/2)$ is associated with state 8.

34. The system of claim 33, wherein
the encoder receives two state bits ($B_A$) and four modulation bits ($B_B$) at a time $T_0$, and
the transmission variables ($X_1$, $X_2$, Θ) equal:
(0, 0, 0) if the encoder is in state 1, the state bits ($B_A$) equal 00, and the modulation bits ($B_B$) equal 0000,
(4, 4, 0) if the encoder is in state 1, the state bits ($B_A$) equal 00, and the modulation bits ($B_B$) equal 0001,
(0, 4, 0) if the encoder is in state 1, the state bits ($B_A$) equal 00, and the modulation bits ($B_B$) equal 0010,
(4, 0, 0) if the encoder is in state 1, the state bits ($B_A$) equal 00, and the modulation bits ($B_B$) equal 0011, (2, 2, 0) if the encoder is in state 1, the state bits ($B_A$) equal 00, and the modulation bits ($B_B$) equal 0100,
(6, 6, 0) if the encoder is in state 1, the state bits ($B_A$) equal 00, and the modulation bits ($B_B$) equal 0101,
(2, 6, 0) if the encoder is in state 1, the state bits ($B_A$) equal 00, and the modulation bits ($B_B$) equal 0110,
(6, 2, 0) if the encoder is in state 1, the state bits ($B_A$) equal 00, and the modulation bits ($B_B$) equal 0111,
(0, 2, 0) if the encoder is in state 1, the state bits ($B_A$) equal 00, and the modulation bits ($B_B$) equal 1000,
(4, 6, 0) if the encoder is in state 1, the state bits ($B_A$) equal 00, and the modulation bits ($B_B$) equal 1001,
(0, 6, 0) if the encoder is in state 1, the state bits ($B_A$) equal 00, and the modulation bits ($B_B$) equal 1010,
(4, 2, 0) if the encoder is in state 1, the state bits ($B_A$) equal 00, and the modulation bits ($B_B$) equal 1011,
(2, 4, 0) if the encoder is in state 1, the state bits ($B_A$) equal 00, and the modulation bits ($B_B$) equal 1100,
(6, 0, 0) if the encoder is in state 1, the state bits ($B_A$) equal 00, and the modulation bits ($B_B$) equal 1101,
(2, 0, 0) if the encoder is in state 1, the state bits ($B_A$) equal 00, and the modulation bits ($B_B$) equal 1110,
(6, 4, 0) if the encoder is in state 1, the state bits ($B_A$) equal 00, and the modulation bits ($B_B$) equal 1111,
(1, 1, $\pi/2$) if the encoder is in state 1, the state bits ($B_A$) equal 01, and the modulation bits ($B_B$) equal 0000,
(5, 5, $\pi/2$) if the encoder is in state 1, the state bits ($B_A$) equal 01, and the modulation bits ($B_B$) equal 0001,
(1, 5, $\pi/2$) if the encoder is in state 1, the state bits ($B_A$) equal 01, and the modulation bits ($B_B$) equal 0010,
(5, 1, $\pi/2$) if the encoder is in state 1, the state bits ($B_A$) equal 01, and the modulation bits ($B_B$) equal 0011,
(3, 3, $\pi/2$) if the encoder is in state 1, the state bits ($B_A$) equal 01, and the modulation bits ($B_B$) equal 0100,
(7, 7, $\pi/2$) if the encoder is in state 1, the state bits ($B_A$) equal 01, and the modulation bits ($B_B$) equal 0101,
(3, 7, $\pi/2$) if the encoder is in state 1, the state bits ($B_A$) equal 01, and the modulation bits ($B_B$) equal 0110,
(7, 3, $\pi/2$) if the encoder is in state 1, the state bits ($B_A$) equal 01, and the modulation bits ($B_B$) equal 0111,
(1, 3, $\pi/2$) if the encoder is in state 1, the state bits ($B_A$) equal 01, and the modulation bits ($B_B$) equal 1000,
(5, 7, $\pi/2$) if the encoder is in state 1, the state bits ($B_A$) equal 01, and the modulation bits ($B_B$) equal 1001,
(1, 7, $\pi/2$) if the encoder is in state 1, the state bits ($B_A$) equal 01, and the modulation bits ($B_B$) equal 1010,
(5, 3, $\pi/2$) if the encoder is in state 1, the state bits ($B_A$) equal 01, and the modulation bits ($B_B$) equal 1011,
(3, 1, $\pi/2$) if the encoder is in state 1, the state bits ($B_A$) equal 01, and the modulation bits ($B_B$) equal 1100,
(7, 5, $\pi/2$) if the encoder is in state 1, the state bits ($B_A$) equal 01, and the modulation bits ($B_B$) equal 1101,
(3, 5, $\pi/2$) if the encoder is in state 1, the state bits ($B_A$) equal 01, and the modulation bits ($B_B$) equal 1110,
(7, 1, $\pi/2$) if the encoder is in state 1, the state bits ($B_A$) equal 01, and the modulation bits ($B_B$) equal 1111,
(0, 1, $\pi$) if the encoder is in state 1, the state bits ($B_A$) equal 10, and the modulation bits ($B_B$) equal 0000,
(4, 5, $\pi$) if the encoder is in state 1, the state bits ($B_A$) equal 10, and the modulation bits ($B_B$) equal 0001,
(0, 5, $\pi$) if the encoder is in state 1, the state bits ($B_A$) equal 10, and the modulation bits ($B_B$) equal 0010,
(4, 1, $\pi$) if the encoder is in state 1, the state bits ($B_A$) equal 10, and the modulation bits ($B_B$) equal 0011,
(2, 3, $\pi$) if the encoder is in state 1, the state bits ($B_A$) equal 10, and the modulation bits ($B_B$) equal 0100,
(6, 7, $\pi$) if the encoder is in state 1, the state bits ($B_A$) equal 10, and the modulation bits ($B_B$) equal 0101,
(2, 7, $\pi$) if the encoder is in state 1, the state bits ($B_A$) equal 10, and the modulation bits ($B_B$) equal 0110,
(6, 3, $\pi$) if the encoder is in state 1, the state bits ($B_A$) equal 10, and the modulation bits ($B_B$) equal 0111,
(0, 3, $\pi$) if the encoder is in state 1, the state bits ($B_A$) equal 10, and the modulation bits ($B_B$) equal 1000,
(4, 7, $\pi$) if the encoder is in state 1, the state bits ($B_A$) equal 10, and the modulation bits ($B_B$) equal 1001,
(0, 7, $\pi$) if the encoder is in state 1, the state bits ($B_A$) equal 10, and the modulation bits ($B_B$) equal 1010,
(4, 3, $\pi$) if the encoder is in state 1, the state bits ($B_A$) equal 10, and the modulation bits ($B_B$) equal 1011,
(2, 1, $\pi$) if the encoder is in state 1, the state bits ($B_A$) equal 10, and the modulation bits ($B_B$) equal 1100,
(6, 5, $\pi$) if the encoder is in state 1, the state bits ($B_A$) equal 10, and the modulation bits ($B_B$) equal 1101,
(2, 5, $\pi$) if the encoder is in state 1, the state bits ($B_A$) equal 10, and the modulation bits ($B_B$) equal 1110,
(6, 1, $\pi$) if the encoder is in state 1, the state bits ($B_A$) equal 10, and the modulation bits ($B_B$) equal 1111,
(1, 0, $3\pi/2$) if the encoder is in state 1, the state bits ($B_A$) equal 11, and the modulation bits ($B_B$) equal 0000,
(5, 4, $3\pi/2$) if the encoder is in state 1, the state bits ($B_A$) equal 11, and the modulation bits ($B_B$) equal 0001,
(1, 4, $3\pi/2$) if the encoder is in state 1, the state bits ($B_A$) equal 11, and the modulation bits ($B_B$) equal 0010,
(5, 0, $3\pi/2$) if the encoder is in state 1, the state bits ($B_A$) equal 11, and the modulation bits ($B_B$) equal 0011,
(3, 2, $3\pi/2$) if the encoder is in state 1, the state bits ($B_A$) equal 11, and the modulation bits ($B_B$) equal 0100,
(7, 6, $3\pi/2$) if the encoder is in state 1, the state bits ($B_A$) equal 11, and the modulation bits ($B_B$) equal 0101,
(3, 6, $3\pi/2$) if the encoder is in state 1, the state bits ($B_A$) equal 11, and the modulation bits ($B_B$) equal 0110,
(7, 2, $3\pi/2$) if the encoder is in state 1, the state bits ($B_A$) equal 11, and the modulation bits ($B_B$) equal 0111,
(1, 2, $3\pi/2$) if the encoder is in state 1, the state bits ($B_A$) equal 11, and the modulation bits ($B_B$) equal 1000,
(5, 6, $3\pi/2$) if the encoder is in state 1, the state bits ($B_A$) equal 11, and the modulation bits ($B_B$) equal 1001,
(1, 6, $3\pi/2$) if the encoder is in state 1, the state bits ($B_A$) equal 11, and the modulation bits ($B_B$) equal 1010,
(5, 2, $3\pi/2$) if the encoder is in state 1, the state bits ($B_A$) equal 11, and the modulation bits ($B_B$) equal 1011,
(3, 0, $3\pi/2$) if the encoder is in state 1, the state bits ($B_A$) equal 11, and the modulation bits ($B_B$) equal 1100,
(7, 4, $3\pi/2$) if the encoder is in state 1, the state bits ($B_A$) equal 11, and the modulation bits ($B_B$) equal 1101,
(3, 4, $3\pi/2$) if the encoder is in state 1, the state bits ($B_A$) equal 11, and the modulation bits ($B_B$) equal 1110, and
(7, 0, $3\pi/2$) if the encoder is in state 1, the state bits ($B_A$) equal 11, and the modulation bits ($B_B$) equal 1111.

35. The system of claim 33, wherein
the encoder receives two state bits ($B_A$) and four modulation bits ($B_B$) at a time $T_0$, and
the transmission variables ($X_1, X_2, \Theta$) equal:
(0, 0, 0) if the encoder is in state 2, the state bits ($B_A$) equal 00, and the modulation bits ($B_B$) equal 0000,
(4, 4, 0) if the encoder is in state 2, the state bits ($B_A$) equal 00, and the modulation bits ($B_B$) equal 0001,
(0, 4, 0) if the encoder is in state 2, the state bits ($B_A$) equal 00, and the modulation bits ($B_B$) equal 0010,
(4, 0, 0) if the encoder is in state 2, the state bits ($B_A$) equal 00, and the modulation bits ($B_B$) equal 0011, (2, 2, 0) if the encoder is in state 2, the state bits ($B_A$) equal 00, and the modulation bits ($B_B$) equal 0100,
(6, 6, 0) if the encoder is in state 2, the state bits ($B_A$) equal 00, and the modulation bits ($B_B$) equal 0101,
(2, 6, 0) if the encoder is in state 2, the state bits ($B_A$) equal 00, and the modulation bits ($B_B$) equal 0110,
(6, 2, 0) if the encoder is in state 2, the state bits ($B_A$) equal 00, and the modulation bits ($B_B$) equal 0111,
(0, 2, 0) if the encoder is in state 2, the state bits ($B_A$) equal 00, and the modulation bits ($B_B$) equal 1000,
(4, 6, 0) if the encoder is in state 2, the state bits ($B_A$) equal 00, and the modulation bits ($B_B$) equal 1001,
(0, 6, 0) if the encoder is in state 2, the state bits ($B_A$) equal 00, and the modulation bits ($B_B$) equal 1010,
(4, 2, 0) if the encoder is in state 2, the state bits ($B_A$) equal 00, and the modulation bits ($B_B$) equal 1011,
(2, 4, 0) if the encoder is in state 2, the state bits ($B_A$) equal 00, and the modulation bits ($B_B$) equal 1100,
(6, 0, 0) if the encoder is in state 2, the state bits ($B_A$) equal 00, and the modulation bits ($B_B$) equal 1101,
(2, 0, 0) if the encoder is in state 2, the state bits ($B_A$) equal 00, and the modulation bits ($B_B$) equal 1110,
(6, 4, 0) if the encoder is in state 2, the state bits ($B_A$) equal 00, and the modulation bits ($B_B$) equal 1111,
(1, 1, $\pi/2$) if the encoder is in state 2, the state bits ($B_A$) equal 01, and the modulation bits ($B_B$) equal 0000,
(5, 5, $\pi/2$) if the encoder is in state 2, the state bits ($B_A$) equal 01, and the modulation bits ($B_B$) equal 0001,
(1, 5, $\pi/2$) if the encoder is in state 2, the state bits ($B_A$) equal 01, and the modulation bits ($B_B$) equal 0010,
(5, 1, $\pi/2$) if the encoder is in state 2, the state bits ($B_A$) equal 01, and the modulation bits ($B_B$) equal 0011,
(3, 3, $\pi/2$) if the encoder is in state 2, the state bits ($B_A$) equal 01, and the modulation bits ($B_B$) equal 0100,
(7, 7, $\pi/2$) if the encoder is in state 2, the state bits ($B_A$) equal 01, and the modulation bits ($B_B$) equal 0101,
(3, 7, $\pi/2$) if the encoder is in state 2, the state bits ($B_A$) equal 01, and the modulation bits ($B_B$) equal 0110,
(7, 3, $\pi/2$) if the encoder is in state 2, the state bits ($B_A$) equal 01, and the modulation bits ($B_B$) equal 0111,
(1, 3, $\pi/2$) if the encoder is in state 2, the state bits ($B_A$) equal 01, and the modulation bits ($B_B$) equal 1000,
(5, 7, $\pi/2$) if the encoder is in state 2, the state bits ($B_A$) equal 01, and the modulation bits ($B_B$) equal 1001,
(1, 7, $\pi/2$) if the encoder is in state 2, the state bits ($B_A$) equal 01, and the modulation bits ($B_B$) equal 1010,
(5, 3, $\pi/2$) if the encoder is in state 2, the state bits ($B_A$) equal 01, and the modulation bits ($B_B$) equal 1011,
(3, 1, $\pi/2$) if the encoder is in state 2, the state bits ($B_A$) equal 01, and the modulation bits ($B_B$) equal 1100,
(7, 5, $\pi/2$) if the encoder is in state 2, the state bits ($B_A$) equal 01, and the modulation bits ($B_B$) equal 1101,
(3, 5, $\pi/2$) if the encoder is in state 2, the state bits ($B_A$) equal 01, and the modulation bits ($B_B$) equal 1110,
(7, 1, $\pi/2$) if the encoder is in state 2, the state bits ($B_A$) equal 01, and the modulation bits ($B_B$) equal 1111,
(0, 1, $\pi$) if the encoder is in state 2, the state bits ($B_A$) equal 10, and the modulation bits ($B_B$) equal 0000,
(4, 5, $\pi$) if the encoder is in state 2, the state bits ($B_A$) equal 10, and the modulation bits ($B_B$) equal 0001,
(0, 5, $\pi$) if the encoder is in state 2, the state bits ($B_A$) equal 10, and the modulation bits ($B_B$) equal 0010,
(4, 1, $\pi$) if the encoder is in state 2, the state bits ($B_A$) equal 10, and the modulation bits ($B_B$) equal 0011,
(2, 3, $\pi$) if the encoder is in state 2, the state bits ($B_A$) equal 10, and the modulation bits ($B_B$) equal 0100,
(6, 7, $\pi$) if the encoder is in state 2, the state bits ($B_A$) equal 10, and the modulation bits ($B_B$) equal 0101,
(2, 7, $\pi$) if the encoder is in state 2, the state bits ($B_A$) equal 10, and the modulation bits ($B_B$) equal 0110,
(6, 3, $\pi$) if the encoder is in state 2, the state bits ($B_A$) equal 10, and the modulation bits ($B_B$) equal 0111,
(0, 3, $\pi$) if the encoder is in state 2, the state bits ($B_A$) equal 10, and the modulation bits ($B_B$) equal 1000,
(4, 7, $\pi$) if the encoder is in state 2, the state bits ($B_A$) equal 10, and the modulation bits ($B_B$) equal 1001,
(0, 7, $\pi$) if the encoder is in state 2, the state bits ($B_A$) equal 10, and the modulation bits ($B_B$) equal 1010,
(4, 3, $\pi$) if the encoder is in state 2, the state bits ($B_A$) equal 10, and the modulation bits ($B_B$) equal 1011,
(2, 1, $\pi$) if the encoder is in state 2, the state bits ($B_A$) equal 10, and the modulation bits ($B_B$) equal 1100,
(6, 5, $\pi$) if the encoder is in state 2, the state bits ($B_A$) equal 10, and the modulation bits ($B_B$) equal 1101,
(2, 5, $\pi$) if the encoder is in state 2, the state bits ($B_A$) equal 10, and the modulation bits ($B_B$) equal 1110,
(6, 1, $\pi$) if the encoder is in state 2, the state bits ($B_A$) equal 10, and the modulation bits ($B_B$) equal 1111,
(1, 0, $3\pi/2$) if the encoder is in state 2, the state bits ($B_A$) equal 11, and the modulation bits ($B_B$) equal 0000,
(5, 4, $3\pi/2$) if the encoder is in state 2, the state bits ($B_A$) equal 11, and the modulation bits ($B_B$) equal 0001,
(1, 4, $3\pi/2$) if the encoder is in state 2, the state bits ($B_A$) equal 11, and the modulation bits ($B_B$) equal 0010,
(5, 0, $3\pi/2$) if the encoder is in state 2, the state bits ($B_A$) equal 11, and the modulation bits ($B_B$) equal 0011,
(3, 2, $3\pi/2$) if the encoder is in state 2, the state bits ($B_A$) equal 11, and the modulation bits ($B_B$) equal 0100,
(7, 6, $3\pi/2$) if the encoder is in state 2, the state bits ($B_A$) equal 11, and the modulation bits ($B_B$) equal 0101,
(3, 6, $3\pi/2$) if the encoder is in state 2, the state bits ($B_A$) equal 11, and the modulation bits ($B_B$) equal 0110,
(7, 2, $3\pi/2$) if the encoder is in state 2, the state bits ($B_A$) equal 11, and the modulation bits ($B_B$) equal 0111,
(1, 2, $3\pi/2$) if the encoder is in state 2, the state bits ($B_A$) equal 11, and the modulation bits ($B_B$) equal 1000,
(5, 6, $3\pi/2$) if the encoder is in state 2, the state bits ($B_A$) equal 11, and the modulation bits ($B_B$) equal 1001,
(1, 6, $3\pi/2$) if the encoder is in state 2, the state bits ($B_A$) equal 11, and the modulation bits ($B_B$) equal 1010,
(5, 2, $3\pi/2$) if the encoder is in state 2, the state bits ($B_A$) equal 11, and the modulation bits ($B_B$) equal 1011,
(3, 0, $3\pi/2$) if the encoder is in state 2, the state bits ($B_A$) equal 11, and the modulation bits ($B_B$) equal 1100,
(7, 4, $3\pi/2$) if the encoder is in state 2, the state bits ($B_A$) equal 11, and the modulation bits ($B_B$) equal 1101,
(3, 4, $3\pi/2$) if the encoder is in state 2, the state bits ($B_A$) equal 11, and the modulation bits ($B_B$) equal 1110, and
(7, 0, $3\pi/2$) if the encoder is in state 2, the state bits ($B_A$) equal 11, and the modulation bits ($B_B$) equal 1111.

36. The system of claim 33, wherein
the encoder receives two state bits ($B_A$) and four modulation bits ($B_B$) at a time $T_0$, and
the transmission variables ($X_1$, $X_2$, $\Theta$) equal:
(0, 0, 0) if the encoder is in state 3, the state bits ($B_A$) equal 00, and the modulation bits ($B_B$) equal 0000,
(4, 4, 0) if the encoder is in state 3, the state bits ($B_A$) equal 00, and the modulation bits ($B_B$) equal 0001,
(0, 4, 0) if the encoder is in state 3, the state bits ($B_A$) equal 00, and the modulation bits ($B_B$) equal 0010,
(4, 0, 0) if the encoder is in state 3, the state bits ($B_A$) equal 00, and the modulation bits ($B_B$) equal 0011, (2, 2, 0) if the encoder is in state 3, the state bits ($B_A$) equal 00, and the modulation bits ($B_B$) equal 0100,
(6, 6, 0) if the encoder is in state 3, the state bits ($B_A$) equal 00, and the modulation bits ($B_B$) equal 0101,
(2, 6, 0) if the encoder is in state 3, the state bits ($B_A$) equal 00, and the modulation bits ($B_B$) equal 0110,
(6, 2, 0) if the encoder is in state 3, the state bits ($B_A$) equal 00, and the modulation bits ($B_B$) equal 0111,
(0, 2, 0) if the encoder is in state 3, the state bits ($B_A$) equal 00, and the modulation bits ($B_B$) equal 1000,
(4, 6, 0) if the encoder is in state 3, the state bits ($B_A$) equal 00, and the modulation bits ($B_B$) equal 1001,
(0, 6, 0) if the encoder is in state 3, the state bits ($B_A$) equal 00, and the modulation bits ($B_B$) equal 1010,
(4, 2, 0) if the encoder is in state 3, the state bits ($B_A$) equal 00, and the modulation bits ($B_B$) equal 1011,
(2, 4, 0) if the encoder is in state 3, the state bits ($B_A$) equal 00, and the modulation bits ($B_B$) equal 1100,
(6, 0, 0) if the encoder is in state 3, the state bits ($B_A$) equal 00, and the modulation bits ($B_B$) equal 1101,
(2, 0, 0) if the encoder is in state 3, the state bits ($B_A$) equal 00, and the modulation bits ($B_B$) equal 1110,
(6, 4, 0) if the encoder is in state 3, the state bits ($B_A$) equal 00, and the modulation bits ($B_B$) equal 1111,
(1, 1, $\pi/2$) if the encoder is in state 3, the state bits ($B_A$) equal 01, and the modulation bits ($B_B$) equal 0000,
(5, 5, $\pi/2$) if the encoder is in state 3, the state bits ($B_A$) equal 01, and the modulation bits ($B_B$) equal 0001,
(1, 5, $\pi/2$) if the encoder is in state 3, the state bits ($B_A$) equal 01, and the modulation bits ($B_B$) equal 0010,
(5, 1, $\pi/2$) if the encoder is in state 3, the state bits ($B_A$) equal 01, and the modulation bits ($B_B$) equal 0011,
(3, 3, $\pi/2$) if the encoder is in state 3, the state bits ($B_A$) equal 01, and the modulation bits ($B_B$) equal 0100,
(7, 7, $\pi/2$) if the encoder is in state 3, the state bits ($B_A$) equal 01, and the modulation bits ($B_B$) equal 0101,
(3, 7, $\pi/2$) if the encoder is in state 3, the state bits ($B_A$) equal 01, and the modulation bits ($B_B$) equal 0110,
(7, 3, $\pi/2$) if the encoder is in state 3, the state bits ($B_A$) equal 01, and the modulation bits ($B_B$) equal 0111,
(1, 3, $\pi/2$) if the encoder is in state 3, the state bits ($B_A$) equal 01, and the modulation bits ($B_B$) equal 1000,
(5, 7, $\pi/2$) if the encoder is in state 3, the state bits ($B_A$) equal 01, and the modulation bits ($B_B$) equal 1001,
(1, 7, $\pi/2$) if the encoder is in state 3, the state bits ($B_A$) equal 01, and the modulation bits ($B_B$) equal 1010,
(5, 3, $\pi/2$) if the encoder is in state 3, the state bits ($B_A$) equal 01, and the modulation bits ($B_B$) equal 1011,
(3, 1, $\pi/2$) if the encoder is in state 3, the state bits ($B_A$) equal 01, and the modulation bits ($B_B$) equal 1100,
(7, 5, $\pi/2$) if the encoder is in state 3, the state bits ($B_A$) equal 01, and the modulation bits ($B_B$) equal 1101,
(3, 5, $\pi/2$) if the encoder is in state 3, the state bits ($B_A$) equal 01, and the modulation bits ($B_B$) equal 1110,
(7, 1, $\pi/2$) if the encoder is in state 3, the state bits ($B_A$) equal 01, and the modulation bits ($B_B$) equal 1111,
(0, 1, $\pi$) if the encoder is in state 3, the state bits ($B_A$) equal 10, and the modulation bits ($B_B$) equal 0000,
(4, 5, $\pi$) if the encoder is in state 3, the state bits ($B_A$) equal 10, and the modulation bits ($B_B$) equal 0001,
(0, 5, $\pi$) if the encoder is in state 3, the state bits ($B_A$) equal 10, and the modulation bits ($B_B$) equal 0010,
(4, 1, $\pi$) if the encoder is in state 3, the state bits ($B_A$) equal 10, and the modulation bits ($B_B$) equal 0011,
(2, 3, $\pi$) if the encoder is in state 3, the state bits ($B_A$) equal 10, and the modulation bits ($B_B$) equal 0100,
(6, 7, $\pi$) if the encoder is in state 3, the state bits ($B_A$) equal 10, and the modulation bits ($B_B$) equal 0101,
(2, 7, $\pi$) if the encoder is in state 3, the state bits ($B_A$) equal 10, and the modulation bits ($B_B$) equal 0110,
(6, 3, $\pi$) if the encoder is in state 3, the state bits ($B_A$) equal 10, and the modulation bits ($B_B$) equal 0111,
(0, 3, $\pi$) if the encoder is in state 3, the state bits ($B_A$) equal 10, and the modulation bits ($B_B$) equal 1000,
(4, 7, $\pi$) if the encoder is in state 3, the state bits ($B_A$) equal 10, and the modulation bits ($B_B$) equal 1001,
(0, 7, $\pi$) if the encoder is in state 3, the state bits ($B_A$) equal 10, and the modulation bits ($B_B$) equal 1010,
(4, 3, $\pi$) if the encoder is in state 3, the state bits ($B_A$) equal 10, and the modulation bits ($B_B$) equal 1011,
(2, 1, $\pi$) if the encoder is in state 3, the state bits ($B_A$) equal 10, and the modulation bits ($B_B$) equal 1100,
(6, 5, $\pi$) if the encoder is in state 3, the state bits ($B_A$) equal 10, and the modulation bits ($B_B$) equal 1101,
(2, 5, $\pi$) if the encoder is in state 3, the state bits ($B_A$) equal 10, and the modulation bits ($B_B$) equal 1110,
(6, 1, $\pi$) if the encoder is in state 3, the state bits ($B_A$) equal 10, and the modulation bits ($B_B$) equal 1111,
(1, 0, $3\pi/2$) if the encoder is in state 3, the state bits ($B_A$) equal 11, and the modulation bits ($B_B$) equal 0000,
(5, 4, $3\pi/2$) if the encoder is in state 3, the state bits ($B_A$) equal 11, and the modulation bits ($B_B$) equal 0001,
(1, 4, $3\pi/2$) if the encoder is in state 3, the state bits ($B_A$) equal 11, and the modulation bits ($B_B$) equal 0010,
(5, 0, $3\pi/2$) if the encoder is in state 3, the state bits ($B_A$) equal 11, and the modulation bits ($B_B$) equal 0011,
(3, 2, $3\pi/2$) if the encoder is in state 3, the state bits ($B_A$) equal 11, and the modulation bits ($B_B$) equal 0100,
(7, 6, $3\pi/2$) if the encoder is in state 3, the state bits ($B_A$) equal 11, and the modulation bits ($B_B$) equal 0101,
(3, 6, $3\pi/2$) if the encoder is in state 3, the state bits ($B_A$) equal 11, and the modulation bits ($B_B$) equal 0110,
(7, 2, $3\pi/2$) if the encoder is in state 3, the state bits ($B_A$) equal 11, and the modulation bits ($B_B$) equal 0111,
(1, 2, $3\pi/2$) if the encoder is in state 3, the state bits ($B_A$) equal 11, and the modulation bits ($B_B$) equal 1000,
(5, 6, $3\pi/2$) if the encoder is in state 3, the state bits ($B_A$) equal 11, and the modulation bits ($B_B$) equal 1001,
(1, 6, $3\pi/2$) if the encoder is in state 3, the state bits ($B_A$) equal 11, and the modulation bits ($B_B$) equal 1010,
(5, 2, $3\pi/2$) if the encoder is in state 3, the state bits ($B_A$) equal 11, and the modulation bits ($B_B$) equal 1011,
(3, 0, $3\pi/2$) if the encoder is in state 3, the state bits ($B_A$) equal 11, and the modulation bits ($B_B$) equal 1100,
(7, 4, $3\pi/2$) if the encoder is in state 3, the state bits ($B_A$) equal 11, and the modulation bits ($B_B$) equal 1101,
(3, 4, $3\pi/2$) if the encoder is in state 3, the state bits ($B_A$) equal 11, and the modulation bits ($B_B$) equal 1110, and
(7, 0, $3\pi/2$) if the encoder is in state 3, the state bits ($B_A$) equal 11, and the modulation bits ($B_B$) equal 1111.

37. The system of claim 33, wherein
the encoder receives two state bits ($B_A$) and four modulation bits ($B_B$) at a time $T_0$, and
the transmission variables ($X_1$, $X_2$, $\Theta$) equal:
(0, 0, 0) if the encoder is in state 4, the state bits ($B_A$) equal 00, and the modulation bits ($B_B$) equal 0000,
(4, 4, 0) if the encoder is in state 4, the state bits ($B_A$) equal 00, and the modulation bits ($B_B$) equal 0001,
(0, 4, 0) if the encoder is in state 4, the state bits ($B_A$) equal 00, and the modulation bits ($B_B$) equal 0010,
(4, 0, 0) if the encoder is in state 4, the state bits ($B_A$) equal 00, and the modulation bits ($B_B$) equal 0011, (2, 2, 0) if the encoder is in state 4, the state bits ($B_A$) equal 00, and the modulation bits ($B_B$) equal 0100,
(6, 6, 0) if the encoder is in state 4, the state bits ($B_A$) equal 00, and the modulation bits ($B_B$) equal 0101,
(2, 6, 0) if the encoder is in state 4, the state bits ($B_A$) equal 00, and the modulation bits ($B_B$) equal 0110,
(6, 2, 0) if the encoder is in state 4, the state bits ($B_A$) equal 00, and the modulation bits ($B_B$) equal 0111,
(0, 2, 0) if the encoder is in state 4, the state bits ($B_A$) equal 00, and the modulation bits ($B_B$) equal 1000,
(4, 6, 0) if the encoder is in state 4, the state bits ($B_A$) equal 00, and the modulation bits ($B_B$) equal 1001,
(0, 6, 0) if the encoder is in state 4, the state bits ($B_A$) equal 00, and the modulation bits ($B_B$) equal 1010,
(4, 2, 0) if the encoder is in state 4, the state bits ($B_A$) equal 00, and the modulation bits ($B_B$) equal 1011,
(2, 4, 0) if the encoder is in state 4, the state bits ($B_A$) equal 00, and the modulation bits ($B_B$) equal 1100,
(6, 0, 0) if the encoder is in state 4, the state bits ($B_A$) equal 00, and the modulation bits ($B_B$) equal 1101,
(2, 0, 0) if the encoder is in state 4, the state bits ($B_A$) equal 00, and the modulation bits ($B_B$) equal 1110,
(6, 4, 0) if the encoder is in state 4, the state bits ($B_A$) equal 00, and the modulation bits ($B_B$) equal 1111,
(1, 1, $\pi/2$) if the encoder is in state 4, the state bits ($B_A$) equal 01, and the modulation bits ($B_B$) equal 0000,
(5, 5, $\pi/2$) if the encoder is in state 4, the state bits ($B_A$) equal 01, and the modulation bits ($B_B$) equal 0001,
(1, 5, $\pi/2$) if the encoder is in state 4, the state bits ($B_A$) equal 01, and the modulation bits ($B_B$) equal 0010,
(5, 1, $\pi/2$) if the encoder is in state 4, the state bits ($B_A$) equal 01, and the modulation bits ($B_B$) equal 0011,
(3, 3, $\pi/2$) if the encoder is in state 4, the state bits ($B_A$) equal 01, and the modulation bits ($B_B$) equal 0100,
(7, 7, $\pi/2$) if the encoder is in state 4, the state bits ($B_A$) equal 01, and the modulation bits ($B_B$) equal 0101,
(3, 7, $\pi/2$) if the encoder is in state 4, the state bits ($B_A$) equal 01, and the modulation bits ($B_B$) equal 0110,
(7, 3, $\pi/2$) if the encoder is in state 4, the state bits ($B_A$) equal 01, and the modulation bits ($B_B$) equal 0111,
(1, 3, $\pi/2$) if the encoder is in state 4, the state bits ($B_A$) equal 01, and the modulation bits ($B_B$) equal 1000,
(5, 7, $\pi/2$) if the encoder is in state 4, the state bits ($B_A$) equal 01, and the modulation bits ($B_B$) equal 1001,
(1, 7, $\pi/2$) if the encoder is in state 4, the state bits ($B_A$) equal 01, and the modulation bits ($B_B$) equal 1010,
(5, 3, $\pi/2$) if the encoder is in state 4, the state bits ($B_A$) equal 01, and the modulation bits ($B_B$) equal 1011,
(3, 1, $\pi/2$) if the encoder is in state 4, the state bits ($B_A$) equal 01, and the modulation bits ($B_B$) equal 1100,
(7, 5, $\pi/2$) if the encoder is in state 4, the state bits ($B_A$) equal 01, and the modulation bits ($B_B$) equal 1101,
(3, 5, $\pi/2$) if the encoder is in state 4, the state bits ($B_A$) equal 01, and the modulation bits ($B_B$) equal 1110,
(7, 1, $\pi/2$) if the encoder is in state 4, the state bits ($B_A$) equal 01, and the modulation bits ($B_B$) equal 1111,
(0, 1, $\pi$) if the encoder is in state 4, the state bits ($B_A$) equal 10, and the modulation bits ($B_B$) equal 0000,
(4, 5, $\pi$) if the encoder is in state 4, the state bits ($B_A$) equal 10, and the modulation bits ($B_B$) equal 0001,
(0, 5, $\pi$) if the encoder is in state 4, the state bits ($B_A$) equal 10, and the modulation bits ($B_B$) equal 0010,
(4, 1, $\pi$) if the encoder is in state 4, the state bits ($B_A$) equal 10, and the modulation bits ($B_B$) equal 0011,
(2, 3, $\pi$) if the encoder is in state 4, the state bits ($B_A$) equal 10, and the modulation bits ($B_B$) equal 0100,
(6, 7, $\pi$) if the encoder is in state 4, the state bits ($B_A$) equal 10, and the modulation bits ($B_B$) equal 0101,
(2, 7, $\pi$) if the encoder is in state 4, the state bits ($B_A$) equal 10, and the modulation bits ($B_B$) equal 0110,
(6, 3, $\pi$) if the encoder is in state 4, the state bits ($B_A$) equal 10, and the modulation bits ($B_B$) equal 0111,
(0, 3, $\pi$) if the encoder is in state 4, the state bits ($B_A$) equal 10, and the modulation bits ($B_B$) equal 1000,
(4, 7, $\pi$) if the encoder is in state 4, the state bits ($B_A$) equal 10, and the modulation bits ($B_B$) equal 1001,
(0, 7, $\pi$) if the encoder is in state 4, the state bits ($B_A$) equal 10, and the modulation bits ($B_B$) equal 1010,
(4, 3, $\pi$) if the encoder is in state 4, the state bits ($B_A$) equal 10, and the modulation bits ($B_B$) equal 1011,
(2, 1, $\pi$) if the encoder is in state 4, the state bits ($B_A$) equal 10, and the modulation bits ($B_B$) equal 1100,
(6, 5, $\pi$) if the encoder is in state 4, the state bits ($B_A$) equal 10, and the modulation bits ($B_B$) equal 1101,
(2, 5, $\pi$) if the encoder is in state 4, the state bits ($B_A$) equal 10, and the modulation bits ($B_B$) equal 1110,
(6, 1, $\pi$) if the encoder is in state 4, the state bits ($B_A$) equal 10, and the modulation bits ($B_B$) equal 1111,
(1, 0, $3\pi/2$) if the encoder is in state 4, the state bits ($B_A$) equal 11, and the modulation bits ($B_B$) equal 0000,
(5, 4, $3\pi/2$) if the encoder is in state 4, the state bits ($B_A$) equal 11, and the modulation bits ($B_B$) equal 0001,
(1, 4, $3\pi/2$) if the encoder is in state 4, the state bits ($B_A$) equal 11, and the modulation bits ($B_B$) equal 0010,
(5, 0, $3\pi/2$) if the encoder is in state 4, the state bits ($B_A$) equal 11, and the modulation bits ($B_B$) equal 0011,
(3, 2, $3\pi/2$) if the encoder is in state 4, the state bits ($B_A$) equal 11, and the modulation bits ($B_B$) equal 0100,
(7, 6, $3\pi/2$) if the encoder is in state 4, the state bits ($B_A$) equal 11, and the modulation bits ($B_B$) equal 0101,
(3, 6, $3\pi/2$) if the encoder is in state 4, the state bits ($B_A$) equal 11, and the modulation bits ($B_B$) equal 0110,
(7, 2, $3\pi/2$) if the encoder is in state 4, the state bits ($B_A$) equal 11, and the modulation bits ($B_B$) equal 0111,
(1, 2, $3\pi/2$) if the encoder is in state 4, the state bits ($B_A$) equal 11, and the modulation bits ($B_B$) equal 1000,
(5, 6, $3\pi/2$) if the encoder is in state 4, the state bits ($B_A$) equal 11, and the modulation bits ($B_B$) equal 1001,
(1, 6, $3\pi/2$) if the encoder is in state 4, the state bits ($B_A$) equal 11, and the modulation bits ($B_B$) equal 1010,
(5, 2, $3\pi/2$) if the encoder is in state 4, the state bits ($B_A$) equal 11, and the modulation bits ($B_B$) equal 1011,
(3, 0, $3\pi/2$) if the encoder is in state 4, the state bits ($B_A$) equal 11, and the modulation bits ($B_B$) equal 1100,
(7, 4, $3\pi/2$) if the encoder is in state 4, the state bits ($B_A$) equal 11, and the modulation bits ($B_B$) equal 1101,
(3, 4, $3\pi/2$) if the encoder is in state 4, the state bits ($B_A$) equal 11, and the modulation bits ($B_B$) equal 1110, and
(7, 0, $3\pi/2$) if the encoder is in state 4, the state bits ($B_A$) equal 11, and the modulation bits ($B_B$) equal 1111.

38. The system of claim 33, wherein
the encoder receives two state bits ($B_A$) and four modulation bits ($B_B$) at a time $T_0$, and
the transmission variables ($X_1$, $X_2$, $\Theta$) equal:
(0, 1, 0) if the encoder is in state 5, the state bits ($B_A$) equal 10, and the modulation bits ($B_B$) equal 0000,
(4, 5, 0) if the encoder is in state 5, the state bits ($B_A$) equal 10, and the modulation bits ($B_B$) equal 0001,
(0, 5, 0) if the encoder is in state 5, the state bits ($B_A$) equal 10, and the modulation bits ($B_B$) equal 0010,
(4, 1, 0) if the encoder is in state 5, the state bits ($B_A$) equal 10, and the modulation bits ($B_B$) equal 0011, (2, 3, 0) if the encoder is in state 5, the state bits ($B_A$) equal 10, and the modulation bits ($B_B$) equal 0100,
(6, 7, 0) if the encoder is in state 5, the state bits ($B_A$) equal 10, and the modulation bits ($B_B$) equal 0101,
(2, 7, 0) if the encoder is in state 5, the state bits ($B_A$) equal 10, and the modulation bits ($B_B$) equal 0110,
(6, 3, 0) if the encoder is in state 5, the state bits ($B_A$) equal 10, and the modulation bits ($B_B$) equal 0111,
(0, 3, 0) if the encoder is in state 5, the state bits ($B_A$) equal 10, and the modulation bits ($B_B$) equal 1000,
(4, 7, 0) if the encoder is in state 5, the state bits ($B_A$) equal 10, and the modulation bits ($B_B$) equal 1001,
(0, 7, 0) if the encoder is in state 5, the state bits ($B_A$) equal 10, and the modulation bits ($B_B$) equal 1010,
(4, 3, 0) if the encoder is in state 5, the state bits ($B_A$) equal 10, and the modulation bits ($B_B$) equal 1011,
(2, 1, 0) if the encoder is in state 5, the state bits ($B_A$) equal 10, and the modulation bits ($B_B$) equal 1100,
(6, 5, 0) if the encoder is in state 5, the state bits ($B_A$) equal 10, and the modulation bits ($B_B$) equal 1101,
(2, 5, 0) if the encoder is in state 5, the state bits ($B_A$) equal 10, and the modulation bits ($B_B$) equal 1110,
(6, 1, 0) if the encoder is in state 5, the state bits ($B_A$) equal 10, and the modulation bits ($B_B$) equal 1111,
(1, 0, $\pi/2$) if the encoder is in state 5, the state bits ($B_A$) equal 11, and the modulation bits ($B_B$) equal 0000,
(5, 4, $\pi/2$) if the encoder is in state 5, the state bits ($B_A$) equal 11, and the modulation bits ($B_B$) equal 0001,
(1, 4, $\pi/2$) if the encoder is in state 5, the state bits ($B_A$) equal 11, and the modulation bits ($B_B$) equal 0010,
(5, 0, $\pi/2$) if the encoder is in state 5, the state bits ($B_A$) equal 11, and the modulation bits ($B_B$) equal 0011,
(3, 2, $\pi/2$) if the encoder is in state 5, the state bits ($B_A$) equal 11, and the modulation bits ($B_B$) equal 0100,
(7, 6, $\pi/2$) if the encoder is in state 5, the state bits ($B_A$) equal 11, and the modulation bits ($B_B$) equal 0101,
(3, 6, $\pi/2$) if the encoder is in state 5, the state bits ($B_A$) equal 11, and the modulation bits ($B_B$) equal 0110,
(7, 2, $\pi/2$) if the encoder is in state 5, the state bits ($B_A$) equal 11, and the modulation bits ($B_B$) equal 0111,
(1, 2, $\pi/2$) if the encoder is in state 5, the state bits ($B_A$) equal 11, and the modulation bits ($B_B$) equal 1000,
(5, 6, $\pi/2$) if the encoder is in state 5, the state bits ($B_A$) equal 11, and the modulation bits ($B_B$) equal 1001,
(1, 6, $\pi/2$) if the encoder is in state 5, the state bits ($B_A$) equal 11, and the modulation bits ($B_B$) equal 1010,
(5, 2, $\pi/2$) if the encoder is in state 5, the state bits ($B_A$) equal 11, and the modulation bits ($B_B$) equal 1011,
(3, 0, $\pi/2$) if the encoder is in state 5, the state bits ($B_A$) equal 11, and the modulation bits ($B_B$) equal 1100,
(7, 4, $\pi/2$) if the encoder is in state 5, the state bits ($B_A$) equal 11, and the modulation bits ($B_B$) equal 1101,
(3, 4, $\pi/2$) if the encoder is in state 5, the state bits ($B_A$) equal 11, and the modulation bits ($B_B$) equal 1110,
(7, 0, $\pi/2$) if the encoder is in state 5, the state bits ($B_A$) equal 11, and the modulation bits ($B_B$) equal 1111,
(0, 0, $\pi$) if the encoder is in state 5, the state bits ($B_A$) equal 00, and the modulation bits ($B_B$) equal 0000,
(4, 4, $\pi$) if the encoder is in state 5, the state bits ($B_A$) equal 00, and the modulation bits ($B_B$) equal 0001,
(0, 4, $\pi$) if the encoder is in state 5, the state bits ($B_A$) equal 00, and the modulation bits ($B_B$) equal 0010,
(4, 0, $\pi$) if the encoder is in state 5, the state bits ($B_A$) equal 00, and the modulation bits ($B_B$) equal 0011,
(2, 2, $\pi$) if the encoder is in state 5, the state bits ($B_A$) equal 00, and the modulation bits ($B_B$) equal 0100,
(6, 6, $\pi$) if the encoder is in state 5, the state bits ($B_A$) equal 00, and the modulation bits ($B_B$) equal 0101,
(2, 6, $\pi$) if the encoder is in state 5, the state bits ($B_A$) equal 00, and the modulation bits ($B_B$) equal 0110,
(6, 2, $\pi$) if the encoder is in state 5, the state bits ($B_A$) equal 00, and the modulation bits ($B_B$) equal 0111,
(0, 2, $\pi$) if the encoder is in state 5, the state bits ($B_A$) equal 00, and the modulation bits ($B_B$) equal 1000,
(4, 6, $\pi$) if the encoder is in state 5, the state bits ($B_A$) equal 00, and the modulation bits ($B_B$) equal 1001,
(0, 6, $\pi$) if the encoder is in state 5, the state bits ($B_A$) equal 00, and the modulation bits ($B_B$) equal 1010,
(4, 2, $\pi$) if the encoder is in state 5, the state bits ($B_A$) equal 00, and the modulation bits ($B_B$) equal 1011,
(2, 4, $\pi$) if the encoder is in state 5, the state bits ($B_A$) equal 00, and the modulation bits ($B_B$) equal 1100,
(6, 0, $\pi$) if the encoder is in state 5, the state bits ($B_A$) equal 00, and the modulation bits ($B_B$) equal 1101,
(2, 0, $\pi$) if the encoder is in state 5, the state bits ($B_A$) equal 00, and the modulation bits ($B_B$) equal 1110,
(6, 4, $\pi$) if the encoder is in state 5, the state bits ($B_A$) equal 00, and the modulation bits ($B_B$) equal 1111,
(1, 1, $3\pi/2$) if the encoder is in state 5, the state bits ($B_A$) equal 01, and the modulation bits ($B_B$) equal 0000,
(5, 5, $3\pi/2$) if the encoder is in state 5, the state bits ($B_A$) equal 01, and the modulation bits ($B_B$) equal 0001,
(1, 5, $3\pi/2$) if the encoder is in state 5, the state bits ($B_A$) equal 01, and the modulation bits ($B_B$) equal 0010,
(5, 1, $3\pi/2$) if the encoder is in state 5, the state bits ($B_A$) equal 01, and the modulation bits ($B_B$) equal 0011,
(3, 3, $3\pi/2$) if the encoder is in state 5, the state bits ($B_A$) equal 01, and the modulation bits ($B_B$) equal 0100,
(7, 7, $3\pi/2$) if the encoder is in state 5, the state bits ($B_A$) equal 01, and the modulation bits ($B_B$) equal 0101,
(3, 7, $3\pi/2$) if the encoder is in state 5, the state bits ($B_A$) equal 01, and the modulation bits ($B_B$) equal 0110,
(7, 3, $3\pi/2$) if the encoder is in state 5, the state bits ($B_A$) equal 01, and the modulation bits ($B_B$) equal 0111,
(1, 3, $3\pi/2$) if the encoder is in state 5, the state bits ($B_A$) equal 01, and the modulation bits ($B_B$) equal 1000,
(5, 7, $3\pi/2$) if the encoder is in state 5, the state bits ($B_A$) equal 01, and the modulation bits ($B_B$) equal 1001,
(1, 7, $3\pi/2$) if the encoder is in state 5, the state bits ($B_A$) equal 01, and the modulation bits ($B_B$) equal 1010,
(5, 3, $3\pi/2$) if the encoder is in state 5, the state bits ($B_A$) equal 01, and the modulation bits ($B_B$) equal 1011,
(3, 1, $3\pi/2$) if the encoder is in state 5, the state bits ($B_A$) equal 01, and the modulation bits ($B_B$) equal 1100,
(7, 5, $3\pi/2$) if the encoder is in state 5, the state bits ($B_A$) equal 01, and the modulation bits ($B_B$) equal 1101,
(3, 5, $3\pi/2$) if the encoder is in state 5, the state bits ($B_A$) equal 01, and the modulation bits ($B_B$) equal 1110, and
(7, 1, $3\pi/2$) if the encoder is in state 5, the state bits ($B_A$) equal 01, and the modulation bits ($B_B$) equal 1111.

39. The system of claim 33, wherein
the encoder receives two state bits ($B_A$) and four modulation bits ($B_B$) at a time $T_0$, and
the transmission variables ($X_1$, $X_2$, $\Theta$) equal:
(0, 1, 0) if the encoder is in state 6, the state bits ($B_A$) equal 10, and the modulation bits ($B_B$) equal 0000,
(4, 5, 0) if the encoder is in state 6, the state bits ($B_A$) equal 10, and the modulation bits ($B_B$) equal 0001,
(0, 5, 0) if the encoder is in state 6, the state bits ($B_A$) equal 10, and the modulation bits ($B_B$) equal 0010,
(4, 1, 0) if the encoder is in state 6, the state bits ($B_A$) equal 10, and the modulation bits ($B_B$) equal 0011, (2, 3, 0) if the encoder is in state 6, the state bits ($B_A$) equal 10, and the modulation bits ($B_B$) equal 0100,
(6, 7, 0) if the encoder is in state 6, the state bits ($B_A$) equal 10, and the modulation bits ($B_B$) equal 0101,
(2, 7, 0) if the encoder is in state 6, the state bits ($B_A$) equal 10, and the modulation bits ($B_B$) equal 0110,
(6, 3, 0) if the encoder is in state 6, the state bits ($B_A$) equal 10, and the modulation bits ($B_B$) equal 0111,
(0, 3, 0) if the encoder is in state 6, the state bits ($B_A$) equal 10, and the modulation bits ($B_B$) equal 1000,
(4, 7, 0) if the encoder is in state 6, the state bits ($B_A$) equal 10, and the modulation bits ($B_B$) equal 1001,
(0, 7, 0) if the encoder is in state 6, the state bits ($B_A$) equal 10, and the modulation bits ($B_B$) equal 1010,
(4, 3, 0) if the encoder is in state 6, the state bits ($B_A$) equal 10, and the modulation bits ($B_B$) equal 1011,
(2, 1, 0) if the encoder is in state 6, the state bits ($B_A$) equal 10, and the modulation bits ($B_B$) equal 1100,
(6, 5, 0) if the encoder is in state 6, the state bits ($B_A$) equal 10, and the modulation bits ($B_B$) equal 1101,
(2, 5, 0) if the encoder is in state 6, the state bits ($B_A$) equal 10, and the modulation bits ($B_B$) equal 1110,
(6, 1, 0) if the encoder is in state 6, the state bits ($B_A$) equal 10, and the modulation bits ($B_B$) equal 1111,
(1, 0, $\pi/2$) if the encoder is in state 6, the state bits ($B_A$) equal 11, and the modulation bits ($B_B$) equal 0000,
(5, 4, $\pi/2$) if the encoder is in state 6, the state bits ($B_A$) equal 11, and the modulation bits ($B_B$) equal 0001,
(1, 4, $\pi/2$) if the encoder is in state 6, the state bits ($B_A$) equal 11, and the modulation bits ($B_B$) equal 0010,
(5, 0, $\pi/2$) if the encoder is in state 6, the state bits ($B_A$) equal 11, and the modulation bits ($B_B$) equal 0011,
(3, 2, $\pi/2$) if the encoder is in state 6, the state bits ($B_A$) equal 11, and the modulation bits ($B_B$) equal 0100,
(7, 6, $\pi/2$) if the encoder is in state 6, the state bits ($B_A$) equal 11, and the modulation bits ($B_B$) equal 0101,
(3, 6, $\pi/2$) if the encoder is in state 6, the state bits ($B_A$) equal 11, and the modulation bits ($B_B$) equal 0110,
(7, 2, $\pi/2$) if the encoder is in state 6, the state bits ($B_A$) equal 11, and the modulation bits ($B_B$) equal 0111,
(1, 2, $\pi/2$) if the encoder is in state 6, the state bits ($B_A$) equal 11, and the modulation bits ($B_B$) equal 1000,
(5, 6, $\pi/2$) if the encoder is in state 6, the state bits ($B_A$) equal 11, and the modulation bits ($B_B$) equal 1001,
(1, 6, $\pi/2$) if the encoder is in state 6, the state bits ($B_A$) equal 11, and the modulation bits ($B_B$) equal 1010,
(5, 2, $\pi/2$) if the encoder is in state 6, the state bits ($B_A$) equal 11, and the modulation bits ($B_B$) equal 1011,
(3, 0, $\pi/2$) if the encoder is in state 6, the state bits ($B_A$) equal 11, and the modulation bits ($B_B$) equal 1100,
(7, 4, $\pi/2$) if the encoder is in state 6, the state bits ($B_A$) equal 11, and the modulation bits ($B_B$) equal 1101,
(3, 4, $\pi/2$) if the encoder is in state 6, the state bits ($B_A$) equal 11, and the modulation bits ($B_B$) equal 1110,
(7, 0, $\pi/2$) if the encoder is in state 6, the state bits ($B_A$) equal 11, and the modulation bits ($B_B$) equal 1111,
(0, 0, $\pi$) if the encoder is in state 6, the state bits ($B_A$) equal 00, and the modulation bits ($B_B$) equal 0000,
(4, 4, $\pi$) if the encoder is in state 6, the state bits ($B_A$) equal 00, and the modulation bits ($B_B$) equal 0001,
(0, 4, $\pi$) if the encoder is in state 6, the state bits ($B_A$) equal 00, and the modulation bits ($B_B$) equal 0010,
(4, 0, $\pi$) if the encoder is in state 6, the state bits ($B_A$) equal 00, and the modulation bits ($B_B$) equal 0011,
(2, 2, $\pi$) if the encoder is in state 6, the state bits ($B_A$) equal 00, and the modulation bits ($B_B$) equal 0100,
(6, 6, $\pi$) if the encoder is in state 6, the state bits ($B_A$) equal 00, and the modulation bits ($B_B$) equal 0101,
(2, 6, $\pi$) if the encoder is in state 6, the state bits ($B_A$) equal 00, and the modulation bits ($B_B$) equal 0110,
(6, 2, $\pi$) if the encoder is in state 6, the state bits ($B_A$) equal 00, and the modulation bits ($B_B$) equal 0111,
(0, 2, $\pi$) if the encoder is in state 6, the state bits ($B_A$) equal 00, and the modulation bits ($B_B$) equal 1000,
(4, 6, $\pi$) if the encoder is in state 6, the state bits ($B_A$) equal 00, and the modulation bits ($B_B$) equal 1001,
(0, 6, $\pi$) if the encoder is in state 6, the state bits ($B_A$) equal 00, and the modulation bits ($B_B$) equal 1010,
(4, 2, $\pi$) if the encoder is in state 6, the state bits ($B_A$) equal 00, and the modulation bits ($B_B$) equal 1011,
(2, 4, $\pi$) if the encoder is in state 6, the state bits ($B_A$) equal 00, and the modulation bits ($B_B$) equal 1100,
(6, 0, $\pi$) if the encoder is in state 6, the state bits ($B_A$) equal 00, and the modulation bits ($B_B$) equal 1101,
(2, 0, $\pi$) if the encoder is in state 6, the state bits ($B_A$) equal 00, and the modulation bits ($B_B$) equal 1110,
(6, 4, $\pi$) if the encoder is in state 6, the state bits ($B_A$) equal 00, and the modulation bits ($B_B$) equal 1111,
(1, 1, $3\pi/2$) if the encoder is in state 6, the state bits ($B_A$) equal 01, and the modulation bits ($B_B$) equal 0000,
(5, 5, $3\pi/2$) if the encoder is in state 6, the state bits ($B_A$) equal 01, and the modulation bits ($B_B$) equal 0001,
(1, 5, $3\pi/2$) if the encoder is in state 6, the state bits ($B_A$) equal 01, and the modulation bits ($B_B$) equal 0010,
(5, 1, $3\pi/2$) if the encoder is in state 6, the state bits ($B_A$) equal 01, and the modulation bits ($B_B$) equal 0011,
(3, 3, $3\pi/2$) if the encoder is in state 6, the state bits ($B_A$) equal 01, and the modulation bits ($B_B$) equal 0100,
(7, 7, $3\pi/2$) if the encoder is in state 6, the state bits ($B_A$) equal 01, and the modulation bits ($B_B$) equal 0101,
(3, 7, $3\pi/2$) if the encoder is in state 6, the state bits ($B_A$) equal 01, and the modulation bits ($B_B$) equal 0110,
(7, 3, $3\pi/2$) if the encoder is in state 6, the state bits ($B_A$) equal 01, and the modulation bits ($B_B$) equal 0111,
(1, 3, $3\pi/2$) if the encoder is in state 6, the state bits ($B_A$) equal 01, and the modulation bits ($B_B$) equal 1000,
(5, 7, $3\pi/2$) if the encoder is in state 6, the state bits ($B_A$) equal 01, and the modulation bits ($B_B$) equal 1001,
(1, 7, $3\pi/2$) if the encoder is in state 6, the state bits ($B_A$) equal 01, and the modulation bits ($B_B$) equal 1010,
(5, 3, $3\pi/2$) if the encoder is in state 6, the state bits ($B_A$) equal 01, and the modulation bits ($B_B$) equal 1011,
(3, 1, $3\pi/2$) if the encoder is in state 6, the state bits ($B_A$) equal 01, and the modulation bits ($B_B$) equal 1100,
(7, 5, $3\pi/2$) if the encoder is in state 6, the state bits ($B_A$) equal 01, and the modulation bits ($B_B$) equal 1101,
(3, 5, $3\pi/2$) if the encoder is in state 6, the state bits ($B_A$) equal 01, and the modulation bits ($B_B$) equal 1110, and
(7, 1, $3\pi/2$) if the encoder is in state 6, the state bits ($B_A$) equal 01, and the modulation bits ($B_B$) equal 1111.

40. The system of claim 33, wherein
the encoder receives two state bits ($B_A$) and four modulation bits ($B_B$) at a time $T_0$, and
the transmission variables ($X_1$, $X_2$, $\Theta$) equal:
(0, 1, 0) if the encoder is in state 7, the state bits ($B_A$) equal 10, and the modulation bits ($B_B$) equal 0000,
(4, 5, 0) if the encoder is in state 7, the state bits ($B_A$) equal 10, and the modulation bits ($B_B$) equal 0001,
(0, 5, 0) if the encoder is in state 7, the state bits ($B_A$) equal 10, and the modulation bits ($B_B$) equal 0010,
(4, 1, 0) if the encoder is in state 7, the state bits ($B_A$) equal 10, and the modulation bits ($B_B$) equal 0011, (2, 3, 0) if the encoder is in state 7, the state bits ($B_A$) equal 10, and the modulation bits ($B_B$) equal 0100,
(6, 7, 0) if the encoder is in state 7, the state bits ($B_A$) equal 10, and the modulation bits ($B_B$) equal 0101,
(2, 7, 0) if the encoder is in state 7, the state bits ($B_A$) equal 10, and the modulation bits ($B_B$) equal 0110,
(6, 3, 0) if the encoder is in state 7, the state bits ($B_A$) equal 10, and the modulation bits ($B_B$) equal 0111,
(0, 3, 0) if the encoder is in state 7, the state bits ($B_A$) equal 10, and the modulation bits ($B_B$) equal 1000,
(4, 7, 0) if the encoder is in state 7, the state bits ($B_A$) equal 10, and the modulation bits ($B_B$) equal 1001,
(0, 7, 0) if the encoder is in state 7, the state bits ($B_A$) equal 10, and the modulation bits ($B_B$) equal 1010,
(4, 3, 0) if the encoder is in state 7, the state bits ($B_A$) equal 10, and the modulation bits ($B_B$) equal 1011,
(2, 1, 0) if the encoder is in state 7, the state bits ($B_A$) equal 10, and the modulation bits ($B_B$) equal 1100,
(6, 5, 0) if the encoder is in state 7, the state bits ($B_A$) equal 10, and the modulation bits ($B_B$) equal 1101,
(2, 5, 0) if the encoder is in state 7, the state bits ($B_A$) equal 10, and the modulation bits ($B_B$) equal 1110,
(6, 1, 0) if the encoder is in state 7, the state bits ($B_A$) equal 10, and the modulation bits ($B_B$) equal 1111,
(1, 0, π/2) if the encoder is in state 7, the state bits ($B_A$) equal 11, and the modulation bits ($B_B$) equal 0000,
(5, 4, π/2) if the encoder is in state 7, the state bits ($B_A$) equal 11, and the modulation bits ($B_B$) equal 0001,
(1, 4, π/2) if the encoder is in state 7, the state bits ($B_A$) equal 11, and the modulation bits ($B_B$) equal 0010,
(5, 0, π/2) if the encoder is in state 7, the state bits ($B_A$) equal 11, and the modulation bits ($B_B$) equal 0011,
(3, 2, π/2) if the encoder is in state 7, the state bits ($B_A$) equal 11, and the modulation bits ($B_B$) equal 0100,
(7, 6, π/2) if the encoder is in state 7, the state bits ($B_A$) equal 11, and the modulation bits ($B_B$) equal 0101,
(3, 6, π/2) if the encoder is in state 7, the state bits ($B_A$) equal 11, and the modulation bits ($B_B$) equal 0110,
(7, 2, π/2) if the encoder is in state 7, the state bits ($B_A$) equal 11, and the modulation bits ($B_B$) equal 0111,
(1, 2, 1/2) if the encoder is in state 7, the state bits ($B_A$) equal 11, and the modulation bits ($B_B$) equal 1000,
(5, 6, π/2) if the encoder is in state 7, the state bits ($B_A$) equal 11, and the modulation bits ($B_B$) equal 1001,
(1, 6, π/2) if the encoder is in state 7, the state bits ($B_A$) equal 11, and the modulation bits ($B_B$) equal 1010,
(5, 2, π/2) if the encoder is in state 7, the state bits ($B_A$) equal 11, and the modulation bits ($B_B$) equal 1011,
(3, 0, π/2) if the encoder is in state 7, the state bits ($B_A$) equal 11, and the modulation bits ($B_B$) equal 1100,
(7, 4, π/2) if the encoder is in state 7, the state bits ($B_A$) equal 11, and the modulation bits ($B_B$) equal 1101,
(3, 4, π/2) if the encoder is in state 7, the state bits ($B_A$) equal 11, and the modulation bits ($B_B$) equal 1110,
(7, 0, π/2) if the encoder is in state 7, the state bits ($B_A$) equal 11, and the modulation bits ($B_B$) equal 1111,
(0, 0, π) if the encoder is in state 7, the state bits ($B_A$) equal 00, and the modulation bits ($B_B$) equal 0000,
(4, 4, π) if the encoder is in state 7, the state bits ($B_A$) equal 00, and the modulation bits ($B_B$) equal 0001,
(0, 4, π) if the encoder is in state 7, the state bits ($B_A$) equal 00, and the modulation bits ($B_B$) equal 0010,
(4, 0, π) if the encoder is in state 7, the state bits ($B_A$) equal 00, and the modulation bits ($B_B$) equal 0011,
(2, 2, π) if the encoder is in state 7, the state bits ($B_A$) equal 00, and the modulation bits ($B_B$) equal 0100,
(6, 6, π) if the encoder is in state 7, the state bits ($B_A$) equal 00, and the modulation bits ($B_B$) equal 0101,
(2, 6, π) if the encoder is in state 7, the state bits ($B_A$) equal 00, and the modulation bits ($B_B$) equal 0110,
(6, 2, π) if the encoder is in state 7, the state bits ($B_A$) equal 00, and the modulation bits ($B_B$) equal 0111,
(0, 2, π) if the encoder is in state 7, the state bits ($B_A$) equal 00, and the modulation bits ($B_B$) equal 1000,
(4, 6, π) if the encoder is in state 7, the state bits ($B_A$) equal 00, and the modulation bits ($B_B$) equal 1001,
(0, 6, π) if the encoder is in state 7, the state bits ($B_A$) equal 00, and the modulation bits ($B_B$) equal 1010,
(4, 2, π) if the encoder is in state 7, the state bits ($B_A$) equal 00, and the modulation bits ($B_B$) equal 1011,
(2, 4, π) if the encoder is in state 7, the state bits ($B_A$) equal 00, and the modulation bits ($B_B$) equal 1100,
(6, 0, π) if the encoder is in state 7, the state bits ($B_A$) equal 00, and the modulation bits ($B_B$) equal 1101,
(2, 0, π) if the encoder is in state 7, the state bits ($B_A$) equal 00, and the modulation bits ($B_B$) equal 1110,
(6, 4, π) if the encoder is in state 7, the state bits ($B_A$) equal 00, and the modulation bits ($B_B$) equal 1111,
(1, 1, 3π/2) if the encoder is in state 7, the state bits ($B_A$) equal 01, and the modulation bits ($B_B$) equal 0000,
(5, 5, 3π/2) if the encoder is in state 7, the state bits ($B_A$) equal 01, and the modulation bits ($B_B$) equal 0001,
(1, 5, 3π/2) if the encoder is in state 7, the state bits ($B_A$) equal 01, and the modulation bits ($B_B$) equal 0010,
(5, 1, 3π/2) if the encoder is in state 7, the state bits ($B_A$) equal 01, and the modulation bits ($B_B$) equal 0011,
(3, 3, 3π/2) if the encoder is in state 7, the state bits ($B_A$) equal 01, and the modulation bits ($B_B$) equal 0100,
(7, 7, 3π/2) if the encoder is in state 7, the state bits ($B_A$) equal 01, and the modulation bits ($B_B$) equal 0101,
(3, 7, 3π/2) if the encoder is in state 7, the state bits ($B_A$) equal 01, and the modulation bits ($B_B$) equal 0110,
(7, 3, 3π/2) if the encoder is in state 7, the state bits ($B_A$) equal 01, and the modulation bits ($B_B$) equal 0111,
(1, 3, 3π/2) if the encoder is in state 7, the state bits ($B_A$) equal 01, and the modulation bits ($B_B$) equal 1000,
(5, 7, 3π/2) if the encoder is in state 7, the state bits ($B_A$) equal 01, and the modulation bits ($B_B$) equal 1001,
(1, 7, 3π/2) if the encoder is in state 7, the state bits ($B_A$) equal 01, and the modulation bits ($B_B$) equal 1010,
(5, 3, 3π/2) if the encoder is in state 7, the state bits ($B_A$) equal 01, and the modulation bits ($B_B$) equal 1011,
(3, 1, 3π/2) if the encoder is in state 7, the state bits ($B_A$) equal 01, and the modulation bits ($B_B$) equal 1100,
(7, 5, 3π/2) if the encoder is in state 7, the state bits ($B_A$) equal 01, and the modulation bits ($B_B$) equal 1101,
(3, 5, 3π/2) if the encoder is in state 7, the state bits ($B_A$) equal 01, and the modulation bits ($B_B$) equal 1110, and
(7, 1, 3π/2) if the encoder is in state 7, the state bits ($B_A$) equal 01, and the modulation bits ($B_B$) equal 1111.

41. The system of claim 33, wherein
the encoder receives two state bits ($B_A$) and four modulation bits ($B_B$) at a time $T_0$, and
the transmission variables ($X_1$, $X_2$, $\Theta$) equal:
(0, 1, 0) if the encoder is in state 8, the state bits ($B_A$) equal 10, and the modulation bits ($B_B$) equal 0000,
(4, 5, 0) if the encoder is in state 8, the state bits ($B_A$) equal 10, and the modulation bits ($B_B$) equal 0001,
(0, 5, 0) if the encoder is in state 8, the state bits ($B_A$) equal 10, and the modulation bits ($B_B$) equal 0010,
(4, 1, 0) if the encoder is in state 8, the state bits ($B_A$) equal 10, and the modulation bits ($B_B$) equal 0011, (2, 3, 0) if the encoder is in state 8, the state bits ($B_A$) equal 10, and the modulation bits ($B_B$) equal 0100,
(6, 7, 0) if the encoder is in state 8, the state bits ($B_A$) equal 10, and the modulation bits ($B_B$) equal 0101,
(2, 7, 0) if the encoder is in state 8, the state bits ($B_A$) equal 10, and the modulation bits ($B_B$) equal 0110,
(6, 3, 0) if the encoder is in state 8, the state bits ($B_A$) equal 10, and the modulation bits ($B_B$) equal 0111,
(0, 3, 0) if the encoder is in state 8, the state bits ($B_A$) equal 10, and the modulation bits ($B_B$) equal 1000,
(4, 7, 0) if the encoder is in state 8, the state bits ($B_A$) equal 10, and the modulation bits ($B_B$) equal 1001,
(0, 7, 0) if the encoder is in state 8, the state bits ($B_A$) equal 10, and the modulation bits ($B_B$) equal 1010,
(4, 3, 0) if the encoder is in state 8, the state bits ($B_A$) equal 10, and the modulation bits ($B_B$) equal 1011,
(2, 1, 0) if the encoder is in state 8, the state bits ($B_A$) equal 10, and the modulation bits ($B_B$) equal 1100,
(6, 5, 0) if the encoder is in state 8, the state bits ($B_A$) equal 10, and the modulation bits ($B_B$) equal 1101,
(2, 5, 0) if the encoder is in state 8, the state bits ($B_A$) equal 10, and the modulation bits ($B_B$) equal 1110,
(6, 1, 0) if the encoder is in state 8, the state bits ($B_A$) equal 10, and the modulation bits ($B_B$) equal 1111,
(1, 0, π/2) if the encoder is in state 8, the state bits ($B_A$) equal 11, and the modulation bits ($B_B$) equal 0000,
(5, 4, π/2) if the encoder is in state 8, the state bits ($B_A$) equal 11, and the modulation bits ($B_B$) equal 0001,
(1, 4, π/2) if the encoder is in state 8, the state bits ($B_A$) equal 11, and the modulation bits ($B_B$) equal 0010,
(5, 0, π/2) if the encoder is in state 8, the state bits ($B_A$) equal 11, and the modulation bits ($B_B$) equal 0011,
(3, 2, π/2) if the encoder is in state 8, the state bits ($B_A$) equal 11, and the modulation bits ($B_B$) equal 0100,
(7, 6, π/2) if the encoder is in state 8, the state bits ($B_A$) equal 11, and the modulation bits ($B_B$) equal 0101,
(3, 6, π/2) if the encoder is in state 8, the state bits ($B_A$) equal 11, and the modulation bits ($B_B$) equal 0110,
(7, 2, π/2) if the encoder is in state 8, the state bits ($B_A$) equal 11, and the modulation bits ($B_B$) equal 0111,
(1, 2, π/2) if the encoder is in state 8, the state bits ($B_A$) equal 11, and the modulation bits ($B_B$) equal 1000,
(5, 6, π/2) if the encoder is in state 8, the state bits ($B_A$) equal 11, and the modulation bits ($B_B$) equal 1001,
(1, 6, π/2) if the encoder is in state 8, the state bits ($B_A$) equal 11, and the modulation bits ($B_B$) equal 1010,
(5, 2, π/2) if the encoder is in state 8, the state bits ($B_A$) equal 11, and the modulation bits ($B_B$) equal 1011,
(3, 0, π/2) if the encoder is in state 8, the state bits ($B_A$) equal 11, and the modulation bits ($B_B$) equal 1100,
(7, 4, π/2) if the encoder is in state 8, the state bits ($B_A$) equal 11, and the modulation bits ($B_B$) equal 1101,
(3, 4, π/2) if the encoder is in state 8, the state bits ($B_A$) equal 11, and the modulation bits ($B_B$) equal 1110,
(7, 0, π/2) if the encoder is in state 8, the state bits ($B_A$) equal 11, and the modulation bits ($B_B$) equal 1111,
(0, 0, π) if the encoder is in state 8, the state bits ($B_A$) equal 00, and the modulation bits ($B_B$) equal 0000,
(4, 4, π) if the encoder is in state 8, the state bits ($B_A$) equal 00, and the modulation bits ($B_B$) equal 0001,
(0, 4, π) if the encoder is in state 8, the state bits ($B_A$) equal 00, and the modulation bits ($B_B$) equal 0010,
(4, 0, π) if the encoder is in state 8, the state bits ($B_A$) equal 00, and the modulation bits ($B_B$) equal 0011,
(2, 2, π) if the encoder is in state 8, the state bits ($B_A$) equal 00, and the modulation bits ($B_B$) equal 0100,
(6, 6, π) if the encoder is in state 8, the state bits ($B_A$) equal 00, and the modulation bits ($B_B$) equal 0101,
(2, 6, π) if the encoder is in state 8, the state bits ($B_A$) equal 00, and the modulation bits ($B_B$) equal 0110,
(6, 2, π) if the encoder is in state 8, the state bits ($B_A$) equal 00, and the modulation bits ($B_B$) equal 0111,
(0, 2, π) if the encoder is in state 8, the state bits ($B_A$) equal 00, and the modulation bits ($B_B$) equal 1000,
(4, 6, π) if the encoder is in state 8, the state bits ($B_A$) equal 00, and the modulation bits ($B_B$) equal 1001,
(0, 6, π) if the encoder is in state 8, the state bits ($B_A$) equal 00, and the modulation bits ($B_B$) equal 1010,
(4, 2, π) if the encoder is in state 8, the state bits ($B_A$) equal 00, and the modulation bits ($B_B$) equal 1011,
(2, 4, π) if the encoder is in state 8, the state bits ($B_A$) equal 00, and the modulation bits ($B_B$) equal 1100,
(6, 0, π) if the encoder is in state 8, the state bits ($B_A$) equal 00, and the modulation bits ($B_B$) equal 1101,
(2, 0, π) if the encoder is in state 8, the state bits ($B_A$) equal 00, and the modulation bits ($B_B$) equal 1110,
(6, 4, π) if the encoder is in state 8, the state bits ($B_A$) equal 00, and the modulation bits ($B_B$) equal 1111,
(1, 1, 3π/2) if the encoder is in state 8, the state bits ($B_A$) equal 01, and the modulation bits ($B_B$) equal 0000,
(5, 5, 3π/2) if the encoder is in state 8, the state bits ($B_A$) equal 01, and the modulation bits ($B_B$) equal 0001,
(1, 5, 3π/2) if the encoder is in state 8, the state bits ($B_A$) equal 01, and the modulation bits ($B_B$) equal 0010,
(5, 1, 3π/2) if the encoder is in state 8, the state bits ($B_A$) equal 01, and the modulation bits ($B_B$) equal 0011,
(3, 3, 3π/2) if the encoder is in state 8, the state bits ($B_A$) equal 01, and the modulation bits ($B_B$) equal 0100,
(7, 7, 3π/2) if the encoder is in state 8, the state bits ($B_A$) equal 01, and the modulation bits ($B_B$) equal 0101,
(3, 7, 3π/2) if the encoder is in state 8, the state bits ($B_A$) equal 01, and the modulation bits ($B_B$) equal 0110,
(7, 3, 3π/2) if the encoder is in state 8, the state bits ($B_A$) equal 01, and the modulation bits ($B_B$) equal 0111,
(1, 3, 3π/2) if the encoder is in state 8, the state bits ($B_A$) equal 01, and the modulation bits ($B_B$) equal 1000,
(5, 7, 3π/2) if the encoder is in state 8, the state bits ($B_A$) equal 01, and the modulation bits ($B_B$) equal 1001,
(1, 7, 3π/2) if the encoder is in state 8, the state bits ($B_A$) equal 01, and the modulation bits ($B_B$) equal 1010,
(5, 3, 3π/2) if the encoder is in state 8, the state bits ($B_A$) equal 01, and the modulation bits ($B_B$) equal 1011,
(3, 1, 3π/2) if the encoder is in state 8, the state bits ($B_A$) equal 01, and the modulation bits ($B_B$) equal 1100,
(7, 5, 3π/2) if the encoder is in state 8, the state bits ($B_A$) equal 01, and the modulation bits ($B_B$) equal 1101,
(3, 5, 3π/2) if the encoder is in state 8, the state bits ($B_A$) equal 01, and the modulation bits ($B_B$) equal 1110, and
(7, 1, 3π/2) if the encoder is in state 8, the state bits ($B_A$) equal 01, and the modulation bits ($B_B$) equal 1111.

42. A telecommunications system, comprising:
a receiver having a decoder that decodes a multi-state trellis code; and
at least one receiver element coupled to the receiver,
wherein, during operation, the decoder decodes received information signals encoded using at least two orthogonal space-time block codes of a form $$C(x_1, x_2, \theta) = \begin{pmatrix} x_1 e^{j\theta} & x_2 \\ -x_2^* e^{j\theta} & x_1^* \end{pmatrix}$$

wherein X1 and X2 represent modulation symbols, and θ represents a code selection parameter.

43. A telecommunications system, comprising:
a receiver having a decoder that decodes a multi-state trellis code; and
at least one receiver element coupled to the receiver,
wherein, during operation, the decoder decodes received information signals encoded using at least two orthogonal space-time block codes of a form $$C(x_1, x_2, \theta) = \begin{pmatrix} x_1 e^{j\theta} & x_2 e^{j\theta} \\ -x_2^* & x_1^* \end{pmatrix}$$

wherein X1 and X2 represent modulation symbols, and θ represents a code selection parameter.

44. The system of claim 42, wherein
the at least one receiver element is an antenna.

45. The system of claim 42, wherein
the at least one receiver element is an optical receiver.

46. A method for designing a full-diversity code, comprising the steps of:
(1) selecting a rate for a diverse transmission scheme;
(2) selecting a number of states for the code;
(3) selecting a super-orthogonal space-time trellis structure having the number of states selected in step (2);
(4) selecting a super-orthogonal space-time set partitioning structure that corresponds to the rate selected in set (1); and
(5) assigning values to a set of transmission variable in accordance with the super-orthogonal space-time trellis structure selected in step (3) and the super-orthogonal space-time set partitioning structure selected in step (4).

47. A telecommunications system, comprising:
a transmitter having an encoder that implements a multi-state trellis code; and
at least two transmission elements coupled to the transmitter,
wherein, during operation, the encoder:
receives a group of input data bits,
selects an orthogonal space-time block code of a form $$C(x_1, x_2, \theta) = \begin{pmatrix} x_1 e^{j\theta} & x_2 e^{j\theta} \\ -x_2^* & x_1^* \end{pmatrix}$$

from a set of space-time block codes, based on the group of input bits and a state of the encoder, wherein X1 and X2 represent modulation symbols, and θ represents a code selection parameter,
selects at least two modulation symbols, one symbol for each of the at least two transmission elements, based on the group of input bits and the state of the encoder, and
encodes the group of input data bits, using the orthogonal space-time block code and the at least two modulation symbols, for transmission by the at least two transmission elements.

* * * * *